United States Patent
Garcia et al.

(10) Patent No.: US 10,594,541 B2
(45) Date of Patent: Mar. 17, 2020

(54) REMOTE EVALUATION OF CONTENT DELIVERY SERVICE

(71) Applicant: Comcast Cable Communications, LLC, Philadelphia, PA (US)

(72) Inventors: Maurice Manuel Garcia, Levittown, PA (US); Robert Joseph Thompson, Quakertown, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

(21) Appl. No.: 16/121,524

(22) Filed: Sep. 4, 2018

(65) Prior Publication Data

US 2019/0075013 A1 Mar. 7, 2019

Related U.S. Application Data

(60) Provisional application No. 62/677,166, filed on May 28, 2018, provisional application No. 62/554,009, filed on Sep. 4, 2017.

(51) Int. Cl.
| | | |
|---|---|---|
| *H04L 12/24* | (2006.01) | |
| *H04L 12/26* | (2006.01) | |
| *H04L 25/02* | (2006.01) | |
| *H04L 27/00* | (2006.01) | |
| *H04L 12/28* | (2006.01) | |
| *H04L 12/44* | (2006.01) | |

(52) U.S. Cl.
CPC ...... *H04L 41/0618* (2013.01); *H04L 12/2801* (2013.01); *H04L 12/44* (2013.01); *H04L 25/0202* (2013.01); *H04L 27/00* (2013.01); *H04L 41/0213* (2013.01); *H04L 43/04* (2013.01); *H04L 43/16* (2013.01)

(58) Field of Classification Search
CPC . H04L 41/0618; H04L 12/44; H04L 12/2801; H04L 27/00; H04L 25/0202; H04L 43/04; H04L 41/0213; H04L 43/16
See application file for complete search history.

(56) References Cited

U.S. PATENT DOCUMENTS

| | | | | |
|---|---|---|---|---|
| 5,247,296 | A | * | 9/1993 | Spies ...................... B60K 28/00 180/167 |
| 6,335,700 | B1 | * | 1/2002 | Ashihara ............... G01S 7/4004 342/117 |
| 2011/0170576 | A1 | * | 7/2011 | Nagano .................. G01S 11/02 375/147 |
| 2012/0293359 | A1 | * | 11/2012 | Fukuda ..................... G01S 3/48 342/107 |
| 2013/0091267 | A1 | * | 4/2013 | Urban ................. H04L 12/2801 709/224 |
| 2018/0007425 | A1 | * | 1/2018 | Bailey .............. H04N 21/43632 |

OTHER PUBLICATIONS

"Channel Estimation." MathWorks, Mar. 2019, https://www.mathworks.com/help/lte/ug/channel-estimation.html.

* cited by examiner

*Primary Examiner* — Michael A Keller
(74) *Attorney, Agent, or Firm* — Banner & Witcoff, Ltd.

(57) ABSTRACT

Systems, methods, and apparatuses for remote evaluation of content delivery service are described. A remote computing device may determine the existence and performance characteristics of devices and equipment at a premises by monitoring and analyzing data from a network associated with the premises to determine the presence or absence of equipment, compatibility issues, and performance quality.

20 Claims, 41 Drawing Sheets

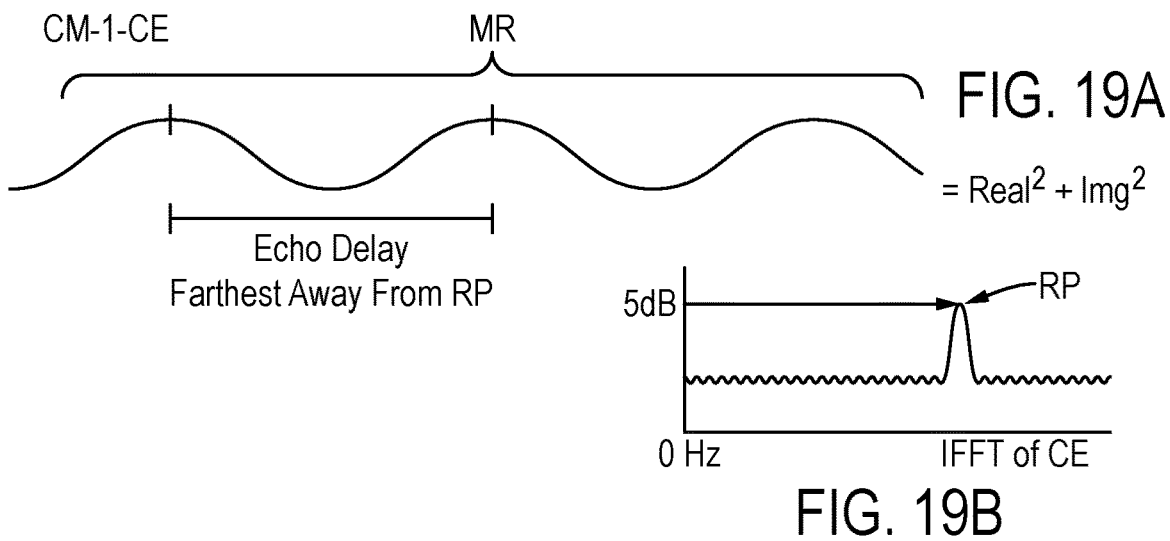
FIG. 19A
FIG. 19B
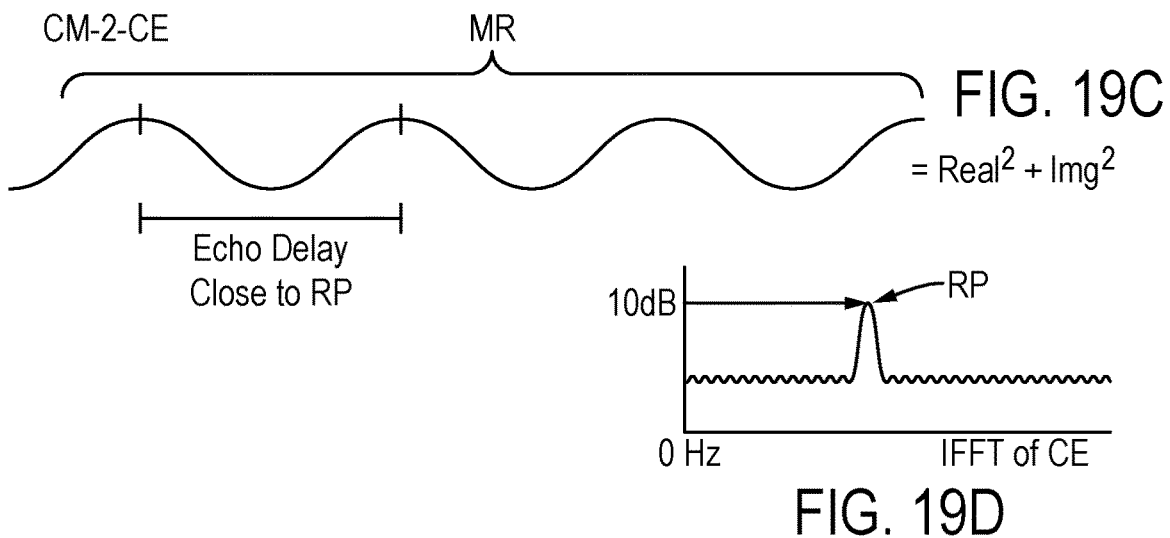
FIG. 19C
FIG. 19D
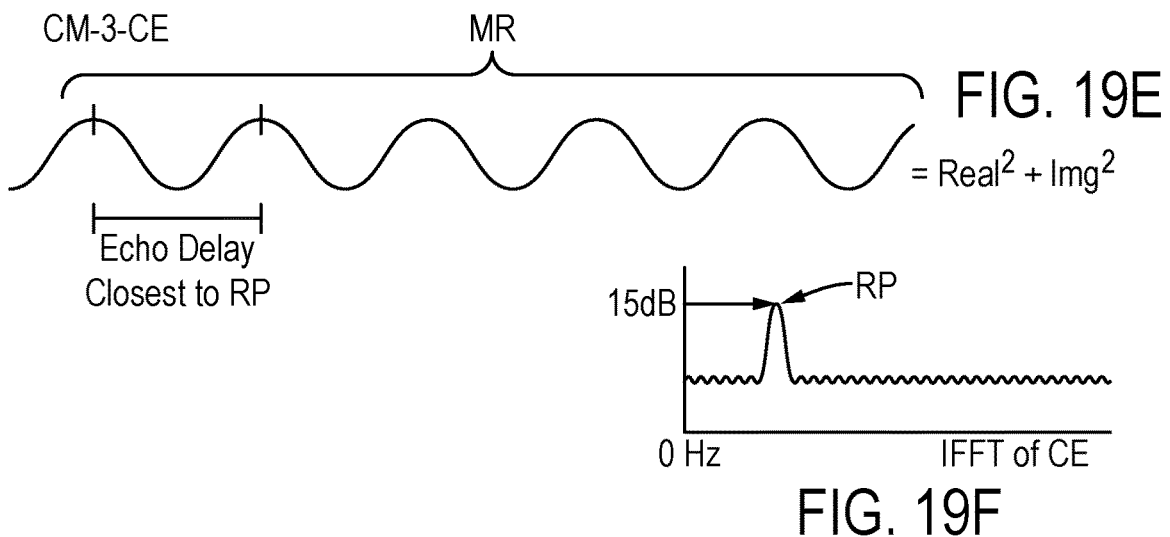
FIG. 19E
FIG. 19F

REMOTE EVALUATION OF CONTENT DELIVERY SERVICE

CROSS-REFERENCE TO RELATED APPLICATIONS

This patent claims the benefit of U.S. Provisional Application No. 62/554,009, filed on Sep. 4, 2017 and entitled "Remote Evaluation of Content Delivery Service," and claims the benefit of U.S. Provisional Application No. 62/677,166, filed on May 28, 2018 and entitled "Remote Evaluation of Content Delivery Service." U.S. Provisional Application No. 62/554,009 and U.S. Provisional Application No. 62/677,166 are hereby incorporated by reference herein in their entireties.

BACKGROUND

Content delivery services (e.g., networks) often comprise numerous devices and/or different types of equipment. It can be difficult to monitor such services for failures or performance. For example, it may be difficult to determine the presence or absence of filters (such as POE filters), amplifiers, splitters, the integrity of connections, the settings/status/configurations of other network hardware and/or software components, and/or other network issues.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

SUMMARY

The following presents a simplified summary in order to provide a basic understanding of some of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Remote localization of impairments and aggregation of performance data via client deployed devices may reduce the amount of dedicated test instrumentations. Determining the existence and performance characteristics of equipment at a premises by remotely monitoring and analyzing data from a network associated with the premises may be advantageous.

BRIEF DESCRIPTION OF THE DRAWINGS

Some features herein are shown by way of example, and not by way of limitation, in the figures of the accompanying drawings and in which like reference numerals refer to similar elements.

FIGS. 19A-19F show example channel estimations with varying echo delays and their corresponding inverse fast Fourier transform waveforms.

DETAILED DESCRIPTION

Figure 1:
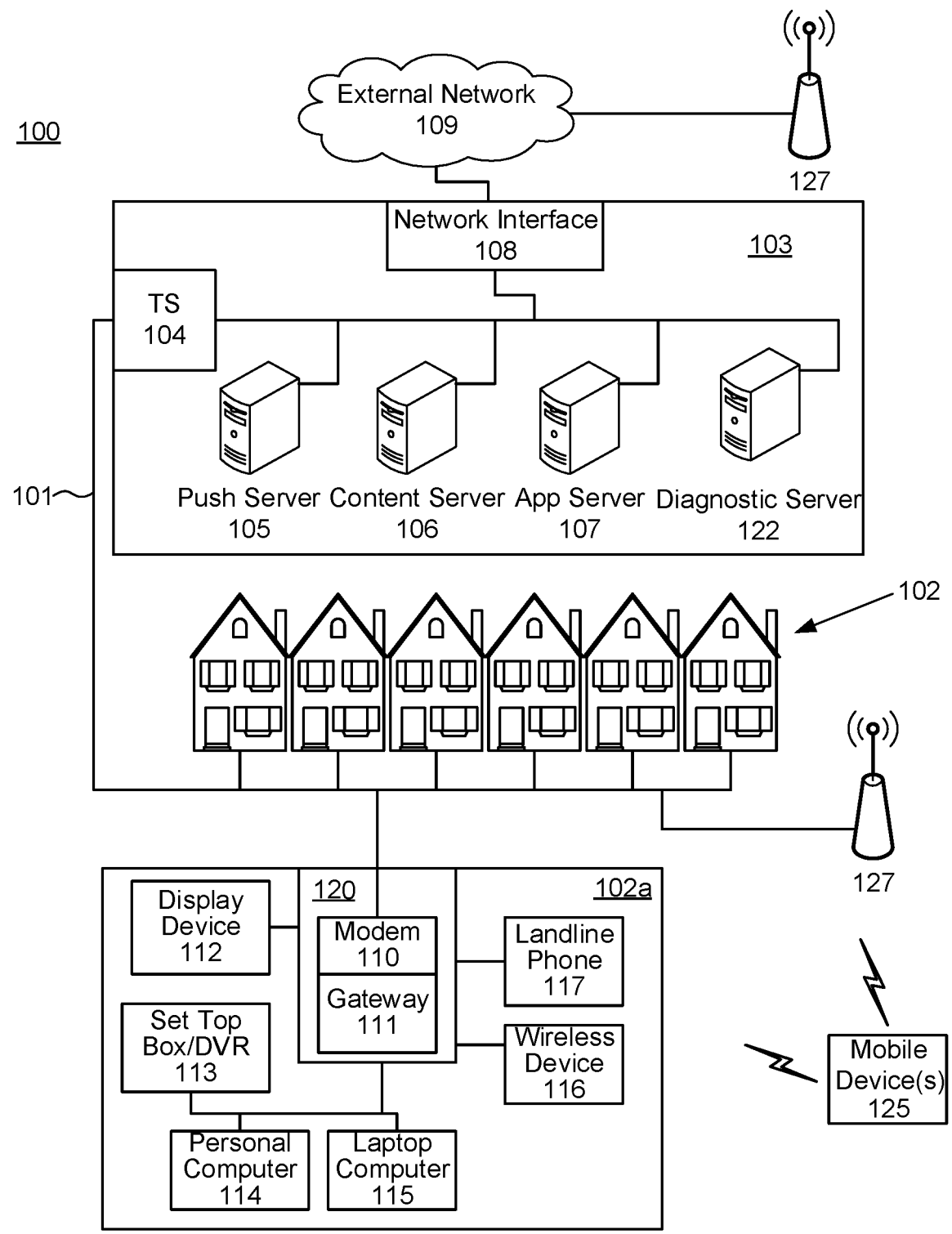
FIG. 1 shows a communication network.

In the following description, reference is made to the accompanying drawings, which form a part hereof, and in which is shown by way of illustration of various non-limiting ways the disclosure that may be practiced.

As set forth in Table 1, the following abbreviations may correspond to the following within this disclosure:

TABLE 1

| | |
|---|---|
| ACA | Alternative Channel Assessment |
| bps | bits-per-second |
| bpsym | bits-per-symbol |
| BPSK | Bi-Phase Shift Keying |
| CNR | Carrier-to-Noise Ratio |
| CM | Cable Modem |
| dB | decibel |
| DS | Downstream |
| DStat | Descriptive Statistics |
| DUT | Device Under Test |
| EVM | Error Vector Magnitude |
| FEC | Forward Error Correction |
| HFC | Hybrid fiber-coax |
| HP | High Pass |
| HTTP | Hyper Text Transfer Protocol |
| Hz | Hertz |
| Kbps | Kilobits per second |
| KPI | Key Performance Indicator |
| LCI | LDPC Code Iteration |
| LDPC | low-density parity check |
| LP | Low Pass |
| OFDM | Orthogonal Frequency-Division Multiplexing |
| OSS | Operation Software Support |
| PDF | Probability Density Function |
| PNM | Proactive Network Maintenance |
| POE | Point-OF-Entry (MoCA Band-Stop Filter) |
| MER | Modulation Error Ratio |
| MoCA | Media over Cable Alliance |
| MR | Micro Reflection |
| NA | Network Analyzer |
| NVP | Nominal Velocity of Propagation |
| RF | Radio Frequency |
| RL | Return Loss |
| RT | Round Trip |
| SA | Spectrum Analyzer |
| SCTE | Society of Cable Telecommunications Engineers |
| SD | Standard Deviation (σ) |
| SNR | Signal-To-Noise Ratio |
| SNMP | Simple Network Management Protocol |
| SWR | Standing Wave Ratio |
| TDR | Time-Domain Reflectometer |
| VSA | Vector Signal Analyzer |

TABLE 1-continued

| | |
|---|---|
| VSWR | Voltage Standing Wave Ratio |
| WMA | Window Moving Average |
| WS | Window Size |

With home networks comprising a number of devices and equipment and service providers managing a number of home networks, remote monitoring and diagnosis may be extremely advantageous. Many factors, such as the presence or absence of point of entry (POE) filters, incompatible devices, and/or improper installation of devices and equipment, may be important to not only identify, but also trigger remedial measures. Furthermore, home networks, such as a MoCA network, may allow various devices within a premises to communicate with one another, and the connections between any two of these devices may need to be of a certain minimum quality. Accordingly, it is advantageous to identify the presence or absence of POE filters, incompatible devices, and/or their locations to properly assess network configurations. Additionally, monitoring the quality of such networks is equally advantageous. Remote monitoring and identification may quickly determine otherwise overlooked improper network configurations and quality issues.

In some access networks and home networks, various activities (e.g., upstream and downstream data) may operate on mutually exclusive frequency bands. Access networks may exist both in and outside a home and may deliver voice, video, and high speed data from a centralized location (e.g., a hub) and/or distributed locations to other nodes (e.g., homes and/or offices) via transport technologies, such as Ethernet, Data Over Cable Service Interface Specification (DOCSIS), and/or other transport mechanisms. End point networks (e.g., home or office networks), may be located proximate to a home or office (e.g., within a home) and provide connectivity between client premise equipment (CPE) and/or with other networks (e.g., wired and/or wireless networks) and may be configured to support services such as any room DVR, VoIP, Wi-Fi, wireless, and/or data, audio, and/or video delivery services. Examples of home network technologies include MoCA and Wi-Fi.

Diagnostic solutions may assist in providing root cause identification of network components contributing to service issues. Mesh networks may be configured to provide comprehensive multipoint-to-multipoint (MPTMP) home network analysis and/or characterization and can be configured to be redundant and to provide substantial detail with respect to Proactive Network Maintenance solutions.

In a DOCSIS network, some overlap may exist between upstream operating bands (e.g., on the distribution network side, for example, upstream of the gateway) and home/office network operating bands (e.g., on the home/office side, for example, downstream of the gateway). As providers continue to upgrade their networks, there may be a spectrum overlap between 1,125 and 1,218 MHz, which may represent approximately 17% of the MoCA band. The remaining 83% of the MoCA band may be invisible to newer DOCSIS 3.1 devices.

The DOCSIS 3.0 operating band may be between 5-1,002 MHz. The DOCSIS 3.1 operating band may be between 5-1,218 MHz (via Fiber Deep markets).

In some diagnostics (e.g., DOCSIS), there may be a potential that a subset of the communication paths that exist in a home may be obscured for MoCA devices. Mesh technologies such as multi-point to multi-point technologies using, for example, MoCA and Wi-Fi, may be better adapted to characterize and/or analyze a home network across some frequencies. Such configurations may have additional visibility into certain network operating bands of a home/office.

MoCA home network diagnostics may leverage full mesh rate (FMR) tables, which may represent throughput capabilities between some and/or all devices associated with a network (e.g., a mesh network). A rate table (e.g., a partial mesh or full mesh rate table) is provided below (Table 2).

TABLE 2

| Node | 1 | 2 | 3 |
|------|---|---|---|
| 1 | — | 201 Mbps | 208 Mbps |
| 2 | 149 Mbps | — | 270 Mbps |
| 3 | 213 Mbps | 205 Mbps | — |

Rates may be measured between various devices in a network. Rates that fail to meet some pre-defined threshold, for example 200 Mbps for MoCA 1.1, may be flagged for further investigation. Additional diagnostics may be run on the connection to attempt to isolate and/or qualify the issue. In certain circumstances, repairs may be made remotely. In other circumstances, a field technician may be called to make a repair or to conduct additional on-site inspection and/or diagnosis. Failure to meet a performance threshold (e.g., throughput) may be caused by a variety of home network defects and/or deficiencies such as damaged cables, loose connectors, incompatible drop amplifiers and splitters, VoIP port connections, and missing point-of entry filters, and other hardware and/or software issues. FMR values alone do not diagnose, and isolate defects.

Without a point of entry filter, a bridge may form between two home networks, forming a single combined network. Different home networks are intended to be two separate networks, isolated from one another. Point of Entry filters are useful devices to prevent bridging in MoCA enabled homes. Some MoCA enabled homes do not have these devices installed and/or installed correctly. The Point of Entry filters may be inadvertently removed by a client, not included during installation, not installed properly, and/or may be damaged in some way. Bridging events may be detected after they occur, but network performance and/or security may be compromised, and the client home network performance may degrade. In addition to preventing bridging, Point of Entry filters may enhance MoCA network performance by reflecting MoCA signals (echoes) back into the home.

Remote evaluation of the structure and performance characteristics of home networks connected to content delivery access networks may allow a content provider to identify structural and performance issues that affect individual clients, a sub-population of clients, and/or all clients. Additionally, such evaluation may enable a provider to correct identified structural and/or performance issues to provide improved content delivery service, such as by increasing content delivery speed and bandwidth and/or by decreasing interference and interruptions.

FIG. 1 shows a communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as diagnostic server 122 (described below), additional push, content, and/or application servers, and/or other types of servers. Although shown separately, the push server 105, the content server 106, the application server 107, the diagnostic server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

A premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
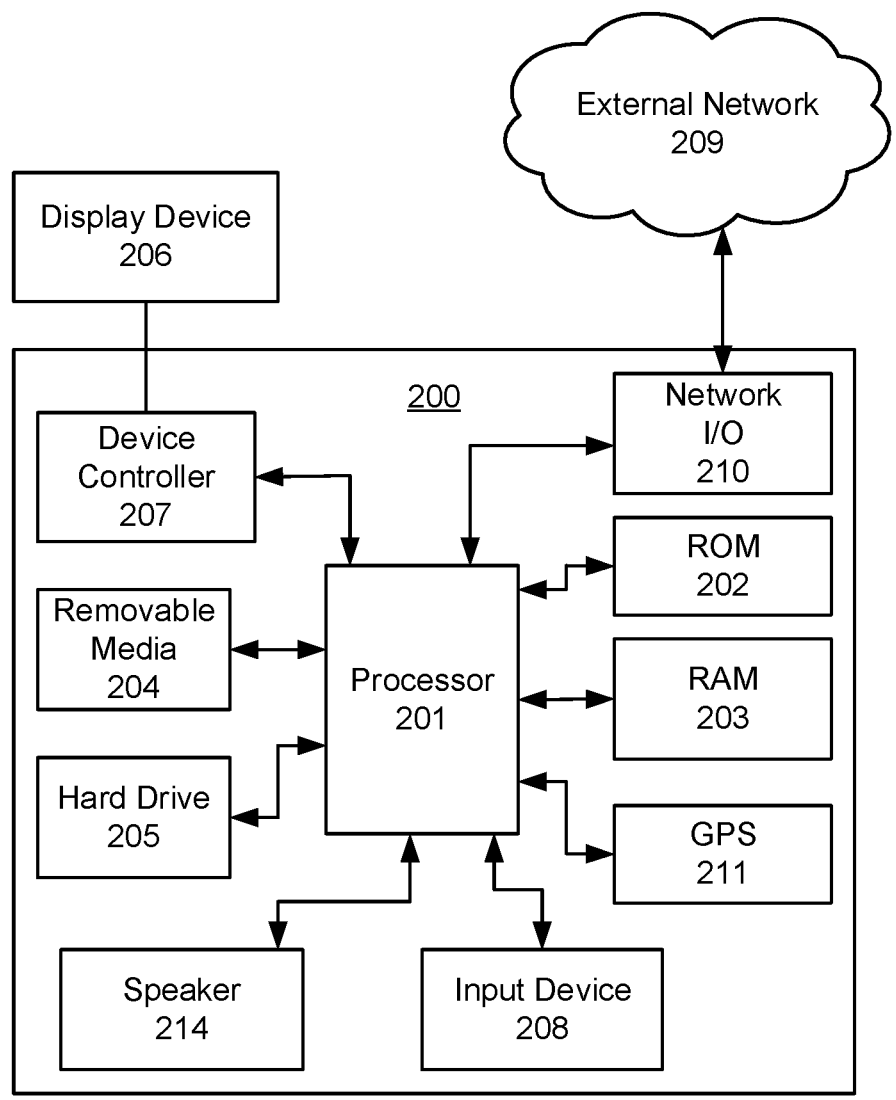
FIG. 2 shows hardware elements of a computing device.

FIG. 2 shows hardware elements of a computing device 200. The computing device 200 may be any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., any of the user devices 301-303, the computing device 308, the mobile device 701). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

The computing device 200 may also comprise circuitry 221 configured to receive and/or send communications via a power line network. A power cord 220 may be connectable to an outlet or other source of electrical power so as to deliver a power signal (e.g., a 120 volt, 60 Hz AC signal) to an internal battery supply and/or charger (not shown) of the computing device 200. The circuitry 221 may comprise a filter that can detect communication signals added to the power signal and carried via a power line. The circuitry 221 may also or alternatively comprise a signal generator to generate a communication signal and add that communication signal to a power signal for transmission via a power line.

Although FIG. 2 shows a hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
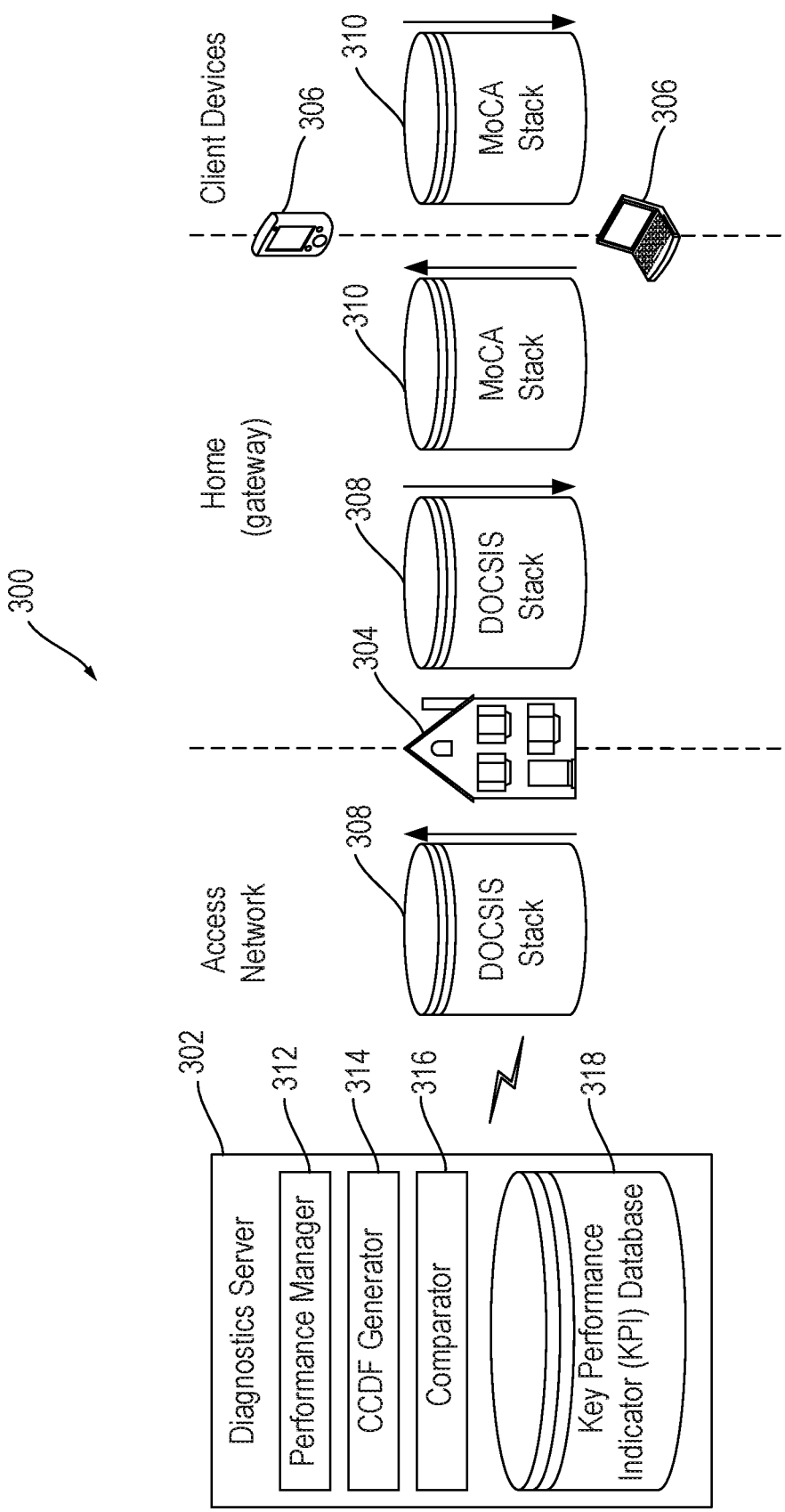
FIG. 3 shows an environment comprising a diagnostic server in communication with a home network.

FIG. 3 shows an environment 300 including a diagnostics server 302 in communication with a home, via a gateway 304. The diagnostics server 302 may be similar to the diagnostic server 122 (FIG. 1), described above, such that the diagnostic server 302 may be located at the headend 103 (FIG. 1). As described herein, the diagnostics server 302 may communicate with the gateway 304 via an access network using an access network protocol such as, for example, DOCSIS. DOCSIS technology (and/or other termination system technology) may be used to provide network access to a home. At the home, communication may occur between client devices 306 and via a mesh network that uses a different network protocol such as, for example, MoCA. MoCA technology (and/or other local network interfaces) may be used in home mesh networking for communications to and/or from home devices. MoCA, in some configurations, may allow bi-directional communications across coaxial and/or hybrid-fiber coaxial cable.

As shown in FIG. 3, DOCSIS and MoCA technology may be used together to deliver, e.g., over a network and to devices in a home/office, data and/or media content. Gateway 304 may be used to translate the data from the DOCSIS standard to the MoCA standard and vice versa. For example, as shown in FIG. 3, data (e.g., media content) may first traverse up the DOCSIS stack 308. After arriving at the gateway 304, the data may traverse down the DOCSIS stack 308. As the data traverses down the DOCSIS stack 308, the data may begin to traverse up the MoCA stack 310. After arriving at one or more of the client devices 306 of a home network, the data may traverse down the MoCA stack 310. Data may be targeted to particular client devices 306 based on various mechanisms such as an internet protocol (IP) address of the client device. Data may be sent to and/or from each one of the client devices via, for example, a simple network management protocol (SNMP).

Not all client devices in a home network may be configured for MoCA. For example, a legacy device with DOCSIS embedded in the device may not have MoCA configured for that device. In some such examples, firmware updates may be sent to the non-MoCA devices to include SNMP MIB support and enable MoCA configuration. Alternatives to the SNMP include, for example, RFC 1213 or TR 69/181, which may also be utilized as a protocol stack for communication with devices proximate the home/office.

As shown in FIG. 3, the diagnostic server 302 may comprise a performance manager 312, a Complimentary Cumulative Density Function (CCDF) generator 314, the comparator 316, and the key performance indicator (KPI) database 318. The performance manager 312, the CCDF generator 314, the comparator 316, and/or the KPI database 318 may have hardware and/or software implementations. For example, the performance manager 312, the CCDF generator 314, the comparator 316, and/or the KPI database 318 may be implemented via a computing device such as computing device 200 (FIG. 2). Additionally or alternatively, the performance manager 312, the CCDF generator 314, the comparator 316, and/or the KPI database 318 may be implemented, wholly or in-part, as software applications run by diagnostics server 302.

The performance manager 312 of the diagnostic server 302 may perform the methods described herein and may remotely access, command, and monitor client devices 306 remotely in order to make determinations about a premises network. The performance manager 312 may poll the client devices 306, via the SNMP, to receive information and/or request an operation to be performed by the client device. The performance manager 312 may access a management information base (MIB), which describes operations, such as alternative channel assessment (ACA) operations that may be used to measure network characteristics of MoCA (or other network protocols) enabled client devices. The performance manager 312 may collect data from a population of client device 306 and generate one or more threshold reference values and/or functions. The performance manager 312 may collect data from one or more client devices 306 of the population of client device 306, for comparison against baseline data or the generated one or more threshold reference values and/or functions.

The CCDF generator 314 may format data collected by the performance manager 312 to generate one or more graphical functions to represent the collected data in one or more different variations. For example, the CCDF generator 314 may create a histogram, a Cumulative Density Function (CDF), and/or a CCDF.

The example comparator 316 may be configured to compare measured data to one or more thresholds. The one or more thresholds may include data stored in key KPI database 318.

The KPI database 318 may store historical data, data received by the performance manager 312, mathematical formulas, functions, standard performance measurements, operations for client devices, point of entry (POE) filter profiles, and/or other data related to performance.

Measured performance characteristics may be compared against characteristics of a population (e.g., all measured client devices) with respect to the probability of occurrence. This may be helpful in determining an average or standard in which to identify abnormalities and predict the frequency of identifying such abnormalities. These measurements may account for drift over time and may provide a more accurate diagnostic tool. For example, an average or standard that is measured at a first time may be different than an average or standard measured at a subsequent time. Accordingly, periodic population measurement may be made to account for such possible variations.

Figure 4:
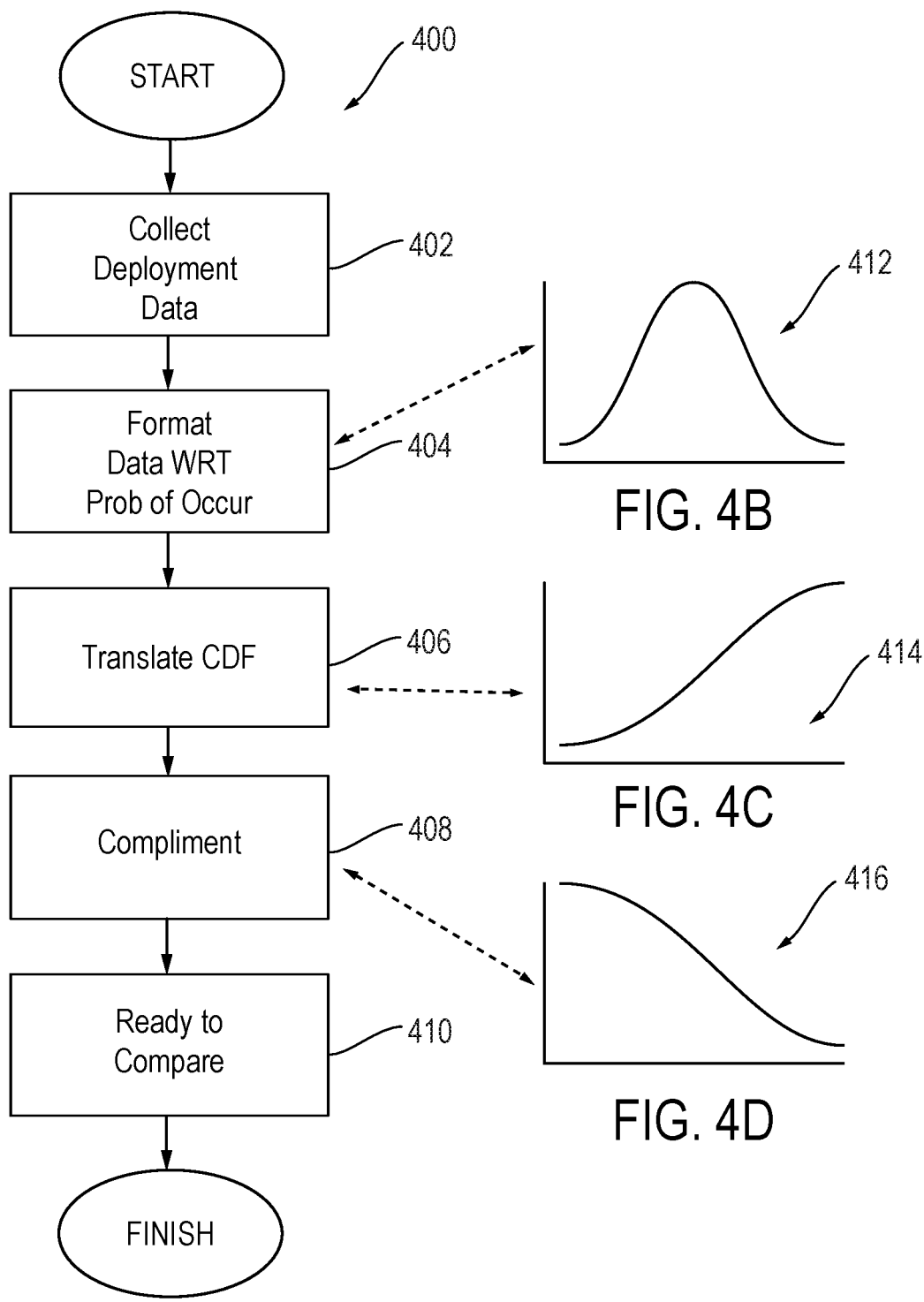
FIG. 4A is a flow chart showing a method for generating a Complimentary Cumulative Density Function.
FIGS. 4B-4D show example visual representations of data outputs from the flow chart in FIG. 4A.

FIG. 4A shows an example method 400 for generating a Complimentary Cumulative Density Function. The method 400 may be performed by diagnostic server 302 in the form of computer-readable instructions stored in memory, such as, for example, ROM 202 and/or RAM 203. Performance characteristics may be collected from a plurality of client devices 306 from a plurality of home networks serviced by a provider in a given population (block 402). The collected performance characteristics may be formatted with respect to the probability of occurrence (block 404). The formatted performance characteristics may be translated into a cumulative density function (block 406). The cumulative density function may be generated by aggregating the frequency of occurrence of a performance metric from zero to one. As more and more data is acquired, the cumulative density function approaches one. Accordingly, to better analyze the data, the compliment of the translated cumulative density function may be determined, thereby creating a CCDF (block 408). CCDF may format the data so that the majority of the population data is centered about the origin. At block 410, the sample diagnostic data received via the SNMP may be compared to one or more threshold values.

FIGS. 4B-4D illustrate visual representations of the collected data at blocks 404, 406, and 408, respectively. FIG. 4B shows a graph 412 of the performance characteristics after being collected from a population and formatted based on the probability of occurrence. In some such examples, the data forms a bell curve, as shown in FIG. 4B, where a majority of the data points lie in the middle having an average probability of occurrence, and where the data points at the high end and the low end are minorities having a low probability of occurrence. FIG. 4C shows a graph 414 of the performance characteristics after being translated into a cumulative density function. FIG. 4D shows a graph 416 of the performance characteristics after the complement has been determined.

Example CCDFs are shown and described with reference to FIGS. 5-6B. With respect to FIG. 5, a CCDF 500 is shown. The CCDF 500 comprises data corresponding to measured performance. A threshold function 502 may be generated based on population data 504 and may represent a population norm of a performance metric (e.g., downstream receive signal to noise ratio (SNR) for an entire population of cable modems).

Figure 5:
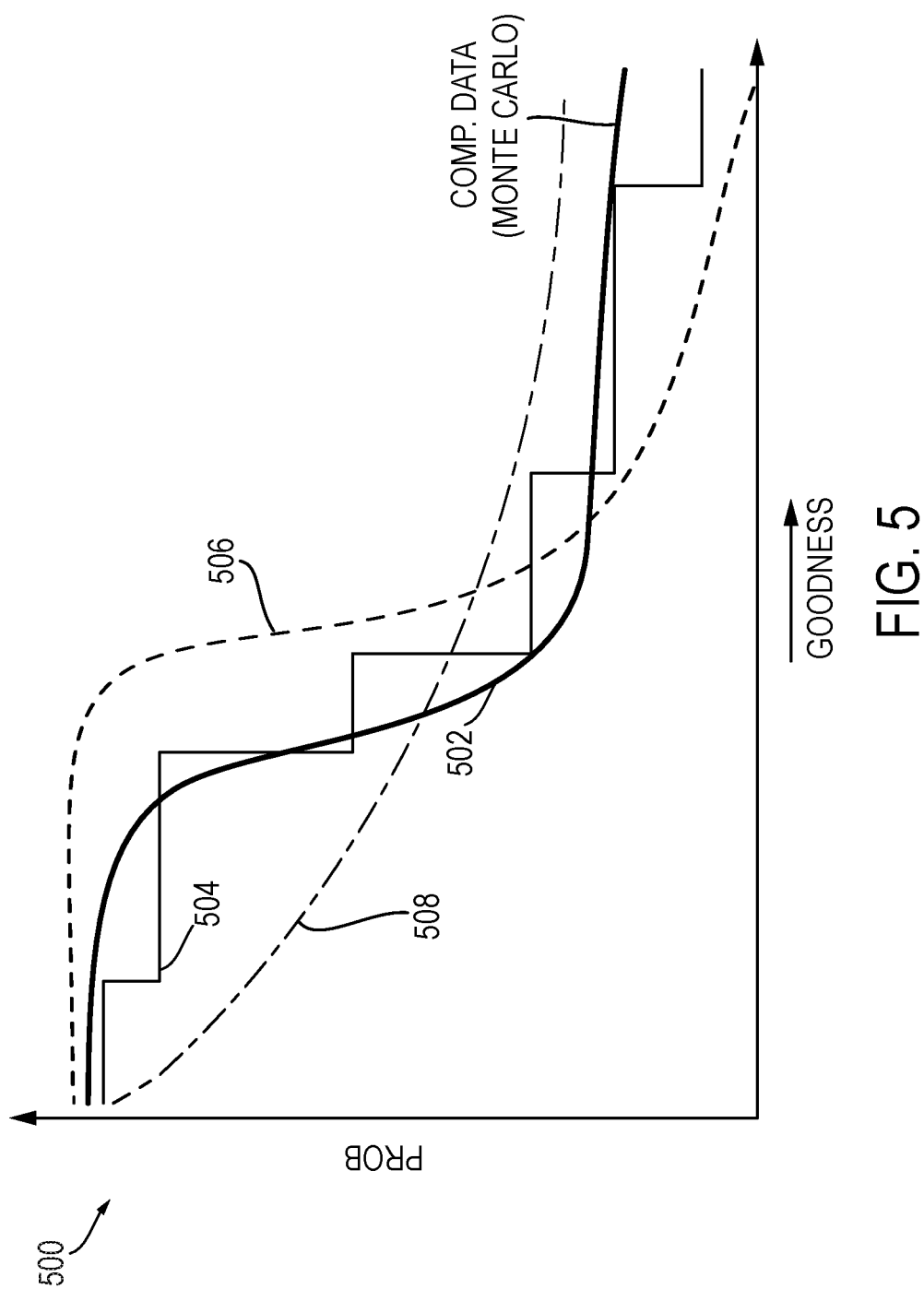
FIGS. 5-6B show example graphical illustrations of example complimentary cumulative density functions.

As shown in FIG. 5, the X-axis may correspond to the quality of the performance metric. The performance metric may be any KPI of interest and the quality may be a measure of "goodness" or how well a client device is performing. In the shown example of FIG. 5, "goodness" may improve for values further away from the origin, while values close to the origin may be less good. The directionality of "goodness" may result in the greatest areas of the CCDF curve being near the origin. The Y-axis may correspond to the probability of that quality of performance occurring. For example, the Y-axis minimum may correspond to 0 probability, and the Y-axis maximum may correspond to a probability value of 1 or 100%. Performance metrics very near zero have a low likelihood of occurrence. In contrast, performance metrics near 100% have a high likelihood of occurrence.

The performance manager 312 may collect first data 506 and second data 508. The first data 506 may be received from a home network with favorable home networking. The second data 508 may be received from a home network where the end user has logged a ticket, citing unfavorable home networking experience. The comparator 316 may determine, based on numerous methods, that the first data 506 is better than the threshold function 502. For example, it may be determined that the first data 506 has values greater than the threshold function 502. Alternatively, the number of slope changes may be compared between the threshold function 502 and the first data 506. Even further, image recognition software may identify that the first data 506 is further to the right than the threshold function 502 is CCDF 500. Similarly, it may be determined that the second data 508 has values lower than the threshold function 502, has less number of slope changes than the threshold function 502, or is further to the left of the threshold function 502. Other data values may be compared such as the slope, mean, standard deviation, median, etc.

Figure 6A:
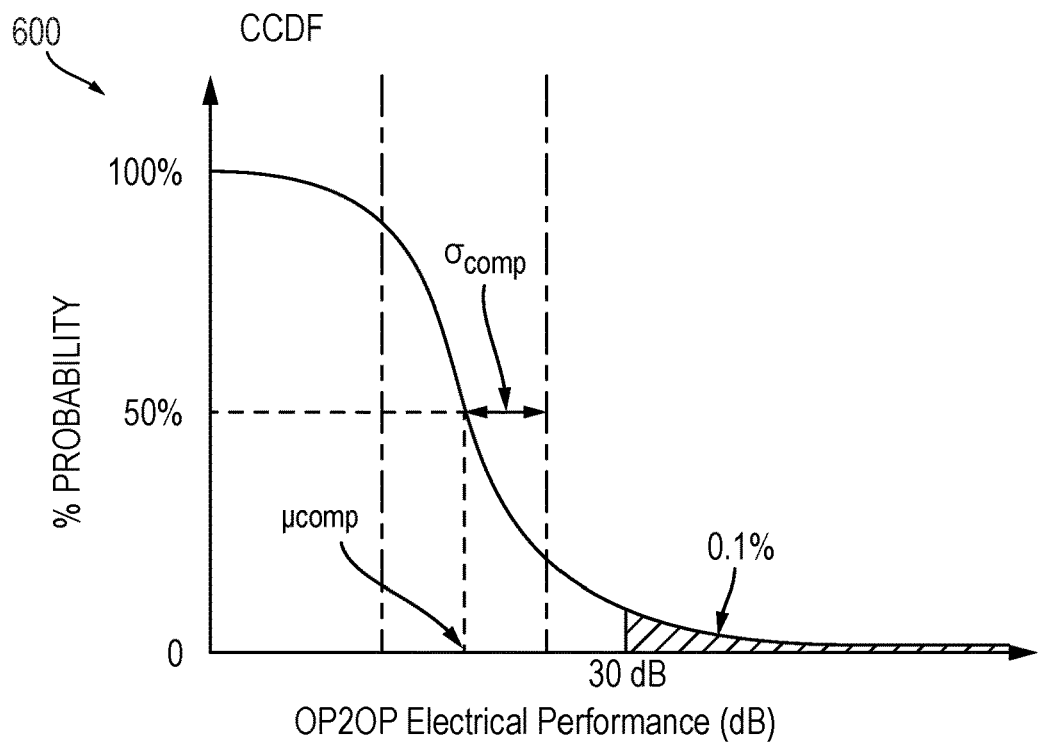

FIG. 6A shows a graph 600 wherein the X-axis may represent a value of the aggregate KPI. For example, the X-axis may represent the radio frequency (RF) electrical performance of a device (e.g., amplifier, splitter, etc.) output-port-to-output-port (OP2OP) isolation, in decibels (dBs). The Y-axis may represent the probability (P) associated with the device (e.g., drop amplifier or splitter) achieving a specific electrical performance value.

A first threshold, µCOMP, may be determined to be the average of performance characteristics measured for all devices in a population. µCOMP may correspond to an average OP2OP isolation. σCOMP may correspond to a degree of reliability shown as the standard deviation. For example, 99.9% of compatible devices may have an OP2OP isolation that may be ≤30 dB.

Figure 6B:
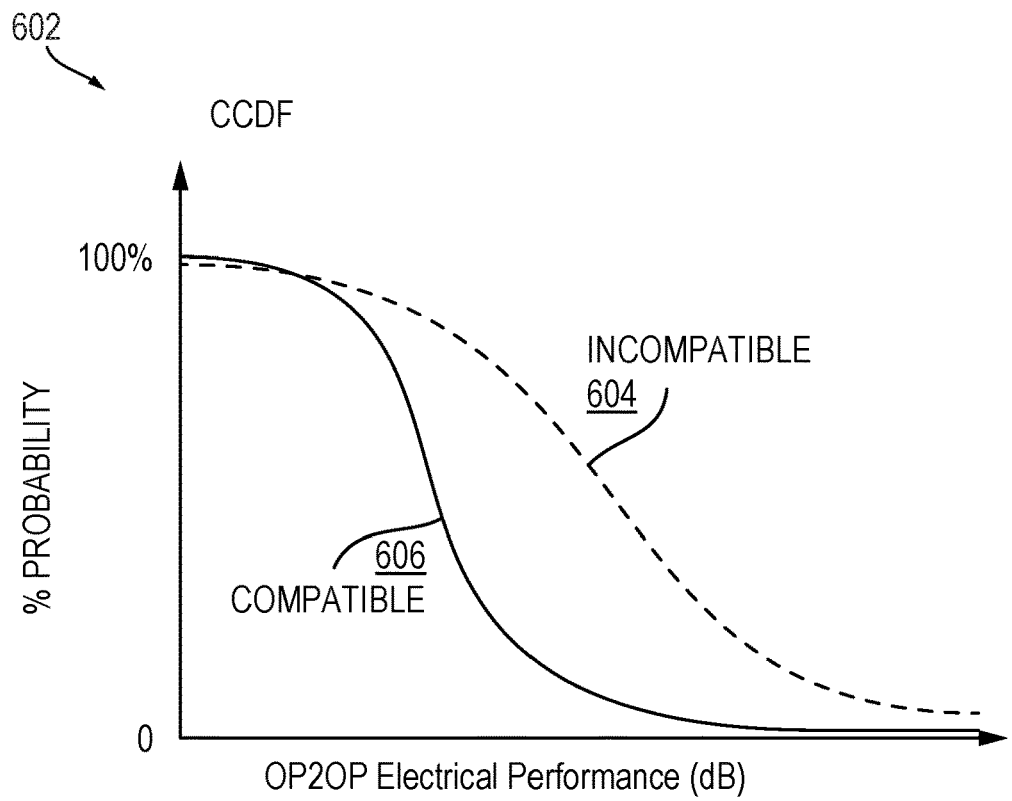

With respect to FIG. 6B, products that meet a particular OP2OP isolation specifications for compatible devices (e.g., drop amplifiers, splitters, etc.) may have a predictable or ideal contribution to OP2OP loss that may be indicated and/or described via the CCDF. Incompatible devices (e.g., drop amplifiers, splitters, etc.) may degrade both the mean and standard deviation of the OP2OP isolation performance, which may be indicated via comparison with a minimum expected performance. For example, in graph 602, the performance characteristics associated with an incompatible device may have a poorer OP2OP mean isolation, resulting in a right shift of the CCDF function, and ultimately higher average path loss and worse home network performance. Additionally, the OP2OP standard deviation may be poorer, resulting in a flattening out of the CCDF function, and ultimately a less reliable performing home network due to the higher degree of performance variation.

A measured mean and standard deviation of the OP2OP isolation performance may be worse than threshold function 502. This may indicate path loss and/or OP2OP isolation as a cause of lower performance. A home network exhibiting such performance may be flagged for remediation. The incompatible device function 604 shows such a case where both the mean and standard deviation are appreciably worse than a compatible device function 606.

The excessive path loss condition can be shared with a technician, prior to arriving at the home, guiding the technician to investigate whether incompatible splitter or drop amplifier exists within the home network. After replacement of the incompatible device with a compatible one, immediate feedback can be provided to the technician on whether path loss falls below threshold or if the path loss problem persists. The above described process establishes thresholds for acceptable home networking path loss and indicates when path loss thresholds are not being met.

This process, and others described herein, may be used to diagnose home network defects and/or deficiencies such as damaged cables, loose connectors, incompatible drop amplifiers and splitters, VoIP port connections, and missing point-of entry filters, and other hardware and/or software issues.

Incompatible devices may be detected based on splitter jumping (e.g., data traversing between network nodes through a splitter). Splitter jumping may be considered to be an undesirable network trait in access networks. Accordingly, for access networks, the performance metric of OP2OP isolation has often been specified very high such as, for example, 25 dB. MoCA signals can splitter jump at extremely high frequencies, where attenuation may be much higher than what would be experienced within DOCSIS frequency bands.

Figure 7:
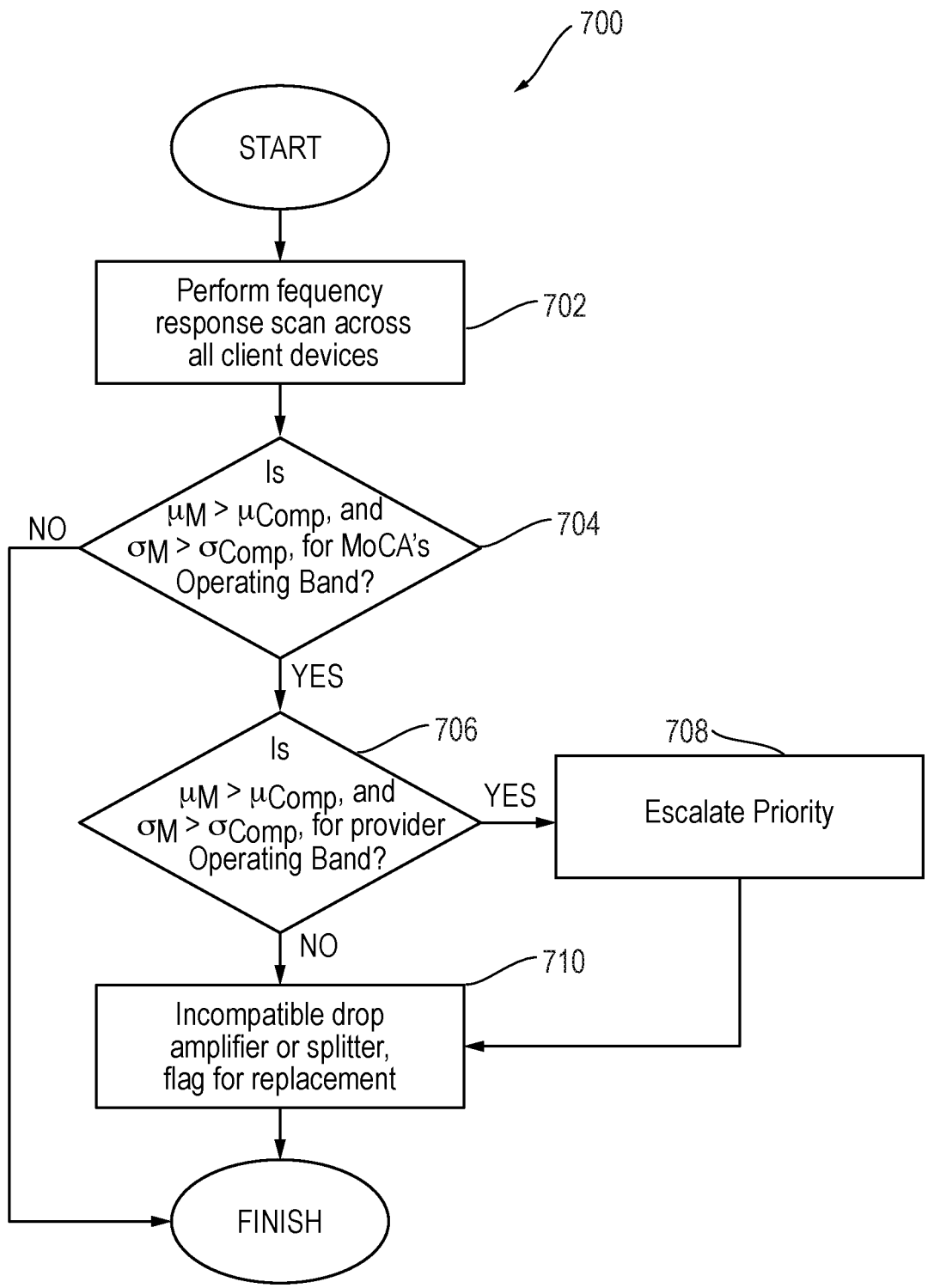
FIG. 7 is a flow chart showing a method for determining incompatible devices in a home network.

A method 700 for detecting incompatible devices is shown in FIG. 7. Method 700 may be implemented by computer readable instructions stored in a tangible computer readable storage medium to be executed by a machine. method 700 begins at block 702, wherein a measurement may be taken, such as a frequency response scan across some or all client devices 306. For example, the mesh devices may be requested to perform an operation and may measure the frequency response of each client device 306. The measurement (M) may be a waveform, and thus, the performance manager 312 may determine multiple values based on the measurement M including, without limitation, the mean (µM), standard deviation (σM), slope (mM), etc.

At block 704, for each client device 306, it may be determined whether the µM is greater than the µCOMP and whether the σM is greater than the σCOMP for the MoCA operating band. The MoCA operating band may be greater than the DOCSIS operating band and may be between 1100 MHz and 1675 MHz. If it is determined that the µM is greater than the µCOMP and that the σM is greater than the σCOMP for the MoCA operating band (block 704: Y), then control proceeds to block 706. Otherwise (block 704: N), method 700 ceases operation.

At block 706, it may be determined whether the µM is greater than the µCOMP and whether the σM is greater than the σCOMP for a provider operating band. The provider operating band may be a subset of the MoCA band and may be between 1125 MHz and 1175 MHz. If it is determined that the µM is greater than the µCOMP and that the σM is greater than the σCOMP for the provider operating band (block 706: Y), then control proceeds to block 708. Otherwise (block 706: N), control proceeds to block 710. At block 708, it may be indicated that the client device with the µM greater than the µCOMP and the σM greater than the σCOMP for the higher operating band has a high priority in a list of incompatible devices. Control may proceed to block 710. At block 710, the client device 306 may be identified as an incompatible device (e.g., drop amplifier, splitter, etc.) and the client device 306 may be flagged to be replaced. Replacement of the incompatible device may be scheduled according to the priority in the list of incompatible devices. Thereafter, method 700 may cease operation.

For incompatible drop devices, the electrical performance may produce a unique and remotely detectable frequency response (e.g., a small band of frequencies which have extremely high loss: a suckout). A pre-defined minimum acceptable electrical performance threshold, based on compatible drop amplifiers and splitters, may be used as a basis for comparison for the home network's device(s) under test (DUT). Complete DUT characterization, combined with system noise, path loss, and OP2OP isolation may be accomplished using a variety of protocol specific tools, such as, for example, MoCA's Error Vector Magnitude (EVM) probe, which may produce complete frequency response data over MoCA's and MoCA 2.0 operating bands. The frequency may be randomized.

Devices failing to meet MoCA 2.0 operating band standards may be flagged for immediate replacement, while devices that meet a provider's operating band, but fail MoCA's operating band may be flagged as an issue for future bandwidth expansion and thus addressed at a later time.

Characterizations may be conducted across some and/or all DUT port combinations, e.g. a four-way splitter may be a vector of OP2OP isolation values based on multiple two output port combinations for each MoCA link, or 1:2 (output port 1 to output port 2), 1:3, 1:4, 2:1, 2:3, 2:4, 3:1, 3:2, 3:4, 4:1, 4:2, 4:3. The port combinations may be randomized.

Figure 8:
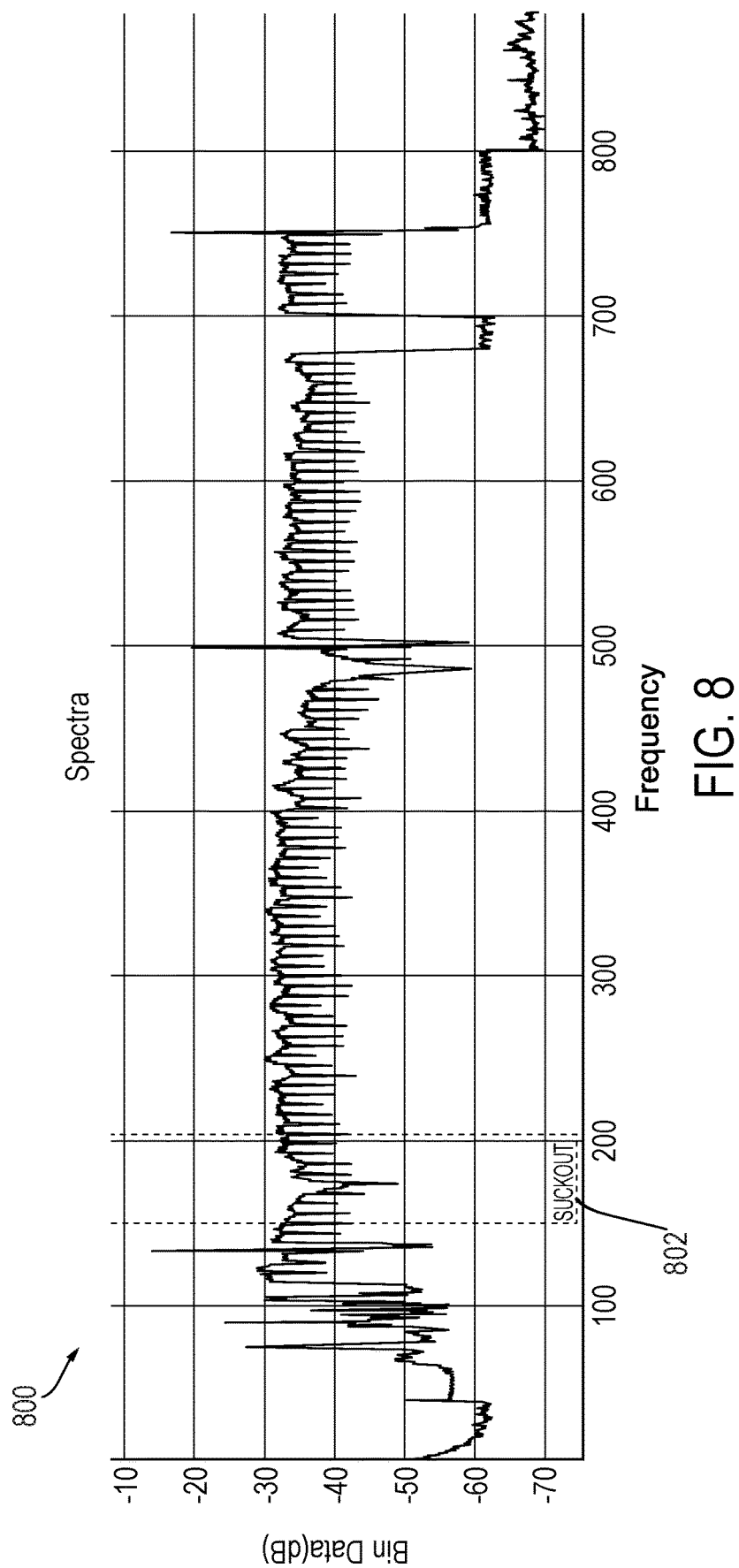
FIG. 8 shows an example graphical representation of suckout.

FIG. 8 shows a graphical representation 800 of suckout 802. If a suckout is observed within a port combination of the DUT OP2OP EVM probe measurements, then diagnostics server 302 may return an incompatible network device as a root cause for failure to meet a provider's pre-determined service criteria. Vendor products that meet the OP2OP isolation specifications for compatible drop amplifiers and splitters may have a predictable and/or ideal contribution to OP2OP loss that may also be described via the CCDF.

The existence of point of entry filters may be determined. POE filters are lowpass filters that may be installed in a MoCA network to isolate the home network from neighboring home networks by attenuating the MoCA home network signals at the home network's point of entry. Deployment of well-designed POE filters can prevent neighboring MoCA home networks from seeing each other and protect a MoCA home network from any eavesdropping. Additionally, POE filters may be installed in a MoCA network to improve connectivity with their 0 dB return loss in the MoCA frequency band. MoCA home network signals that are incident on the POE filter may reflect, with no loss contribution from the POE filter, back into the home network, and may result in a stronger MoCA signal if the reflected path has lower loss than the original path.

POE filters are often installed to provide optimal MoCA home network security and performance and are often located at a tap spigot, groundblock, or as close as possible point of the WAN side of a root splitter or drop amplifier input. POE filters aren't always included in all installations or are inadvertently removed by clients after installation. Determining whether a POE filter is installed may be performed prior to or during MoCA home network activation as a preemptive measure and provide real time feedback to an on-site technician or client. Determining whether a POE filter is installed may be performed after activation as a remedial measure. Various methods for detecting POE filters in home networks may be utilized.

The diagnostics server 302 may detect the presence (or absence) of POE filters, prior to a bridging event occurring, by analyzing a broadcasted continuous wave (CW) signal received by either a DOCSIS 3.1 or MoCA enabled CPE. CW signals may be used to perform RF alignment in access networks. The continuous wave signal may be centered within, or slightly above, an access network (e.g., HFC) passband and, for example, broadcasted from a provider headend to one, some and/or all clients. Other continuous waves, which may be used for RF signal alignment, may exist within a provider's downstream signal loading.

The access network may be designed to deliver 0 dBmV over frequency, of all downstream signals, to all CPE, though some variation is expected. Downstream RF levels may range between +10 to −8 dBmV, based on, for example, Broadband Recommended Installation Standards (BRIS). CWs used for RF alignment purposes may be maintained to be slightly higher than their service delivering signal counterparts.

Figure 9A:
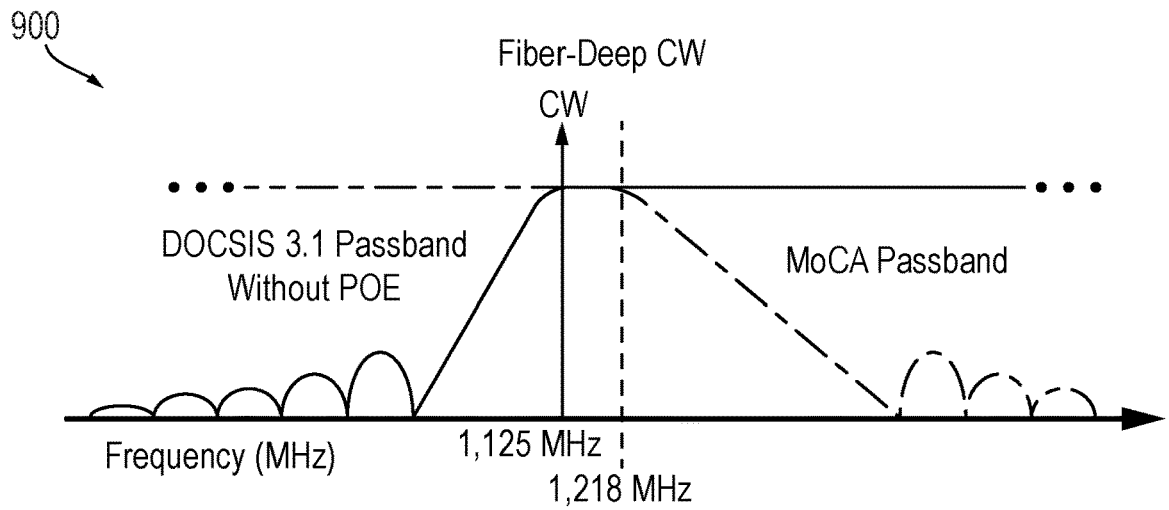
FIGS. 9A-9C show example graphical illustrations of continuous waves with respect to path loss.
Figure 9B:
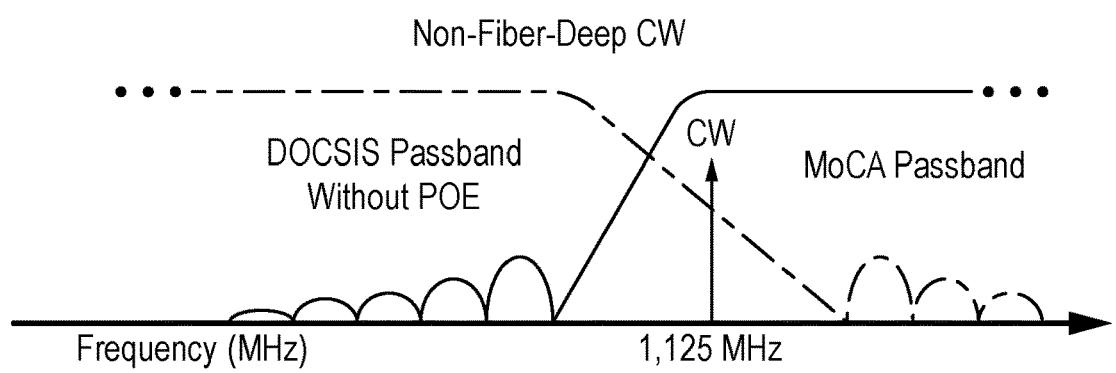
Figure 9C:
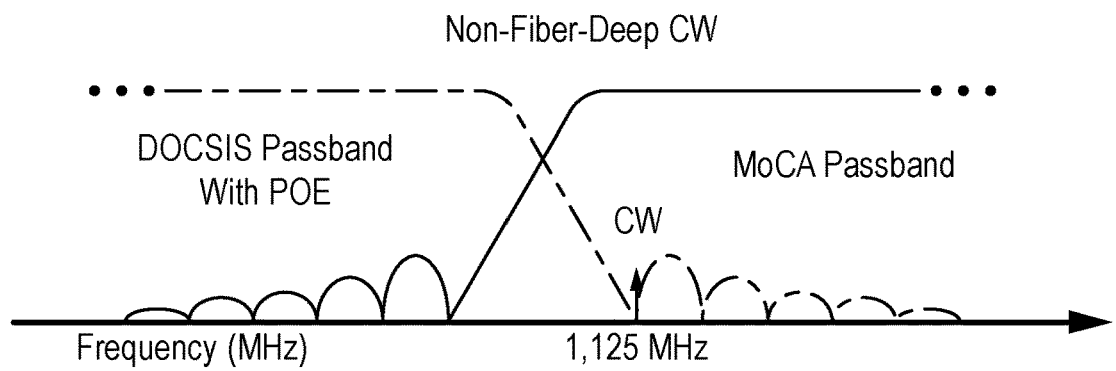

A unique path loss (PL) associated with each client deployment may be used in determining the downstream RF receive level to client premise equipment, which may vary with drop length and equipment used, including, for example, passive devices, amplifiers, and POE filters, within the home networks. FIGS. 9A-9C illustrate graphical representations of continuous wave signals and path loss across different networks. For example, FIG. 9A shows a Fiber Deep network 900 with DOCSIS 3.1 passband without POE. Fiber Deep networks (e.g., DOCSIS 3.1) will likely exhibit the lowest PL because such networks may be designed to support up to 1,218 MHz pass band, with design budget allowances for up to 200' of RG11 drop cable and four outlets, path loss should be at its lowest below the start of the MoCA operating band, or 1,125 MHz.

Above 1,125 MHz the POE lowpass filter response may attenuate signals coming into or out of a home in order to isolate MoCA home networks from one another. Therefore, the broadcasted CW receive level may be attenuated below the expected receive level range previously discussed by at least 40 dB or more, depending on the POE filter design. FIG. 9A shows a home network with a missing POE filter. In such an example, the downstream passband between 1,002 and 1,218 MHz may be used by DOCSIS 3.1. When no MoCA POE filter is installed, the CW will pass through both the access and home network with attenuation expected for all downstream access network signals, and detectable by home CPE capable of operating at 1,125 MHz (e.g., MoCA nodes).

FIG. 9B shows a Non Fiber Deep network 902 with DOCSIS Passband without POE. Non Fiber Deep networks, with a downstream upper edge of 1,002 MHz, may exhibit more path loss than Fiber Deep, due to roll off experienced above 1,002 MHz, but may be less than POE enabled homes, 2 dB≤path loss≤40 dB.

Correctly installed POE filters may exhibit more attenuation above the POE filter cutoff range (e.g., 1,002 MHz). POE filters may provide a stopband attenuation of at least 40 dB starting at 1,125 MHz. Acceptable methods for missing POE filter detection may involve defining CW downstream receive power as the KPI for the deployment population and establishing known thresholds for this value when POE filters are correctly installed. Remote detection of the POE filter may be performed by first collecting an estimate from all MoCA nodes within a subscriber home network, and determining whether the CW receive power is lower than a population threshold, for example −40 dBmV.

As described herein, MoCA SNMP MIB can be used to detect missing POE filters. Through either analyzing channel characteristics including ripple or tilt responses, which are further described herein, or by detecting broadcasted CWs in the access network, MoCA nodes may provide valuable information regarding the contribution of a correctly installed POE filter.

Figure 10:
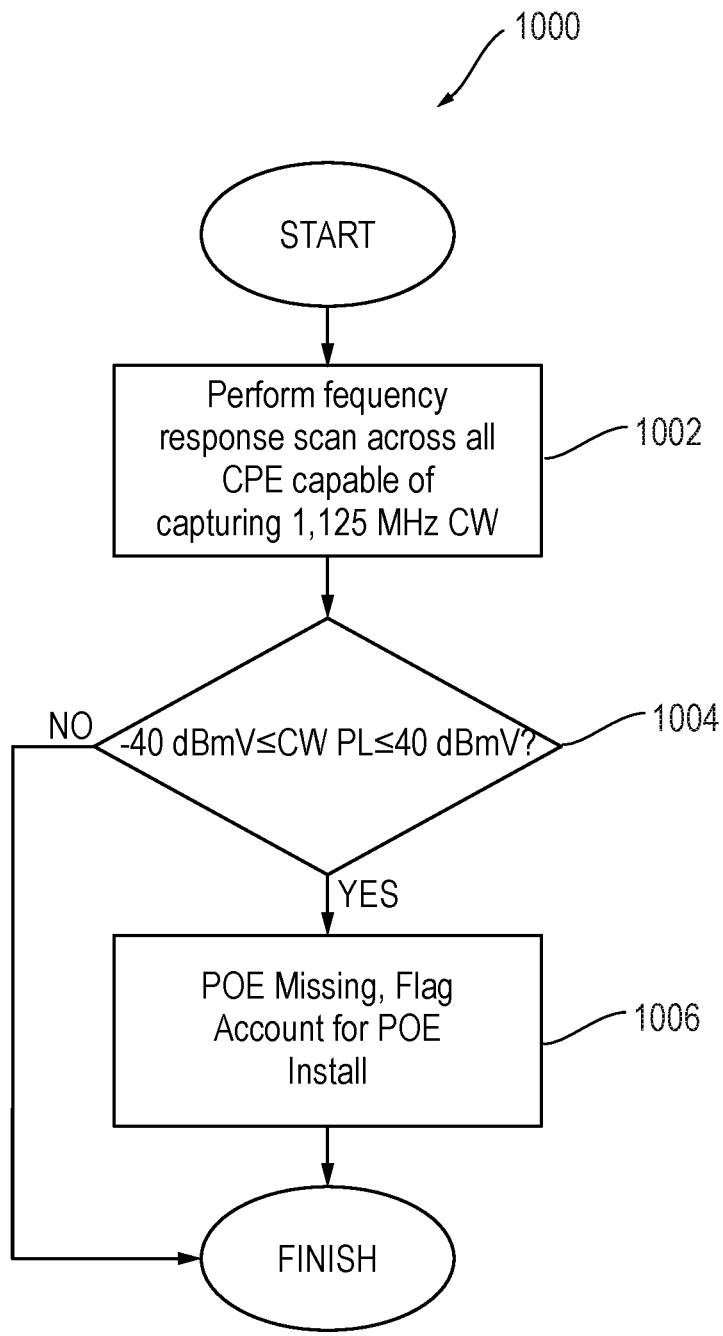
FIG. 10 is a flow chart showing a method for determining whether a point of entry filter is installed in a home network.

FIG. 9C shows a Non Fiber Deep network 904 with DOCSIS Passband with POE. POE enabled homes may exhibit higher path loss because of the installed POE filter, which provides a stopband attenuation of, for example, at least 40 dB, path loss>>>40 dB. Thresholds may be adjusted slightly to account for statistical variations associated with specific implementations, such as varying continuous wave center frequencies, and home network technology deployments FIG. 10 shows a method 1000 to identify whether a POE filter is installed in a home network. The example method 1000 begins at block 1002, where a frequency response scan across some or all client premise equipment may be initiated that is capable of capturing a first frequency band (e.g., 1,125 MHz continuous wave). A broadcast continuous wave center frequency may be selected such that path loss is minimized and visibility among future DOCSIS 3.1 and/or current MoCA enabled devices is maintained. A broadcast continuous wave RF level may be used that it is aligned with the system loading, thereby resulting in an ideal reception of 0 dBmV within the home of a client.

A continuous wave downstream receive power estimate may be collected from a future DOCSIS 3.1 CM, and/or current MoCA node. DOCSIS 3.1 client premise equipment may support a downstream upper edge of 1,218 MHz, and may be capable of estimating continuous wave power via Full Band Capture (FBC). MoCA client premise equipment may support a passband lower edge of 1,125 MHz, and may be capable of estimating continuous wave power via similar FBC functionality.

At block 1004, it may be determined whether the continuous wave path loss is between −40 dBmV and 40 dBmV. If it is determined that the continuous wave path loss is between −40 dBmV and 40 dBmV (block 1004: YES), then control proceeds to block 1006. At block 1006, an account associated with the home network in which the continuous wave path loss is measured between −40 dBmV and 40 may be indicated as not having a POE filter installed. An alert signal, a non-compliance report may be generated, and/or a request to install a POE for such a home may be transmitted. If it is determined that the continuous wave path loss is not between −40 dBmV and 40 dBmV (greater than 40 dB or lower than −40 dBmV) (block 1004: NO), then the home is flagged as having a POE filter installed. Thereafter, method 1000 ceases operation.

Figure 11A:
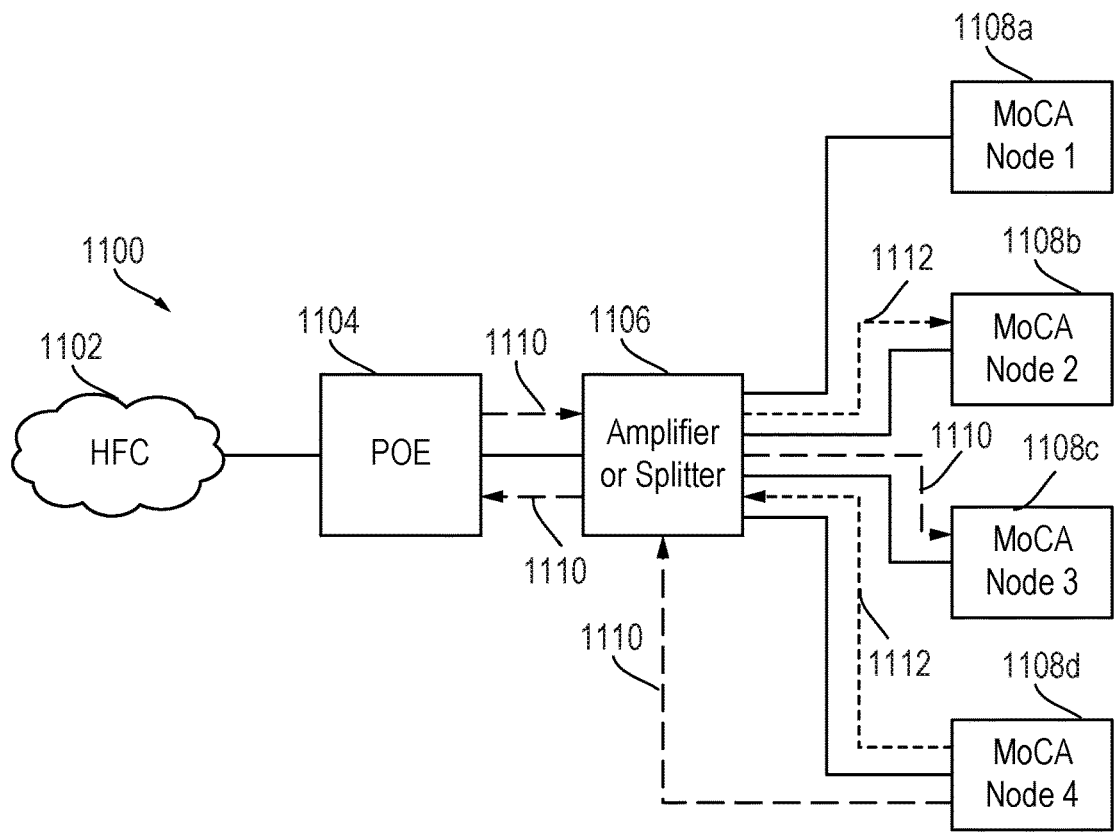
FIG. 11A shows an example graphical illustration of reflection paths within a home network.

MoCA channel tilt may be measured. FIG. 11A shows a graphical representation of network 1100 including a HFC network tap 1102, a POE filter 1104, an amplifier or splitter 1106, and a plurality of MoCA client device nodes 1108a, 1108b, 1108c, and 1108d. The diagnostics server 302 may detect the presence (or absence) of POE filters, prior to a bridging event occurring, by analyzing channel estimates of current generation MoCA enabled CPE.

MoCA client premise equipment in homes that have POE filters installed may have channel responses that include a first (POE reflection) path 1110 from a first MoCA client device node 1108d through the amplifier or splitter 1106, to the POE filter 1104, back through the amplifier or splitter 1106, and to a second MoCA client device node 1108c, which may be the dominant, or least loss path, and strongest when the POE is integrated into a root device. A root device may be a MoCA compatible drop amplifier or splitter, resulting in increased tilt from insertion loss instead of the OP2OP isolation. It may be beneficial to differentiate between MoCA friendly drop amplifiers and splitters versus non-MoCA friendly equivalents because any suckouts present in non-MoCA friendly devices may corrupt the POE filter detection process. Accordingly, compatible home network devices with more predictable RF performance throughout the MoCA band may be first identified before attempting to detect the presence of POE filters. If a POE filter is present, a confirmation signal may be generated and sent to central office and/or field technicians. First path 1110 may result in increased tilt from either the amplifier or passive device insertion loss.

MoCA client premise equipment installed in homes without POE filters may depend largely on OP2OP isolation of the root device. A second path 1112, from the first MoCA client device node 1108d, to the amplifier or splitter 1106, and to the second MoCA client device node 1108c. Second path 1112 may be a flat loss over frequency for MoCA-friendly amplifiers and passives. This may result in less tilt than first path 1110.

Detecting installed POE filters may include analyzing the forward tilt observed across MoCA devices. The approach may be similar to CCDF approaches, but the tilt analysis may aggregate tilt measurements into a CCDF and compare those measured CCDFs to an established tilt threshold CCDF that is associated with installed POE filters. Threshold comparisons may be used to decide whether or not a POE filter has been installed by detecting the additional tilt, from a root device and cable, associated with the MoCA signals traversing the first path 1110. Threshold CCDF may be based on population measurements of POE filtered MoCA home networks and may converge to a minimum tilt value, where tilt is defined as the approximate linear variation over frequency across the MoCA operating band.

Figure 11B:
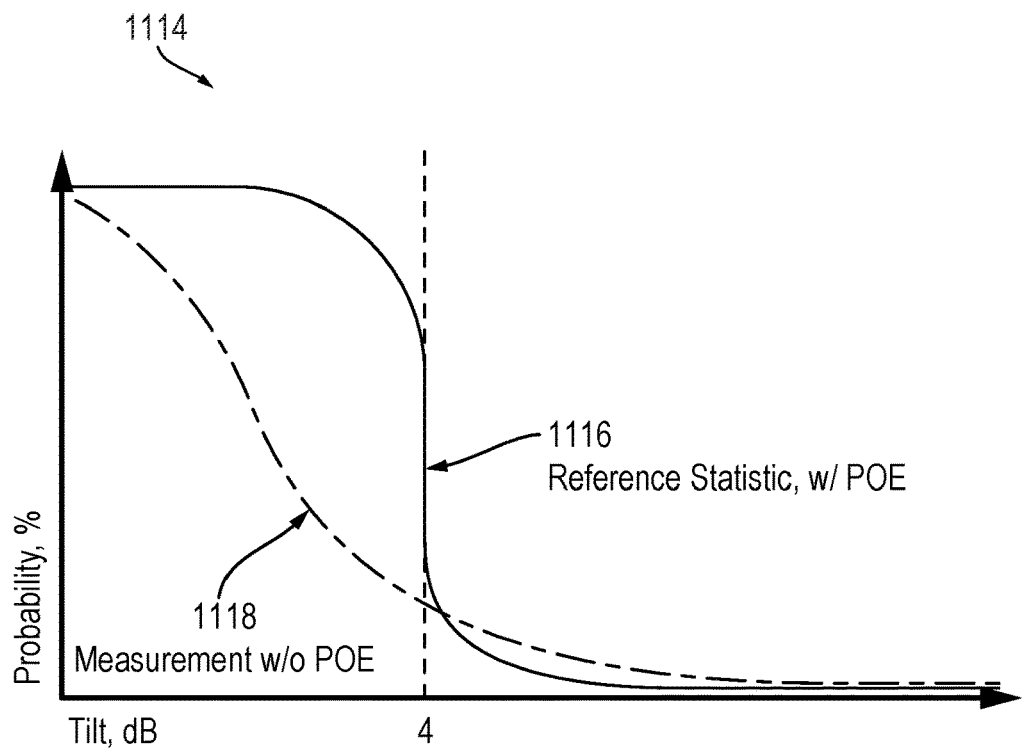
FIG. 11B shows an example graphical illustration of a result of the flow chart of FIG. 4A with respect to whether a home network comprises a point of entry filter.

FIG. 11B shows a graphical representation 1114 of a reference performance characteristic 1116 and a measured performance characteristic 1118. As shown in FIG. 11B, the measured performance characteristic 1118 corresponds to a network not comprising a POE filter. This methodology is utilized by the diagnostic server 302 described herein to identify home networks lacking POE filters and other network structure and performance impairments. Attenuation increases with frequency in the insertion loss of coaxial cable, drop amplifiers, and splitters. Vendors design drop amplifiers and splitters to meet a constant OP2OP isolation value across frequency. Such attenuation over frequency details may enable cable operators to distinguish whether any given network may be dominated by OP2OP isolation or insertion loss, where a CCDF observation with less forward tilt may reveal its average tilt to be lower than the population threshold.

Figure 12:
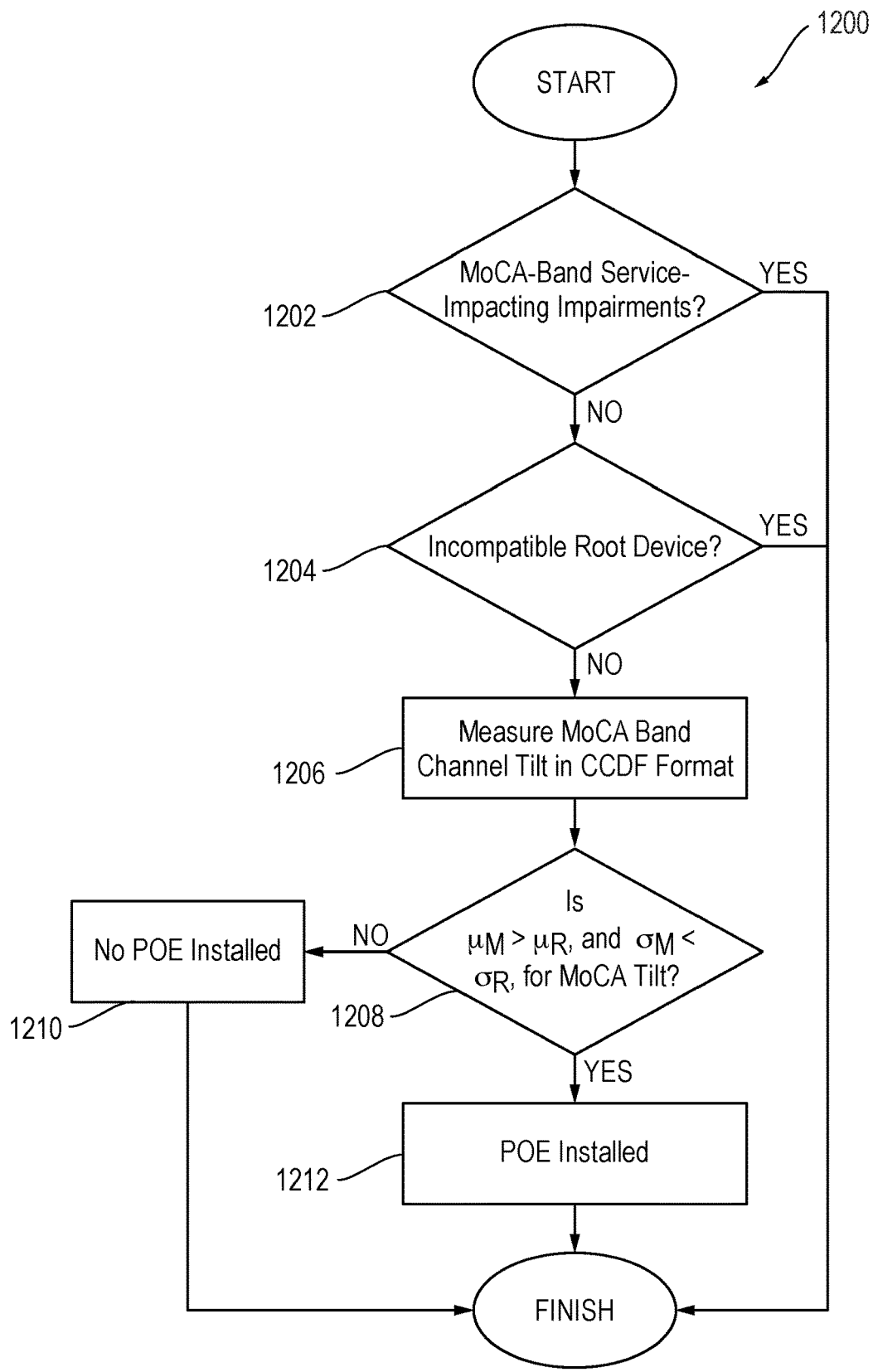
FIG. 12 is a flow chart showing a method for determining whether a point of entry filter is installed in a home network.
Figure 18:
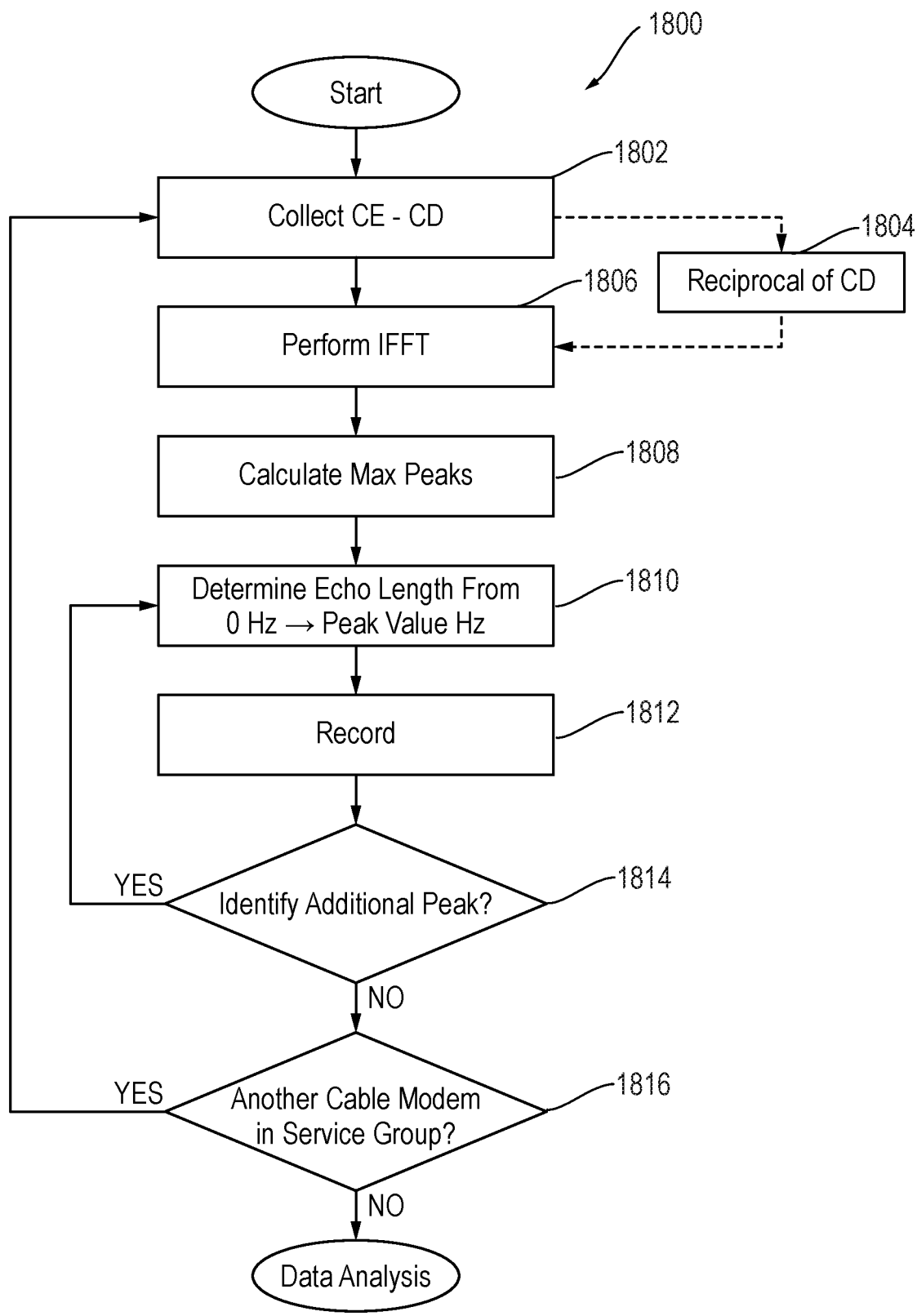
FIG. 18 is a flow chart showing a method for determining whether a home network contains service-impacting impairments.

FIG. 12 shows a method 1200 to determine whether a POE filter is installed in a home network. Method 1200 begins at block 1202, where it is determined whether the MoCA network contains service-impacting impairments. FIG. 18 describes a determination as to whether the MoCA network contains service-impacting impairments. If it is determined that the MoCA network contains service-impacting impairments (block 1202: YES), then method 1200 ceases operation. If it is determined that the MoCA network does not contain service-impacting impairments (block 1202: NO), control proceeds to block 1204.

At block 1204, it may be determined whether the MoCA network contains any incompatible devices. FIG. 7 describes a determination as to whether the MoCA network contains any incompatible devices. If it is determined that the MoCA network contains any incompatible devices (block 1204: YES), then a noncompliance report may be generated and method 1200 ceases operation. If it is determined that the MoCA network does not contain any incompatible devices (block 1204: NO), control proceeds to block 1206.

At block 1206, channel tilt is measured based on the channel estimates of all MoCA enabled devices. The tilt measurements may be aggregated into a single CCDF curve representing tilt probability. Measured tilt statistics may be compared to the tilt statistics associated to a reference threshold (4dB) representing POE reflected path tilt. Tilt statistics may be stored in the KPI database 318.

At block 1208, it may be determined whether measured tilt is less than a reference threshold. For example, it may be determined whether the mean measurement ($\mu M$) is greater than the mean reference ($\mu R$) and the standard deviation of the measurement ($\sigma M$) is less than the standard deviation of the reference ($\sigma R$) for the MoCA tilt.

If it is determined that $\mu M \leq \mu R$ or $\sigma M \geq \sigma R$ (block 1208: NO), then control proceeds to block 1210. At block 1210, it may be determined that a POE filter is not installed in the home network. If a POE filter is not present, an alert signal may be generated and sent to central office and/or field technicians. The method 1200 may cease operation.

If it is determined that $\mu M > \mu R$ and $\sigma M < \sigma R$ (block 1208: YES), then control proceeds to block 1212. At block 1212, it may be determined that a POE filter is installed in the home network. If a POE filter is present, a confirmation signal may be generated and sent to central office and/or field technicians. The method 1200 may cease operation.

Echoes may be detected in access networks and may be indicative of the presence of a POE filter. Specifically, because a POE filter comprises approximately 0 dB return loss, the POE filter will introduce additional MoCA signal propagation paths, whose net effect on the channel response will be a ripple, graphically represented as a magnitudinal spike exceeding a threshold. A ripple may be considered to be a negative feature in the Proactive Network Maintenance (PNM) mindset, because echoes in access networks usually means pairs of damaged or defective HFC components contributing to the generation of echoes.

Echoes in the MoCA home network may useful for detecting the existence of a POE filter. Detection of echoes within the MoCA home network may indicate that a POE filter has been successfully included in the MoCA home network activation. A POE filter MoCA channel response may have an appreciable ripple, while a MoCA channel response without a POE results in a much flatter channel response.

Figure 13:
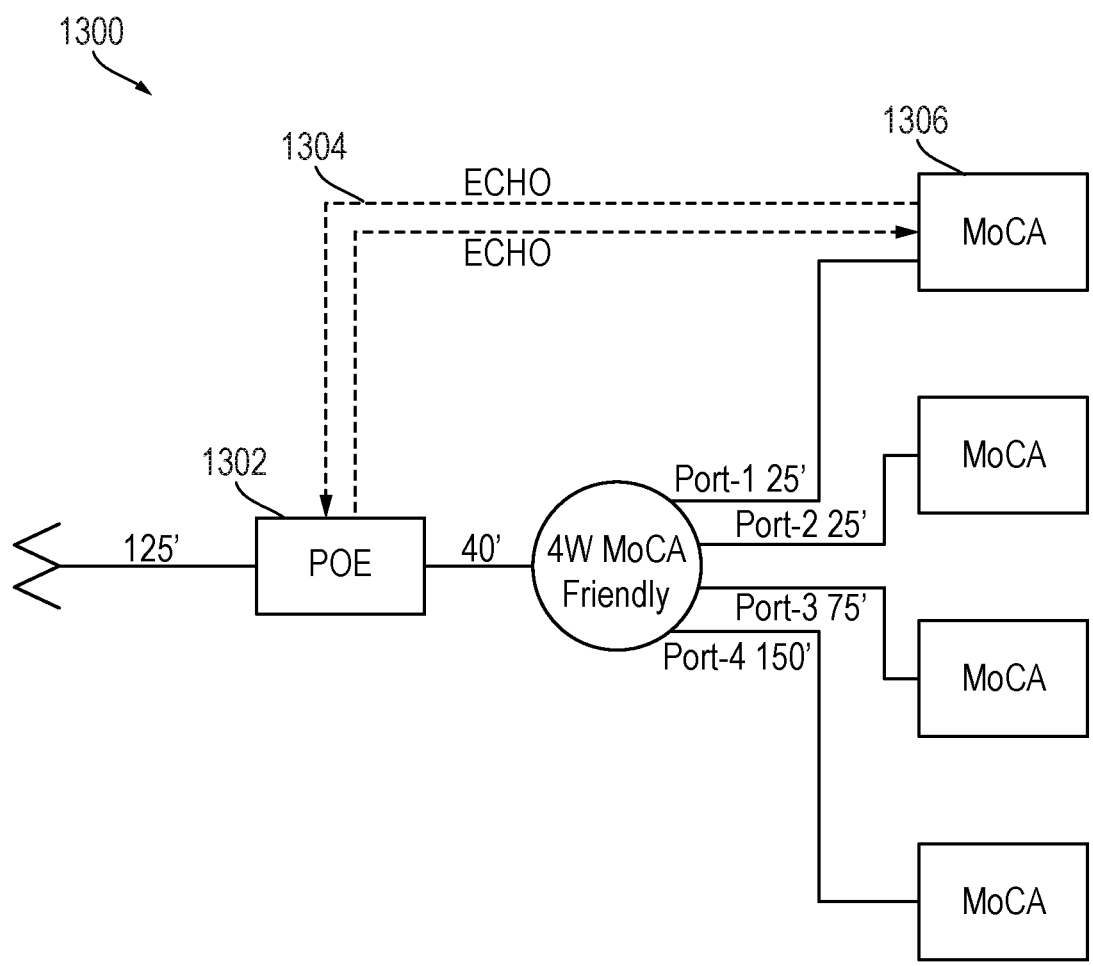
FIG. 13 shows an example graphical representation of a multimedia over coaxial alliance system with a point of entry filter and an echo response.

A POE in the home RF network may introduce a large spike or ripple that may be noticeable in the CE domain, more clearly than in a Frequency domain with granularity. Additionally, one may use Spectrum analysis (SA) and use magnitude values perform Fourier analysis (FA) to determine the "ripple" effect of an echo. FIG. 13 is a graphical representation of a MoCA system 1300 with a POE filter 1302 and an echo response 1304 between the POE filter 1302 and a MoCA enabled device 1306.

Fourier analysis may be utilized (e.g., by the diagnostics server 302) to acquire a frequency response and analyze the CE domain. Fourier analysis may utilize real values (e.g., $Real^2+Imaginary^2$) for a subcarrier magnitude. Fourier analysis may utilize complex Amplitude (Real)+Phase (Imaginary). The CE may provide the real-imaginary (RI) correction for individual subcarriers. Obtaining the RI may provide a time domain representation of the OFDM.

Figure 14A:
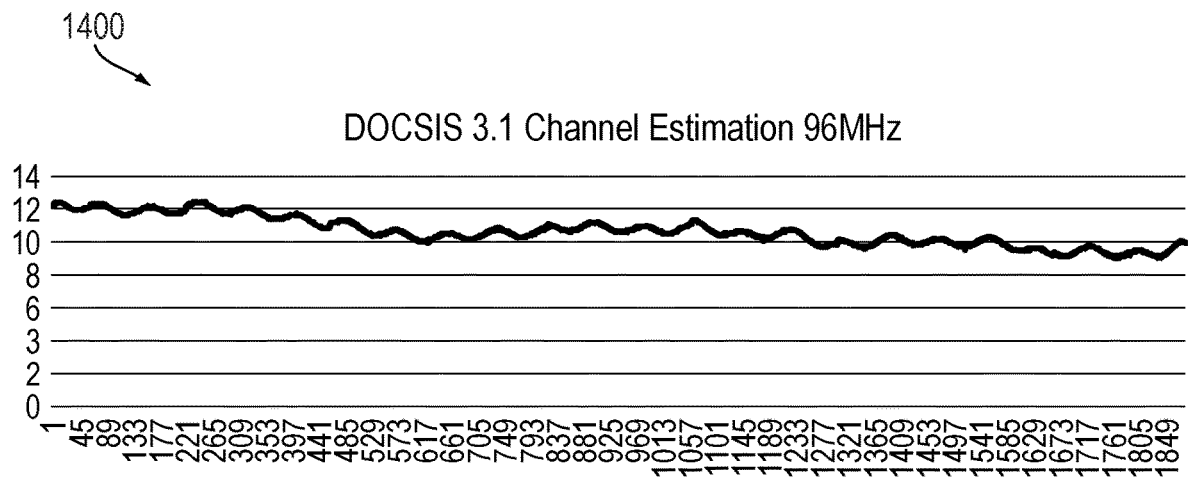
FIGS. 14A-14C and 15A-15B shows example illustrations of various version of channel estimation graphs.
Figure 14B:
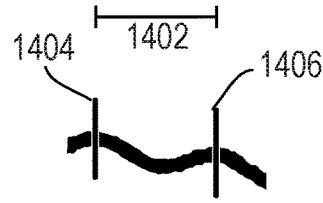
Figure 14C:
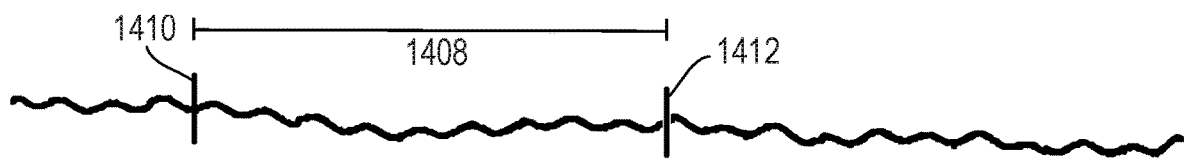

FIG. 14A shows and example DOCSIS 3.1 CE 1400. As shown in FIG. 14B, a first echo length 1402 may be determined by measuring between a first peak 1404 and a second peak 1406 of the CE 1400. Echo length 1402 may correspond to a short echo. In contrast, FIG. 14C shows a long echo having a second echo length 1408 between a third peak 1410 and a fourth peak 1412.

Figure 15A:
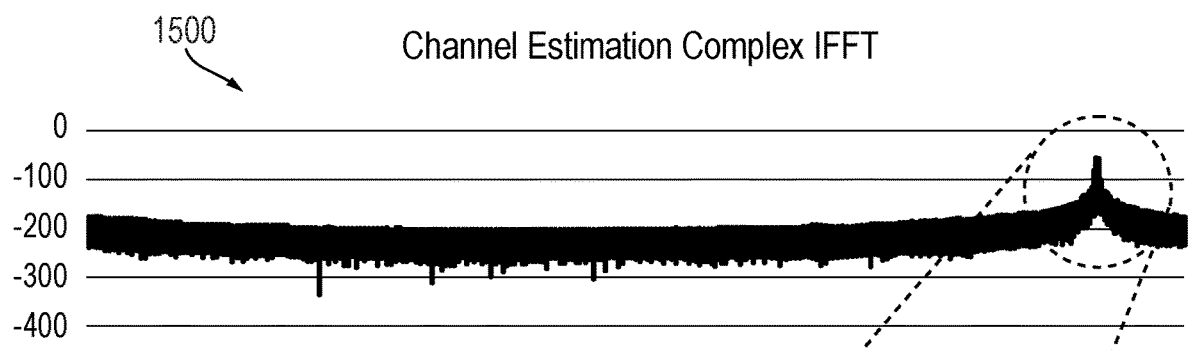
Figure 15B:
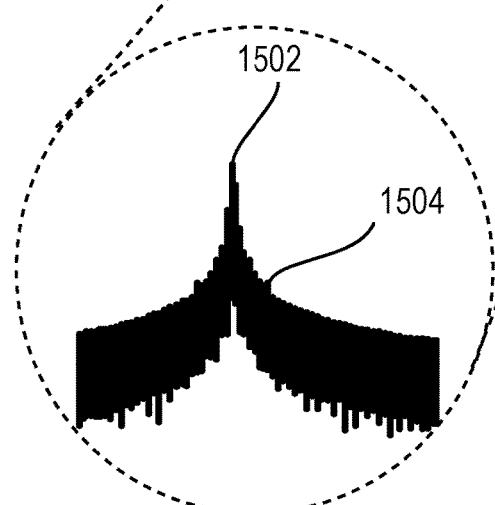

FIGS. 15A-15B illustrate an inverse fast Fourier transform (IFFT) 1500 of the channel estimation data 1400 described with reference to FIG. 14A to obtain a frequency response. As shown in FIG. 15B, IFFT 1500 shows a first echo 1502 (e.g., a short echo) and a second echo 1504 (e.g., a long echo). With this data, the relative expected response may be calculated when no POE is present.

Figure 16:
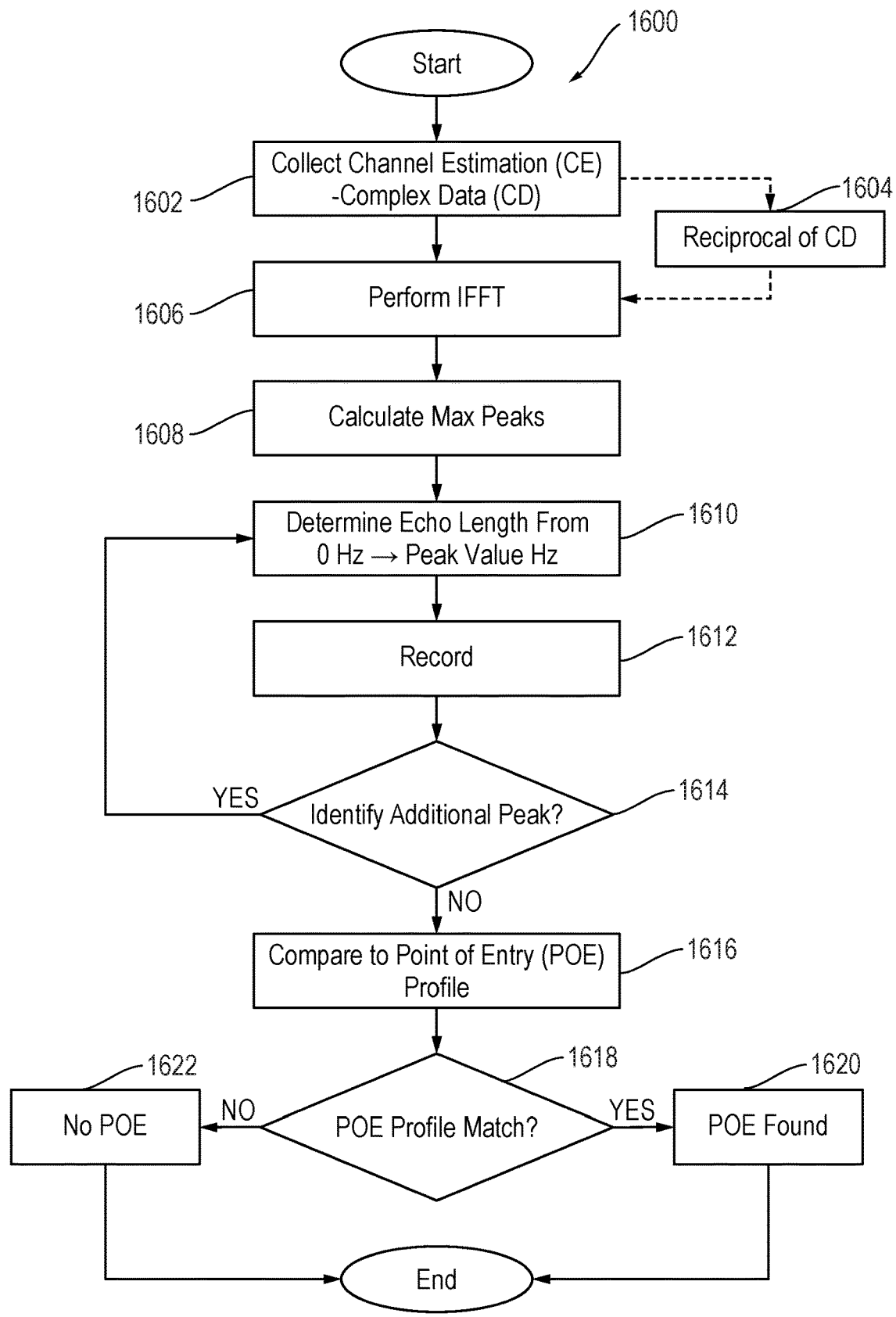
FIG. 16 is a flow chart showing a method for determining whether a point of entry filter is installed in a home network.

FIG. 16 shows a method 1600 to identify whether a POE filter is installed in a home network. Method 1600 begins at block 1602, where channel estimation complex data (CE-CD) may be collected for the home network. Channel estimation (CE) may play an important part in an orthogonal frequency division multiplexing (OFDM) system. CE may be used for increasing the capacity of orthogonal frequency division multiple access (OFDMA) systems by improving the system performance in terms of bit error rate. To facilitate the estimation of the channel characteristics, OFDM systems such as, for example, DOCSIS, Wi-Fi, long term evolution (LTE), and MoCA, use reference or pilot symbols inserted in both time and frequency. Pilot symbols may provide an estimate of the channel at given locations within a symbol time.

At optional block 1604, the reciprocal or compliment of the complex data may be determined. At block 1606, an inverse fast Fourier transform may be performed on the channel estimation complex data. At block 1608, the maximum peaks may be determined for the IFFT determined at block 1606. At block 1610, the echo length from 0 Hz to its peak value may be determined. For example, a first echo length may be determined, such as the one identified in FIG. 14B, which may be associated with the first echo 1502 indicated in FIG. 15B. At block 1612, the first echo length may be recorded in the KPI database 318. At block 1614, it may be determined whether there are any additional peaks, such as, for example, the second echo 1504 indicated in FIG. 15B. If it is determined that there are additional peaks (block 1614: YES), control returns to block 1610. If it is determined that there are no additional peaks (block 1614: NO), control proceeds to block 1616.

At block 1616, the recorded echo lengths may be compared to a POE profile. The POE profile may be stored within the KPI database 318. At block 1618, it may be determined whether a recorded echo length matches (e.g., is identical to or substantially similar to) the POE profile. If it is determined that the recorded echo length matches the POE profile (block 1618: YES), control proceeds to block 1620. At block 1620, it may be determined that the home network does have a POE filter. If a POE filter is present, a confirmation signal may be generated and sent to central office and/or field technicians. The method 1600 may cease operation.

If it is determined that a recorded echo length does not match the POE profile (block 1618: NO), control proceeds to block 1622. At block 1622, it may be determined that the home network does not have a POE filter. An alert signal or noncompliance report may be generated in response to determining that the home network does not have a POE filter. The method 1600 may cease operation.

Figure 17:
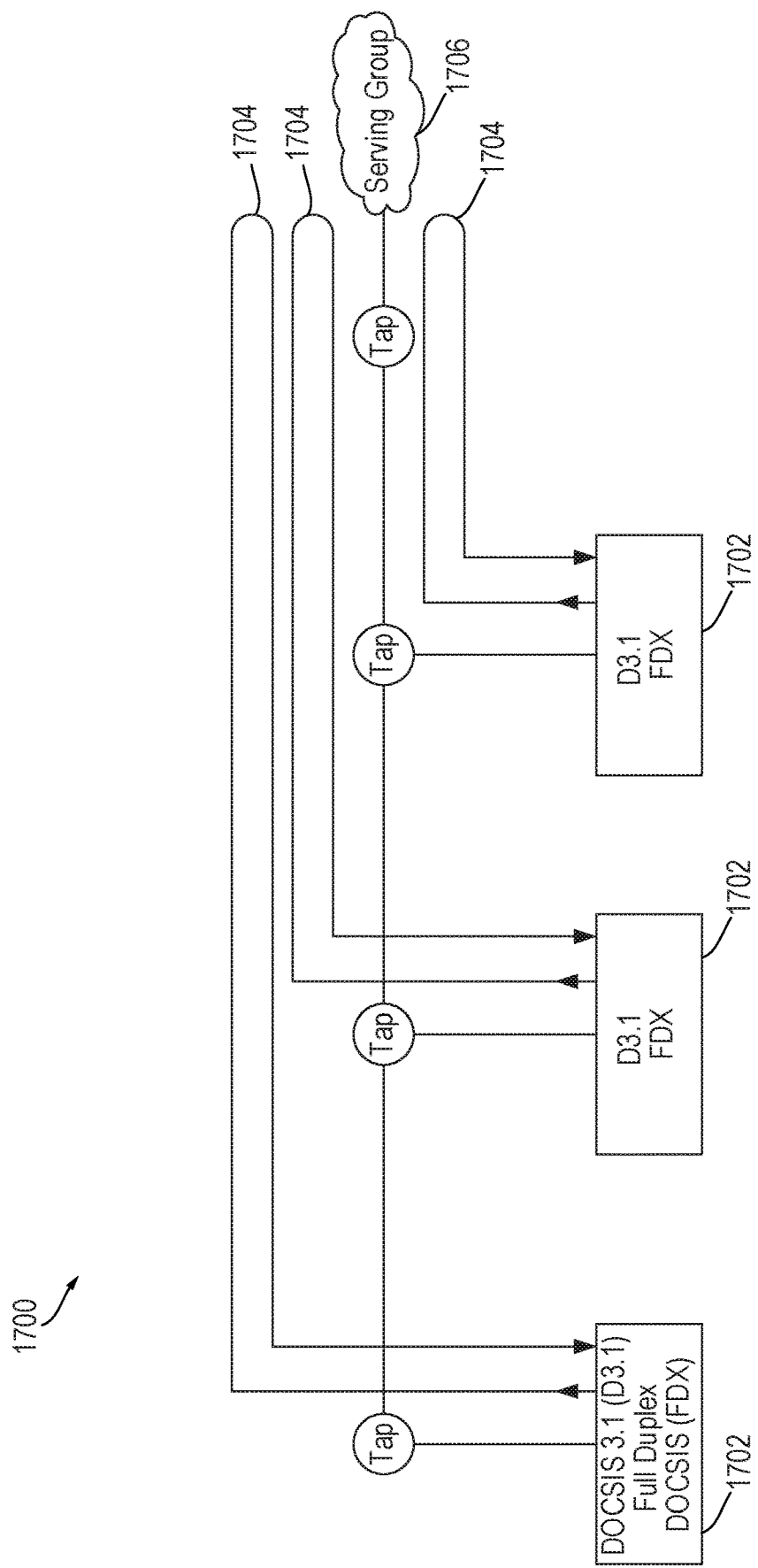
FIG. 17 show an examples of Data Over Cable Service Interface Specification devices and corresponding reflections.

FIG. 17 shows an environment 1700 comprising a plurality of DOCSIS 3.1 (D3.1) or Full Duplex DOCSIS devices (FDX) 1702, and their corresponding channel estimation reflections 1704 prior to reaching a serving group 1706. FIG. 18 shows a method 1800 to identify reflection points in a home network. Method 1800 may have a high probability to determine the distance from the source device to the reflection point. A reflection point in the HFC network may introduce a "ripple" effect that may be more noticeable in the CE domain than in a Frequency domain with granularity.

The example method 1800 begins at block 1802, where CE-CD may be collected for the home network. At optional block 1804, the reciprocal or compliment may be take of the complex data. At block 1806, an inverse fast Fourier transform may be performed on the channel estimation complex data. At block 1808, the maximum peaks may be determined for the IFFT determined at block 1806. At block 1810, the echo length may be determined from 0 Hz to its peak value. At block 1812, the first echo length maybe recorded in the KPI database 318. At block 1814, it may be determined whether there are any additional peaks. If it is determined that there are additional peaks (block 1814: YES), control returns to block 1810. If it is determined that there are no additional peaks (block 1814: NO), control proceeds to block 1816.

At block 1816, it may be determined whether there is another cable modem in the service group. If it is determined that there is another cable modem in the service group (block 1816: YES), control returns to block 1802. Otherwise (block 1816: NO), data analysis is performed on the recorded echo lengths. The aforementioned data analysis may be similar to the data analysis described in reference to blocks 1616-1622 with respect to FIG. 16. Alternate echo detection algorithms may be utilized in connection with the aforementioned data analysis.

The aforementioned data analysis may include determining magnitude responses (MR) and reflection points (RP) as shown in graphical representations of FIGS. 19A-19F. For example, performing an IFFT of the respective CEs may be useful in identifying the RP. FIGS. 19A-19F illustrate multiple examples of multiple CEs with varying echo delays and their corresponding IFFT waveforms.

Self-Install Kits (SIK) allow optimized deployment and operations. Deployed devices may be capable of remotely changing their diplex filter configuration from a standard split diplex to a midsplit diplex filter. The standard split diplex filter may support a return path of 5-42 MHz, or approximately a 30 Mbps upstream speed service tier. The midsplit diplex filter may support an expanded return path, or 5-85 MHz, which may enable provision of approximately 100 Mbps (or higher) upstream speed service tier to clients. Midsplit SIK success may depend on a provider's ability to qualify client home networks for enhanced capacity services.

A provider, via its installation practices, craftsmanship, and home network product performance may have a path loss, of at least 25 dB, between a first device and any video device. Use of many third party home network devices may result in a much lower path loss. Midsplit transmissions within the 54-85 MHz band can disrupt existing video services when the transmission power is approximately 20 dB higher than the video signal receive power, at the set top box receiver. Higher transmission power may cause many devices to become nonlinear via a phenomenon known as Adjacent Channel Interference (ACI) or more commonly known as ACI Susceptibility.

Figure 20:
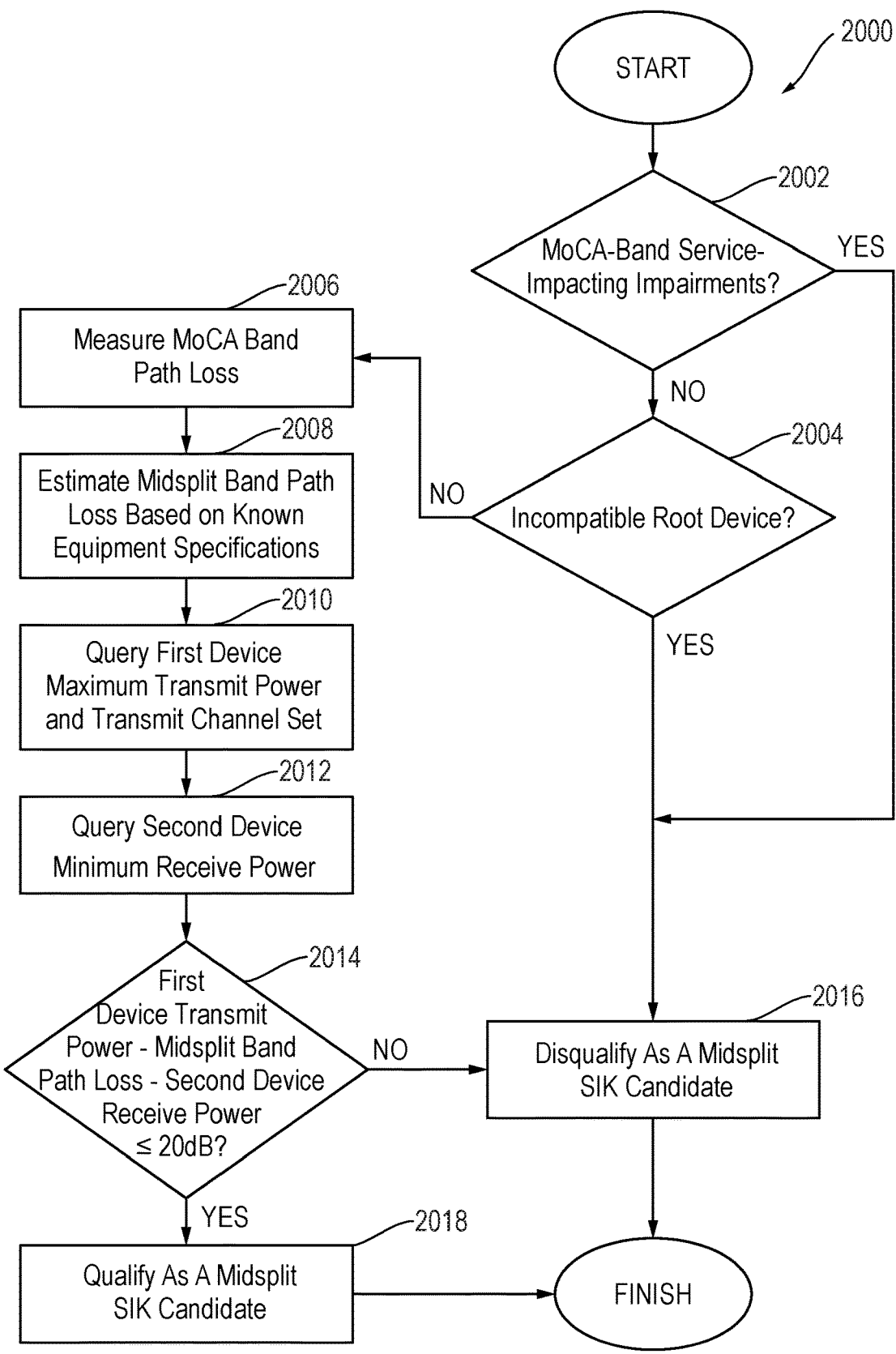
FIG. 20 is a flow chart showing a method for qualifying or disqualifying midsplit candidates.

FIG. 20 shows a method 2000 to remotely determine whether a client associated with a home network is qualified for Midsplit SIK. Example method 2000 may enable Midsplit SIK assessments by combining DOCSIS telemetry metrics with an intra-client premise equipment path loss characterization enabled by MoCA channel estimation. Method 2000 begins at block 2002, where it may be determined whether the MoCA network contains service-impacting impairments. FIG. 18 shows a determination as to whether the MoCA network contains service-impacting impairments.

If it is determined that the MoCA network does not contain service-impacting impairments (block 2002: NO), then control proceeds to block 2004. At block 2004, it may be determined whether the MoCA network contains any incompatible devices. FIG. 7 shows a determination as to whether the MoCA network contains any incompatible devices. If it is determined that the MoCA network does not contain any incompatible devices (block 2004: NO), control proceeds to block 2006.

At block 2006, the MoCA band path loss may be measured. For example, the MoCA band path loss may be measured from a first device of the home network to a second device of the home network (e.g., an XB6 device to an XG1 device). Using passive and cable loss specifications over frequency, the MoCA band (1,125-1,675 MHz) path loss to midsplit band path loss may be extrapolated.

At block 2008, midsplit band path loss may be estimated based on known equipment specifications. At block 2010, the first device may be queried for maximum transmit power and transmit channel set. A 57 dBmV maximum DOCSIS transmit power may be presumed across 6 single carrier quadrature amplitude modulation (QAM) signals, or a 56 dBmV maximum DOCSIS transmit power across 8 single carrier QAM signals. At block 2012, the second device may be queried for minimum receive power.

At block 2014, it may be determined whether the transmit power determined at block 2010 minus the estimated midsplit band path loss determined at block 2008 minus the receive power determined at block 2012 is less than or equal to a first threshold (e.g., 20 decibels). If it is determined that the transmit power determined at block 2010 minus the estimated midsplit band path loss determined at block 2008 minus the receive power determined at block 2012 is greater than the first threshold (block 2015: NO), if it is determined that the MoCA network contains service-impacting impairments (block 2002: YES), or if it is determined that the MoCA network contains an incompatible device (block 2004: YES), then control proceeds to block 2016. At block 2016, it may be determined that the client associated with the home network including the first and second devices is disqualified as a midsplit SIK candidate. The method 2000 may cease operation.

If it is determined that the transmit power determined at block 2010 minus the estimated midsplit band path loss determined at block 2008 minus the receive power determined at block 2012 is less than or equal to the first threshold (block 2015: YES), control proceeds to block 2018. As block 2018, it may be determined that the client associated with the home network including the first and second devices is qualified as a midsplit SIK candidate. The method 2000 may cease operation.

Path loss estimates between client devices (e.g., a cable modem and set top boxes) may be determined in order to remotely assess whether a client may participate in midsplit self-install. Path loss estimates may be collected for the MoCA operating band using MoCA 2.0 SNMP MIB data associated with the ACA OIDs.

Path loss for the midsplit operating band may be estimated, based on a determination that no incompatible devices were detected in the MoCA home network using MoCA band path loss estimates combined with known product specifications for drop amplifiers, splitters, and drop cable. If a cable operator were to measure 20 dBmV receive level from a ACA EVM probe, then subtracting that value from the known transmit level of 55.75 dBmV may result in a MoCA path loss of approximately 35.75 dB. If a POE filter was detected and 4-way MoCA-friendly splitter was used, then the path loss may be dominated by the splitter's IL and not OP2OP isolation. A MoCA-friendly IL for the MoCA operating band may be 11.5 dB, and 4 dB less, or 7 dB, for midsplit operating band. 11.5 dB may be deducted twice from the path loss, because the MoCA signal may pass through the splitter twice when a POE filter is installed. It may be assumed that the remaining 12.75 dB comes from cable attenuation. RG6 drop cable has approximately 8 dB loss per 100 ft, in the MoCA band, resulting in an equivalent RG6 cable length of approximately 155 ft, Estimating the midsplit band loss, based on 2 dB loss per 100 ft, for the same length of cable may result in approximately 3 dB of cable attenuation. 3 dB of cable attenuation may be an estimated value and may not be a true representation of cable loss for a variety of reasons, for example, the POE filter and the root splitter may not be co-located. Additionally, the equivalent midsplit attenuation may be based on the OP2OP isolation of the splitter (e.g., 25 dB) because the midsplit signals may not reflect off the POE filter. Therefore, the midsplit path loss estimate may be 25 dB+3 dB=28 dB.

Whether there will be an ACI Susceptibility issue when activating a midsplit service may be estimate based on, for example, the midsplit path loss. The estimation may comprise querying the CM for its maximum transmit power or obtaining its maximum transmit power from the manufacturer specifications. A maximum upstream transmit power may be 57 dBmV per 6.4 MHz. The estimation may further comprise querying for a minimum set top box receive power (e.g., 0 dBmV per 6 MHz). A desired-to-undesired signal ratio (D/U) may then be estimated with the downstream set top signal being the desired signal, and the CM upstream transmit signal being the undesired signal according to equation 1.

Set top Box Desired to Undesired Ratio Estimate (D/U)    Equation 1

$$\frac{D}{U} = [U(\text{Upstream TransmatPower}) - D(\text{Downstream Receive Power})] - \text{Midsplit PL}$$

A D/U may be 57 dBmV–0 dBmV–28 dB=29 dB. Since the D/U is 9 dB higher than the previously discussed threshold of 20 dB, the home network may require remediation in order to support midsplit based services. Accordingly, this home network would not qualify for a SIK. Remediation may involve improving the isolation between the CM and set top boxes with enhanced isolation splitters providing OP2OP isolation of ≥35 dB or via notch filters, whose stop band attenuation may add ≥48 dB isolation. Both of the remediation approaches discussed would likely require field technician support.

ACA may be analyzed to identify areas of the occupied OFDM spectrum that are highly attenuated. This may result in a cost of lower subcarrier modulations, which may potentially lower the PHY/MAC rate link. Cable operators are migrating to MoCA-friendly Splitters (MFS). MFS may be reserved for clients that may have physical (PHY) layer issues. The MoCA 2.0 ACA feature may assist a customer account executive (CAE) or field technician in determining why the client is experiencing a PHY layer or an IP/Network connectivity issue.

A correction factor may be added so that the ACA response is analogous to a spectrum analyzer. The following example may involve a 4-way non-MoCA-friendly splitter (NMFS) where the ExD MoCA channel frequency response is not a flat spectral response.

Figure 21:
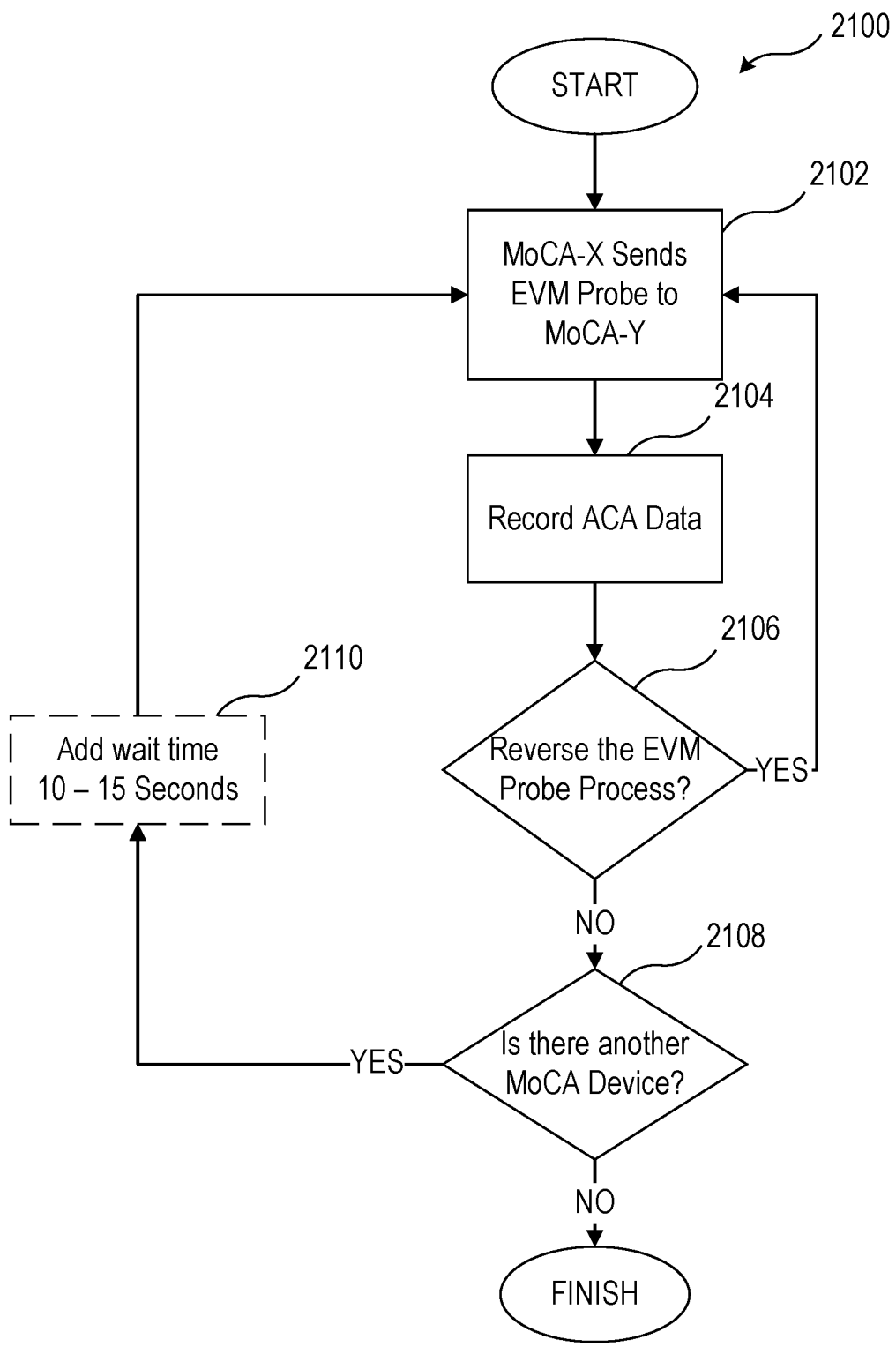
FIG. 21 is a flow chart showing a method for remotely monitoring probe data in a home network.

A flow chart 2100 for retrieving the ACA Error Vector Magnitude (EVM) probe data is shown and described with reference to FIG. 21. An ACA EVM probe may be performed with respect to each of the MoCA enabled devices.

At block 2102, an EVM probe may be initiated between a first device (e.g., MoCA-X) and a second device (e.g., MoCA-Y). For example, the first device may be assigned to send an EVM Probe to the second device. When initiating an EVM Probe between two MoCA endpoints, the MoCA network may be quiet, except for the two MoCA devices being evaluated. An EVM Probe may be performed from Channel D1 through D10, skipping the odd D-Channels (e.g., D3, D5, D7 and D9) to prevent an overlapping spectrum. All channels may be used to implement an overlapping spectrum.

Figure 25:
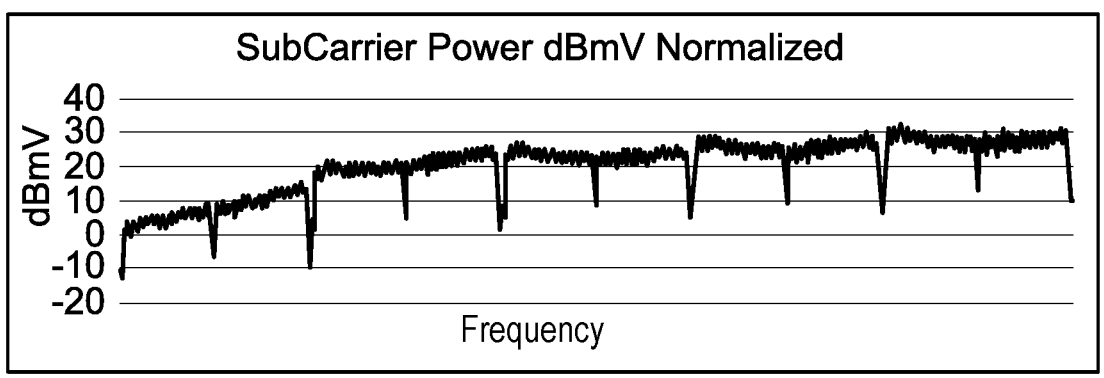

The EVM probe data may be normalized. When graphing the power levels over frequency, the EVM probe may appear to be a flat response, with possible oscillation, or ripples across the OFDMs, as shown in FIG. 25. A correction of the EVM probe data may be performed to get a better representation of the actual OP2OP isolation response. To normalize the EVM probe data, the actual measured 100 MHz receive power may be determined in dBm, including OFDM guard bands at the F-Connector (ACATotalRxPower) and the per-subcarrier processed receive EVM in dBm (ACA-PowerProfile).

The ACAPowerProfile OFDM subcarrier dBm EVM measurement may be integrated to calculate its total channel power according to equation 2 below:

$$EVM_{CPCalc}\,dBm = 10*\log_{10}\left(\sum_{n=0}^{EVMBin.size-1}\left[10^{\frac{EVMBin(n)}{10}}\right]\right) \qquad \text{Equation 2}$$

wherein:
EVMBin=The stored array of EVM Probe dBm levels from index $SubCarrer_0$ to index $SubCarrier_{N-1}$
$EVM_{CPCalc}$ in dBm=The Total Channel Power calculated from the EVM Probe Data The correction offset may be calculated according to equation 3 below:

if $EVM_{CPCalc}dBm < ACATotalRxPower$ $EVM_{Offset}=|EVM_{CPCalc}dBm+ACATotalRxPower\,dBm|$ else if $EVM_{CPCalc}dBm > ACATotalRxPower$ $EVM_{offset}dBm=|EVM_{CPCalc}dBm-ACATotalRxPower\,dBm|$ \qquad Equation 3

A correction offset may be applied to normalize the EVM Probe Data according to equation 4:
Iterate all subcarriers, i=0 . . . N $EVMBin_{Correction}(i)=EVMBin(i)+EVM_{Offset}\,dBm$ \qquad Equation 4

If the above results are in dBm, the results may be converted to dBmV according to equation 5:

$$dBmV = 10*\log_{10}\left(\frac{75\Omega}{1*10^{-3}}\right)+dBm \qquad \text{Equation 5}$$

Figure 26:
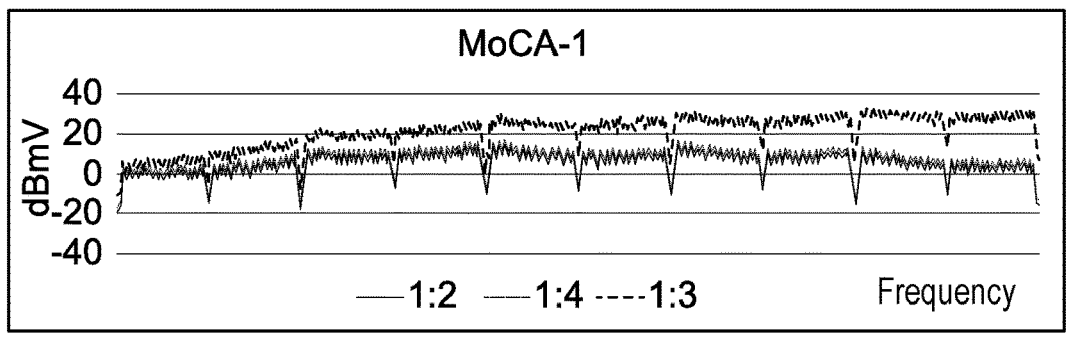

FIG. 26 shows the normalized EVM probe. FIGS. 27-30 represent the PTP EVM probe normalize responses. At block 2104 of FIG. 21, ACA data may be recorded. At block 2106, it may be determined whether to perform a reverse ACA EVM probe for detecting path loss asymmetry, which may be a condition associated with older generation, non-MoCA-friendly drop amplifiers, such as when using VoIP/passive port connections. Reverse ACA EVM probes may have a more precise average of the path loss because there may be differences among bidirectional paths. If it is determined to perform the reverse ACA EVM probe (block 2106: YES), then a reverse ACA EVM probe may be performed and control may return to block 2102. If it is determined to perform the reverse ACA EVM probe (block 2106: NO), then the reverse ACA EVM probe may be ignored and control proceeds to block 2108.

At block 2108, it may be determined whether there is another MoCA device. If it is determined that there is another MoCA device (block 2108: YES), then control proceeds to optional block 2110. At optional block 2110, a wait time (e.g., 10-15 seconds) may be added prior to returning to block 2102. If it is determined that there are no other MoCA devices (block 2108: NO), then process 2100 ceases operation.

Figure 22:
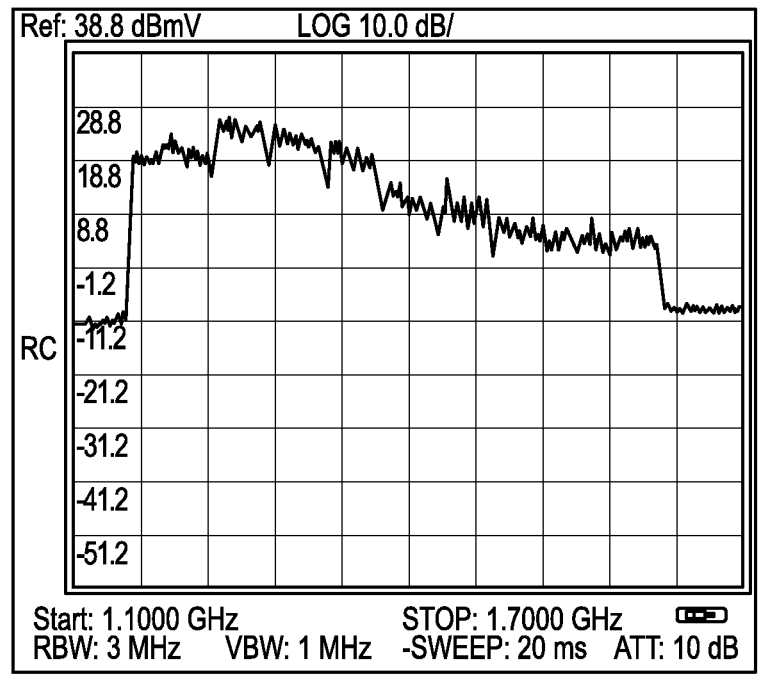
FIG. 22 shows an example graphical representation of an OP2OP isolation of MoCA ExD OFDM Beacon Signals from channels D1 thru D10.
Figure 23:
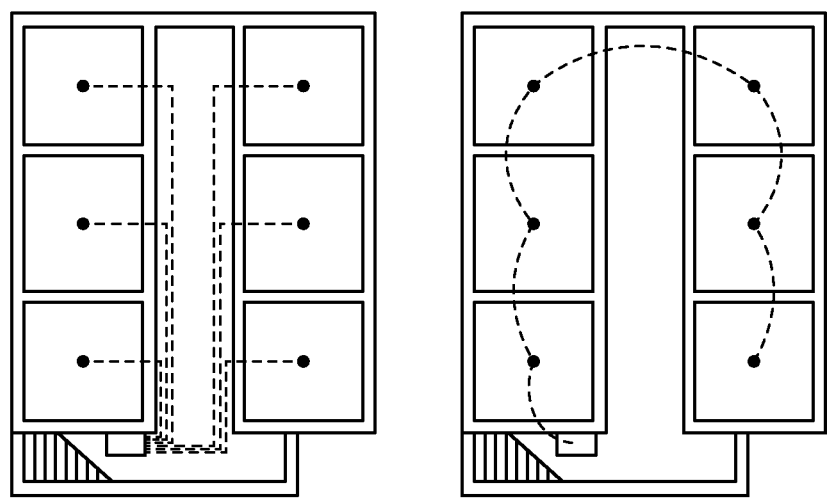
FIG. 23 shows an example graphical representation of a loop-through topology of a home network and a home-run topology of a home network.

FIG. 22 is a graph illustrating OP2OP isolation of MoCA ExD OFDM Beacon Signals from channels D1 thru D10. The shown example of FIG. 22 demonstrates the amount of attenuation loss a MoCA channel may experience. FIG. 22 may represent the summation of MoCA beacon used to establish a MoCA Network Link. FIG. 23 is a topology diagram illustrating a first network topology (e.g., loop-through) on the left and a second network topology (e.g., home-run) on the right.

Figure 24:
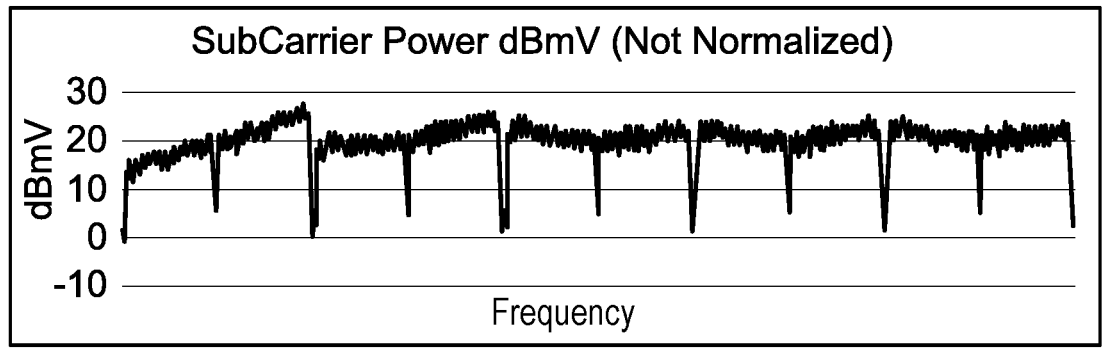
FIGS. 24-29 show example graphical representations of ACA EVM probe data as described herein.

FIG. 24 shows a graph of not normalized SubCarrier Power. FIG. 25 shows a normalized SubCarrior Power. FIG. 25 may be used to identify the effects of the MoCA RF communication channel based on tilt. This MoCA communication channel of FIGS. 24-25 may be dominated by OP2OP isolation, because there may be significant reverse tilt across the MoCA band. Reverse tilt, as shown in FIG. 25, may not be enough to diagnose incompatible splitters, because vendors may apply processing to compensate for the tilting effects observed in OP2OP isolation profiles.

Figure 27:
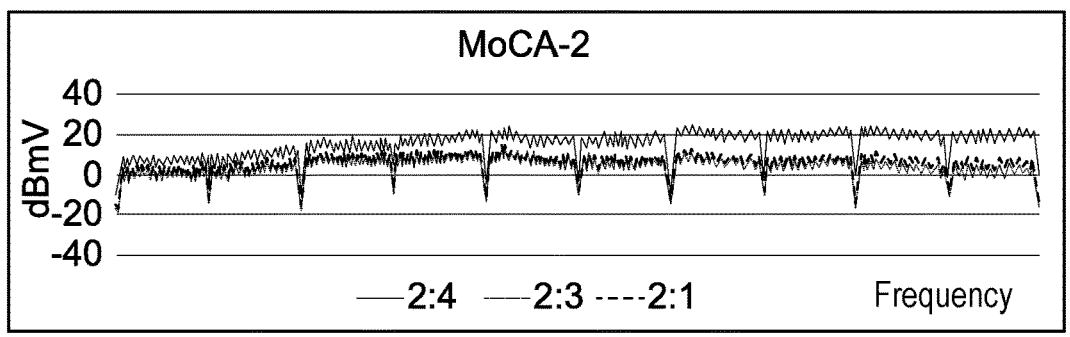
Figure 28:
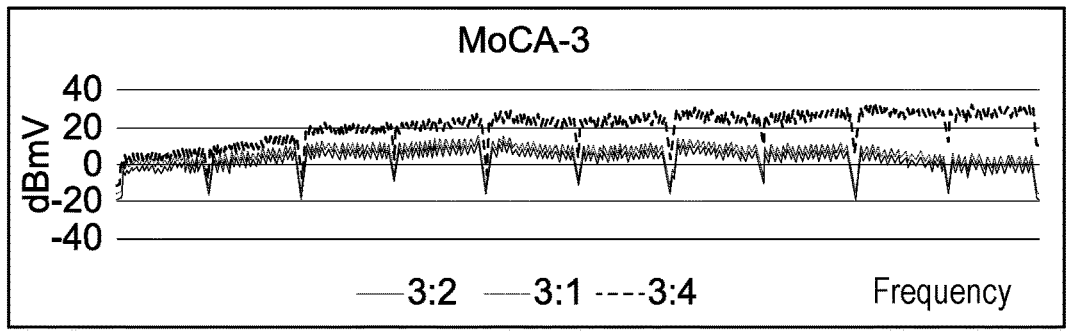
Figure 29:
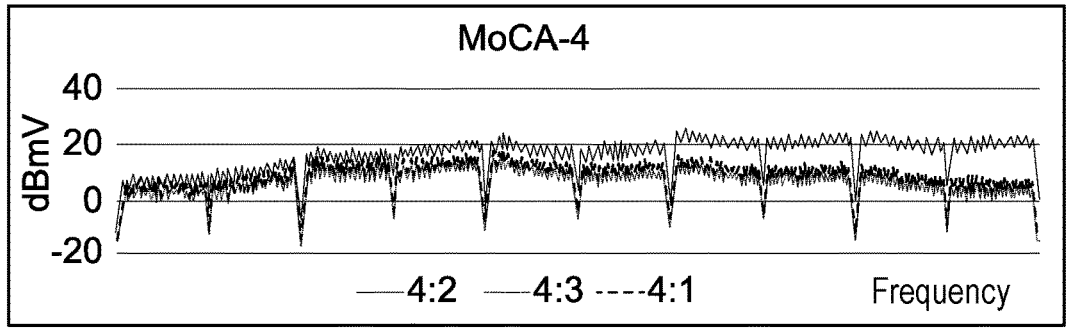
Figure 30:
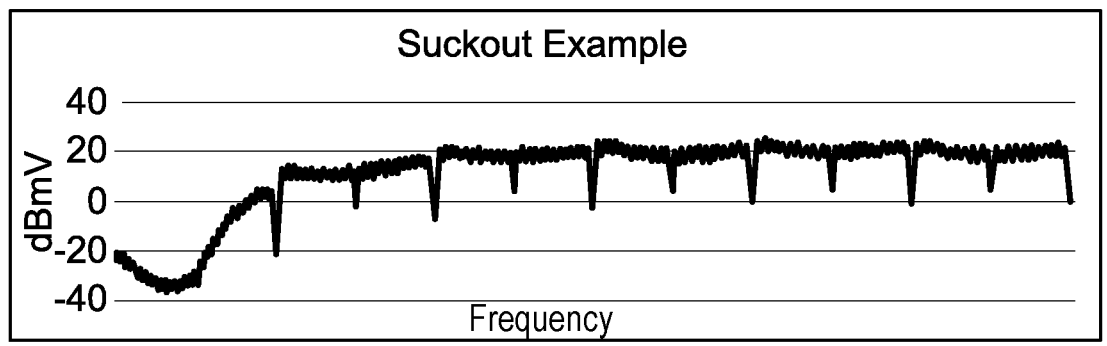
FIG. 30 shows an example suckout in a PTP EVM probe response.

The PTP EVM probe normalized responses may indicate an incompatible splitter for MoCA, and may represent some flatness after starting with D1. FIG. 26 may correspond to MoCA-1 PTP EVM Probe Overlay to MoCA-2, 3 and 4. FIG. 27 may correspond to MoCA-2 PTP EVM Probe Overlay to MoCA-1, 3 and 4. FIG. 28 may correspond to PTP EVM Probe Overlay to MoCA-1, 2 and 4. FIG. 29 may correspond to MoCA-4 PTP EVM Probe Overlay to MoCA-1, 2 and 4. FIG. 30 may correspond to PTP EVM Probe Showing HPF Edge, comprising a highly attenuated signal below D1. For example, the response in FIG. 30 may correspond to the lower edge of a high-pass filter (HPF), which allows only D1-D10 channel and rejects all frequencies below 1,150 MHz internal of the MoCA embedded device.

Figure 31:
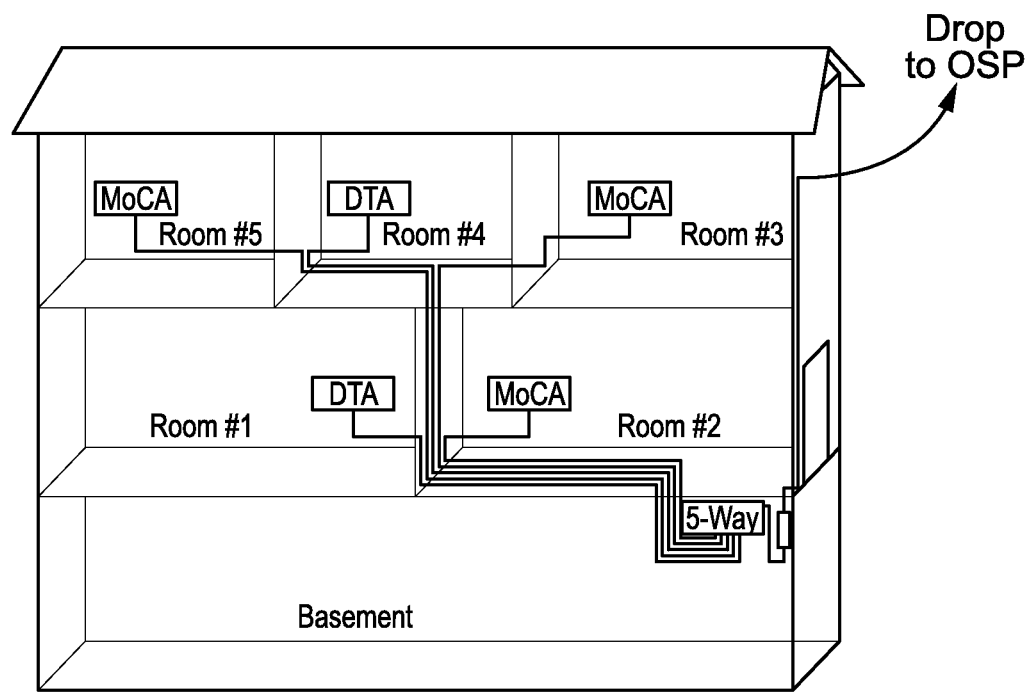
FIG. 31 shows a home network as described herein.
Figure 32:
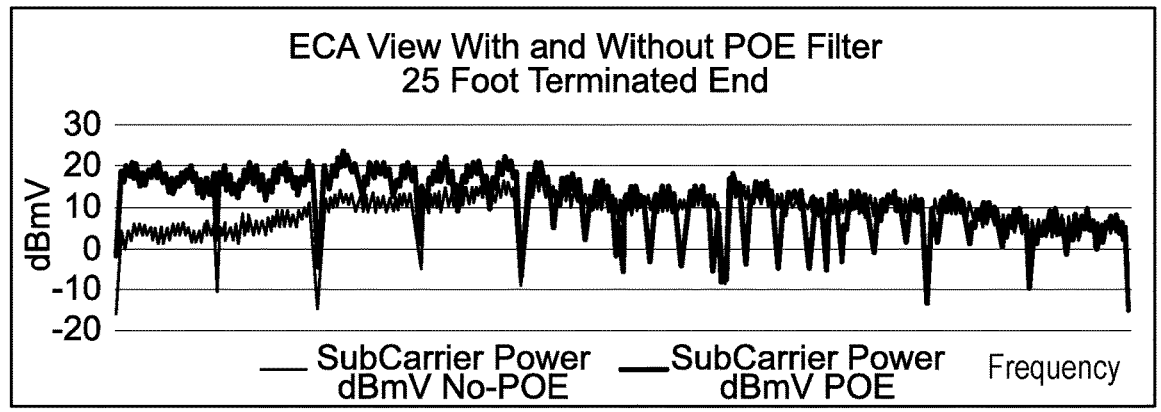
FIG. 32 shows a normalized MoCA RF channel response with and without a correctly installed POE filter.

FIG. 31 is a system diagram illustrating physical wiring of home network 3200 as described herein. FIG. 32 is a graphical representation of a normalized MoCA RF channel response with and without a correctly installed POE filter, which may correspond to an EVM probe PTP viewpoint with/without POE.

FIGS. 33-56 further describe various remote evaluation testing techniques in determining the MoCA in-home health assessment related to incompatible drop amplifiers, splitters (which may Non-MoCA Friendly (NMF)), and missing Point-of-Entry (POE) filters in addition to, based on, or as alternatives of the foregoing. If incompatible drop amplifiers, splitters (which may Non-MoCA Friendly (NMF)), or missing Point-of-Entry (POE) filters are identified, an alert signal or noncompliance report may be generated. The alert signal or noncompliance report may be sent to the central office and/or to field technicians. Alternate Channel Assessment (ACA) and Mesh Sub-Carrier Modulation (MeshScMod) techniques are described below. MoCA PNM data may be retrieved via SNMPv2 (or SNMPv3), WebPA and RDK Telemetry.

There are two types of ACA operations: Alternate Channel Quiet Line Assessment and Alternate Channel EVM Probe Assessment. One or more MoCA nodes (e.g., within homes and/or offices) may perform the Alternate Channel Quiet Line Assessment. At least two nodes may perform the Alternate Channel EVM Probe Assessment operation.

MoCA MeshScMod may include 512 subcarriers, where 32 of the subcarriers may be used in a guard band. The total number of usable sub-carriers may be 480. MoCA Mesh-ScMod may include three types of bit-load profiles: Very Low Packet Error Rate (VLPER), Nominal Packet Error Rate (NPER) and standard ScMod.

The performance manager 312 may perform the below example CLI procedure for operating and obtaining the ACA via SNMP.

TABLE 3

| ACA EVM | Quiet SNMP Calls | |
|---|---|
| Source NodeID for EVM Probe 0-15<br>0 = Quiet<br>1 = EVM | snmpset -v 2c -c <RW_String> -m all -M < MIB-DIR > udp6:<IPv6> mocaIfAcaNodeID.1 i <NodeID><br>snmpset -v 2c -c <RW_String> -m all -M < MIB-DIR > udp6:<IPv6> mocaIfAcaType.1 i <ACA_Probe_Type> |
| 1150 MHz = MoCA Chan <46><br>1150 MHz/25 MHz = 46 | snmpset -v 2c -c <RW_String> -m all -M <MIB-DIR> udp6:<IPv6> mocaIfAcaChannel.1 u <MoCA_Channel> |
| BitMask Convert to Binary<br>2NodeID = BitMask<br>0000000000000001 = NodeID: 0<br>Reporting HEX: 00 00 00 01<br>0000000000000010 = NodeID: 1<br>Reporting HEX: 00 00 00 02<br>0000000000000100 = NodeID: 2<br>Reporting HEX: 00 00 00 04<br>•<br>•<br>1000000000000000 = NodeID: 15<br>Reporting HEX: 80 00 00 00<br>Multi-Report-Node<br>000000000001001 = NodeID 0 + 3<br>00 00 00 09 = HEX (NodeID: 0 + 3) | snmpset -v 2c -c <RW_String> -m all -M <MIB-DIR> udp6:<IPv6> mocaIfAcaReportNodeMask.1 x "<00 00 00 01>" |
| | snmpset -v 2c -c <RW_String> -m all -M <MIB-DIR> udp6:<IPv6> mocaIfAcaInitiate.1 i <1 = Start_ACA_Process> |
| Poll until success(0) | snmpwalk -v 2c -c <RW_String> -m all -M <MIB-DIR> udp6:<IPv6> mocaIfAcaStatus.1<br>snmpwalk -v 2c -c <RW_String> -m all -M <MIB-DIR> udp6:<IPv6> MocaIfAcaEntry |

TABLE 4

| MoCAIfAcaEnry SNMP Call | |
|---|---|
| snmpwalk -v 2c c <RW_CommString> -m all -M <MIB-DIR> udp6:<IPv6> MocaIfAcaEntry | |
| | MOCA20-MIB::mocaIfAcaNodeID.1 = Gauge32: 1<br>MOCA20-MIB::mocaIfAcaChannel.1 = Gauge32: 46<br>MOCA20-MIB::mocaIfAcaReportNodeMask.1 = BITS: 00 00 00 01 31<br>MOCA20-MIB::mocaIfAcaInitiate.1 = INTEGER: 0 |
| MocaAcaStatus<br>DESCRIPTION<br>"Represents the status of the last Aca probe"<br>SYNTAX INTEGER {<br>success<br>(0),<br>fail-BADCHANNEL<br>(1),<br>fail-NOEVMPROBE   (2),<br>fail<br>(3),<br>in-PROGRESS<br>(4)<br>} | MOCA20-MIB::mocaIfAcaStatus.1 = INTEGER: success(0) |
| Result in dBm<br>Two's Compliment Representation.<br>Each return value is positive, but the actual value is negative.<br>Implementer requires to multiply by -1<br>0x2F = 47(-1) = -47 dBm | MOCA20-MIB::mocaIfAcaTotalRxPower.1 = INTEGER: -8<br>MOCA20-MIB::mocaIfAcaPowerProfile.1 = Hex-STRING: 2F 2F 2E 2F 2E 2D 2E 2D 2B 2B 2B 26 21 1C 1B 1B1C 1B 1B 1C 1A 1A 1C 1A 1B 1B 1A 1B 1B 1D 1C 1A 1A 1B 1B 1A 1A 19 1A 1B 1B 1B 19 1B 19 1A1B 1A 18 1A 1A 1A 1B 1A 1A 1A 19 19 19 19 1B 1A 1B 1A 1A 1A 1A 1B 1A 1A 1A 1B 1A 1A 1A 1A 1A1B 1B 1A 1A 1C 1B 1C 1B 1B 1B 1B 1B 1B 1B 1C 1D 1C 1C 1B 1C 1B 1B 1C 1B 1C 1B 1A 1B 1B 1C 1D1C 1C 1B 1B 1C 1C 1C 1B 1C 1B 1C 1D 1C 1D 1C 1B 1C 1C 1B 1D 1C 1B 1B 1D 1C 1B 1C 1C 1B 1C 1D 1B 1A 1C 1D 1C 1C 1C 1C 1C 1D 1C 1D 1B 1D 1D 1C 1D 1D 1C 1D 1C 1C 1D 1C 1C 1D 1D 1D 1C 1D 1D 1C 1E 1C 1C 1C 1D 1D 1D 1C 1D 1C 1C 1D 1C 1C 1D 1E 1C 1D 1C 1C 1C 1E 1C 1C 1C 1D 1D 1E 1C 1D 1D 1C 1D 1C 1D 1D 1E 1D 1C 1C 1D 1C 1C 1C 1C 1E 1C 1D 1C 1C 1C 1D 1C 1B 1D 1D 1D 1C 1B 1D 1C 1E 1D 1D 1D 1E 1D 1D 1E 1E 1E 1C 1D 1D 22 24 28 2C 26 2C 2A 27 1F 1D 1D 1E 1E 1E 1D 1D 1C 1D 1C 1D 1E 1D 1C 1C 1D 1C 1B 1E 1B 1B 1C 1B 1D 1C |

TABLE 4-continued

MoCAIfAcaEnry SNMP Call
snmpwalk -v 2c c <RW_CommString> -m all -M <MIB-DIR> udp6:<IPv6> MocaIfAcaEntry 1C 1C 1C 1C 1D 1C 1D 1C 1E 1D 1C 1C 1D 1C 1C 1C 1C 1D 1C
1C 1E 1C 1C 1B 1B 1F 1C 1C 1C 1C 1B 1C 1C 1C 1C 1D 1C 1D
1A 1D 1E 1D 1E 1C 1D 1D 1D 1C 1C 1B 1C 1D 1E 1A 1C 1A 1B
1B 1D 1C 1B 1D 1B 1B 1D 1C 1D 1D 1C 1D 1A 1C 1D 1C 1B
1D 1D 1D 1C 1B 1D 1C 1C 1C 1D 1C 1A 1A 1C 1C 1C 1C 1D
1C 1D 1C 1A 1C 1C 1C 1D 1C 1A 1B 1B 1D 1B 1A 1B 1B 1C 1C
1B 1C 1A 1B 1C 1C 1B 1A 1B 1B 1A 1A 1B 1B 1A 1B 1B 1C 1A
1A 1A 1A 1A 1B 1A 1B 1A 1A 1A 1B 1A 1A 1A 1A 1B 1A 1A
1A 1A 19 1A 1B 1A 1A 1A 1A 1C 19 1A 1A 1A 19 1A 19 19 1A
19 1A 1A 1A 19 19 19 1A 1B 19 1A 19 1A 1A 19 1A 19 18 1A 19
1A 1A 19 1A 19 19 1A 1A 1A 1A 19 19 1A 1A 1B 19 19 18 1A
1A 1A 1A 1A 1B 1A 1C 20 25 2A 29 2A 2C 2C 2C 2E 2E 2E 2E The below procedure may be performed for operating and obtaining the MeshScMod.

TABLE 5

Sub Carrier Modulation SNMP Calls
snmpwalk -v 2c -c <RW_CommString> -m all -M
<MIB-DIR> udp6:<IPv6> MOCA20-MIB::mocaMeshScMod HEX to Integer    MOCA20-MIB::mocaMeshScMod.1.0.1.0 = Hex-STRING: 00 00
00 00 08 08 09 0A 0A 0A 0A 0A 0A 0A 0A 0A0A 0A 0A 0A 0A
0A 0A 0A 0A 0A 0A 0A 09 09 09 09 09 09 09 09 09 09 09 09 09
09 0A 0A 0A 0A 0A 0A 0A 0A 0A 0A 0A 0A 0A 0A 0A 0A 0A
0A 0A 0A 0A 0A 0A 09 09 09 09 09 09 09 09 09 09 09 0A 0A
0A 0A 0A 0A 0A 0A 0A 0A 0A 0A 0A 0A 0A 0A 0A 0A 0A
0A 0A 0A 0A 0A 0A 0A 0A 0A 0A 0A 0A 0A 0A 09 0A 0A 0A
0A 0A 0A 0A 0A 0A 0A 0A 0A 0A 0A 0A 0A 0A 0A 0A 0A 0A
0A 0A 0A 0A 0A 0A 0A 0A 0A 0A 0A 0A 0A 0A 0A 09 09
0A 09 0A 0A 0A 0A 0A 0A 0A 0A 0A 0A 0A 0A 0A 0A 0A
0A 0A 0A 0A 0A 0A 0A 0A 0A 0A 0A 0A 0A 0A 0A 0A 0A
0A 09 0A 0A 0A 0A 0A 0A 0A 0A 0A 0A 0A 0A 0A 0A 0A
0A 0A 0A 0A 0A 0A 0A 0A 0A 0A 0A 0A 0A 0A 0A 0A 0A
0A 0A 0A 09 09 09 09 0A 09 09 0A 0A 0A 0A 0A 0A 0A 0A
0A 0A 00 00 00 00 00 00 00 00 00 00 00 00 00 00 00 00 00
00 00 00 00 00 00 07 07 08 08 07 07 07 07 06 06 06 05 06 06
06 07 07 08 08 08 09 09 09 09 09 09 09 09 09 09 09 09 09 09
09 09 09 09 09 09 09 09 08 08 08 07 07 07 07 07 08 08 09 09
09 09 0A 0A 0A 0A 0A 0A 0A 0A 0A 0A 0A 0A 0A 0A 0A 0A
0A 0A 0A 0A 09 09 09 09 08 08 07 07 06 07 07 07 08 09 09 09 0A
09 0A 0A 0A 0A 0A 0A 0A 0A 0A 0A 0A 0A 0A 0A 0A 0A
0A 0A 0A 09 09 09 08 08 08 08 08 08 09 09 09 09 0A 0A 0A
0A 0A 0A 0A 0A 0A 0A 0A 0A 0A 0A 0A 0A 0A 0A 0A 0A
0A 0A 0A 09 09 09 09 08 08 08 09 09 09 09 09 09 0A 0A 0A 0A
0A 0A 0A 0A 0A 0A 0A 0A 0A 0A 0A 0A 0A 0A 0A 0A 0A
0A 0A 0A 09 0A 09 09 09 09 09 09 09 09 09 09 09 0A 09 0A
0A 0A 0A 0A 0A 0A 0A 0A 0A 0A 0A 0A 0A 0A 0A 0A
0A 0A 09 09 09 09 09 08 08 08 08 07 00 00 00

In gathering data from a device via WebPa, all of the devices on the MoCA network may support the custom parameters of Table 6 and the behavior of said parameters may match the implementation of their SNMP counter-parts.

TABLE 6

| Name | Type | Write | Description |
| --- | --- | --- | --- |
| Device.MoCA.Interface.{i}.X_MOCALLIANCE_ORG_Aca. | object | — | [mocaIfAcaTable/1.3.6.1.4.1.31621.1.2.1.5] This diagnostic test may correspond to the MoCA ACA operation. When this test is requested, the managed MoCA Node may initiate a MoCA On Demand Link Maintenance Operation (LMO). |
| NodeID | unsignedInt-[0:15] | W | [mocaIfAcaNodeID/1.3.6.1.4.1.31621.1.2.1.5.1.1] [MocaNodeID] The Node ID of the MoCA Node may transmit the EVM Probe when the parameter type = evm. |

TABLE 6-continued

| Name | Type | Write | Description |
|---|---|---|---|
| Type | string | W | [mocaIfAcaType/1.3.6.1.4.1.31621.1.2.1.5.1.2] The ACA type may be either evm or quiet. Enumeration of:<br>quiet<br>evm |
| Channel | unsignedInt | W | [mocaIfAcaChannel/1.3.6.1.4.1.31621.1.2.1.5.1.3] The channel number under assessment, may start from 0 and increase in increments of 25 MHz. |
| ReportNodeMask | hexBinary(2:2) | W | [mocaIfAcaReportNodeMask/1.3.6.1.4.1.31621.1.2.1.5.1.4] Specifies the MoCA Nodes that are requested may be part of the channel assessment: may set bits corresponding to Node IDs of these MoCA Nodes to 1 (LSB may correspond to Node ID 0x0). |
| DiagnosticsState | string | W | May indicate the availability of diagnostics data. Enumeration of:<br>None (READONLY)<br>Requested (ACA operation requested and in progress)<br>Canceled (OPTIONAL)<br>Complete (ACA operation completed successfully, READONLY)<br>Error (ACA operation failed, READONLY)<br>Error_BadChannel (ACA operation failed because of bad channel, READONLY)<br>Error_NoEvmProbe (ACA operation failed because there was no Evm probe detected, READONLY)<br>If the ACS sets the value of this parameter to requested, the CPE may initiate the corresponding diagnostic test. When writing, the values requested and canceled may be allowed. To ensure the use of the proper test parameters (the writable parameters in this object), the test parameters may be set, and any errors or inconsistencies in the test parameters may be detected, prior to or at the same time as (in the same SetParameterValues) setting this parameter to requested.<br>When requested, the CPE may wait until after completion of the communication session with the ACS before starting the diagnostic test.<br>When the test is completed, the value of this parameter may be Complete (if the test completed successfully), or one of the Error values listed above. If the value of this parameter is not Complete, the values of the results parameters for this test may be indeterminate.<br>When the diagnostic initiated by the ACS is completed (successfully or not, but not canceled), the CPE may establish a new connection to the ACS to allow the ACS to view the results, which may indicate the Event code 8 DIAGNOSTICS COMPLETE in the Inform message.<br>After the diagnostic is complete, the values of all resulting parameters (e.g., all read-only parameters in this object) may be retained by the CPE until either this diagnostic is run again, or the CPE reboots. After a reboot, if the CPE has not retained the result parameters from the most recent test, it may set the value of this parameter to none.<br>Modifying any of the writable parameters in this object (except for this |

TABLE 6-continued

| Name | Type | Write | Description |
|------|------|-------|-------------|
| | | | one) may result in the value of this parameter being set to none. While the test is in progress, modifying any of the writable parameters in this object except for this one may result in the test being terminated and the value of this parameter being set to none. While the test is in progress, setting this parameter to requested (and possibly modifying other writable parameters in this object) may result in the test being terminated and then restarted using the current values of the test parameters. While the test is in progress, setting this parameter to canceled may result in the test being canceled and the value of this parameter being set to none. If the CPE does not support the canceled value, it may return a SPV error with "Invalid Parameter value" (9007) to the ACS instead. |

The ACA may be obtained via WebPa (or TR-069 custom namespace) using the CLI procedure described above (e.g., substituting WebPa for SNMP).

The ACA error vector magnitude (EVM) and QUIET probe data may be retrieved as described below. In a mesh environment, the user may apply the ACA EVM probe to each of the MoCA devices. The ACA probe may comprise 512 data points. Each data point may represent an OFDM subcarrier receive power in dBm. The first active subcarrier may be identified as the MoCA channel. For example, for the MoCA channel D1 (1150 MHz), the first active subcarrier may be 1150 MHz Users may ignore the reverse EVM probe path. The performance manager 312 may perform a reverse ACA EVM probe for detecting path loss asymmetry. Path loss asymmetry may be a condition associated with older generation non-MoCA-friendly drop amplifiers during VoIP/passive port connections.

Figure 33:
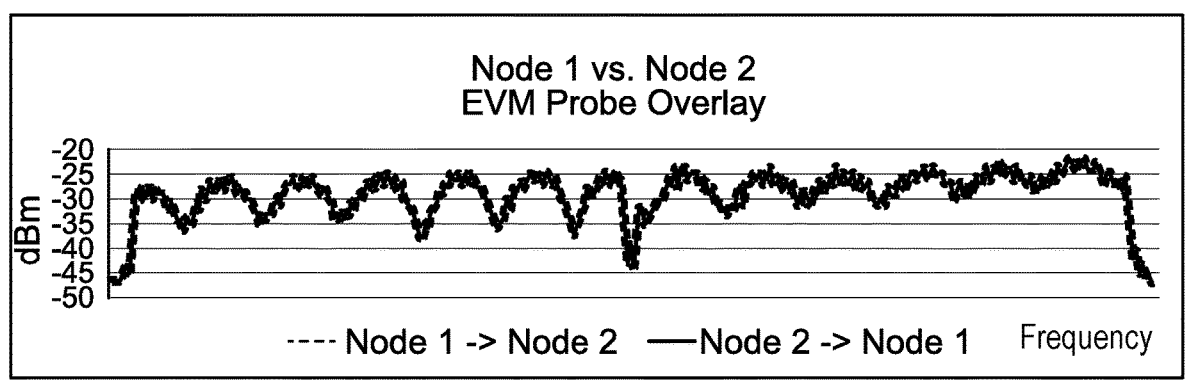
FIG. 33 shows an EVM probe overlay of two nodes.

FIG. 33 shows results of a bi-directional EVM probe. The additional EVM probe in the opposite direction may not be required. A bi-directional ACA may be warranted. The bi-directional PHY rate may be within 10-20 Mbps apart. As described herein, MoCA Mesh PHY Rate may be a key performance indicator (KPI). In of Table 7, Node1 (Transmitter (Tx))|Node2 (Receiver (Rx)) may be 149 Mbps, whereas the reverse may be 220 Mbps. Where the discrepancy is greater than 50 Mbps, a bi-directional ACA may be warranted to verify that there is not an RF impairment.

TABLE 7

| Full Mesh Rate (FMR) | | |
|---|---|---|
| Node | 1 | 2 |
| 1 | — | 220 Mbps |
| 2 | 149 Mbps | — |

An EVM Probe feature may be analogous to a Network Analyzer measuring the per-sub-carrier magnitude receive power in dBm on a per MoCA Channel basis. For MoCA 2.0, the MoCA channel bandwidth may be 100 MHz. An EVM probe may be a BPSK modulated signal using 32 different symbols. A Quite Probe may silence the MoCA network to measure any system noise within the MoCA channel selected.

Results of an EVM probe may be normalized. It may be required to perform a correction of the EVM probe data for a better representation of the actual OP2OP isolation. In this example, the system on a chip (SoC) implementation conducts an AGC of the receive EVM probe. When graphing the power levels over frequency (FIG. 24), it may appear to be a more flat response, with possible oscillation, or ripples across the OFDM. This may not correspond with what is happening on the wire. A correction of the EVM probe data may be performed to verify the actual response. For example, the EVM probe data may be normalized as discussed with reference to FIGS. 24-25 and equations 2-5. Normalization may utilize mocalfAcaTotalRxPower and mocalfAcaPowerProfile. MocalfAcaTotalRxPower may correspond to the actual measured 100 MHz receive power in dBm, including OFDM guard bands at the F-Connector, while mocalfAcaPowerProfile may correspond to the per-subcarrier processed receive EVM in dBm.

Observing the slope of the tilt may indicate the impedance reactance over frequency and/or the Node to Node spectral tilt frequency response. A calculated slope ratio close to 1:1 may point to a flat response. The percentage of the variable may indicate the splitter Port-to-Port performance over frequency. Simple Regression analysis may be used to check for tilt. An EVM ACA response may contain a total of 512 data points, which may include the OFDM guard bands. The Simple Regression calculation may take into account all 512 points. While determining the slope or tilt, the guard band subcarriers may be removed from the list of elements for a more accurate result. The sub carrier indexes may be as shown in Table 8.

TABLE 8

| MoCA 2.0 Guard Band Sub Carriers | |
|---|---|
| MoCA 2.0 Guard Band Subcarrier (32 SC) | |
| Lower Edge | 0, 1, 2, 3 |
| Center Sub Carriers | 244, 245, 246, 247, 248, 249, 250, 251, 252, 253, 254, 255, 256, 257, 258, 259, 260, 261, 262, 263, 264, 265, 266, 267, 268 |
| Upper Edge Sub Carriers | 509, 510, 511 |

Below is a method for determining tilt slope in pseudo code that may be implemented using a programming language such as Java:

TABLE 9

Example Tilt Slope Pseudo Code

```
public SimpleRegressionCalculation {
private SimpleRegression sr;
public SimpleRegressionCalculation (List<Double>
ldAcaEvmQuietData) {
       this.sr = new SimpleRegression(ldAcaEvmQuietData);
}
public List<Double> getTrendOrTilt( ) {
       ArrayList<Double> ldTrend = new ArrayList<Double>( );
       double dSlope = this.sr.getSlope( );
       double dInter = this.sr.getIntercept( );
       /* f(x) = (Slope * x) + Intercept */
       double x = 0;
       for (Double d : app.getAcaPowerProfile(false)) {
          ldTrend.add(((x++)*dSlope)+dInter);
       }
       return ldTrend;
       }
}
```

Slope delta may be determined by Equation 6:

$$Tilt_2[n-1] - Tilt_{1[0]} = SlopeDelta$$

where $n = ACA[x].length$

SlopeDelta>0=Positive Tilt

SlopeDelta<0=Negative Tilt        Equation 6 Slope Delta

Figure 34:
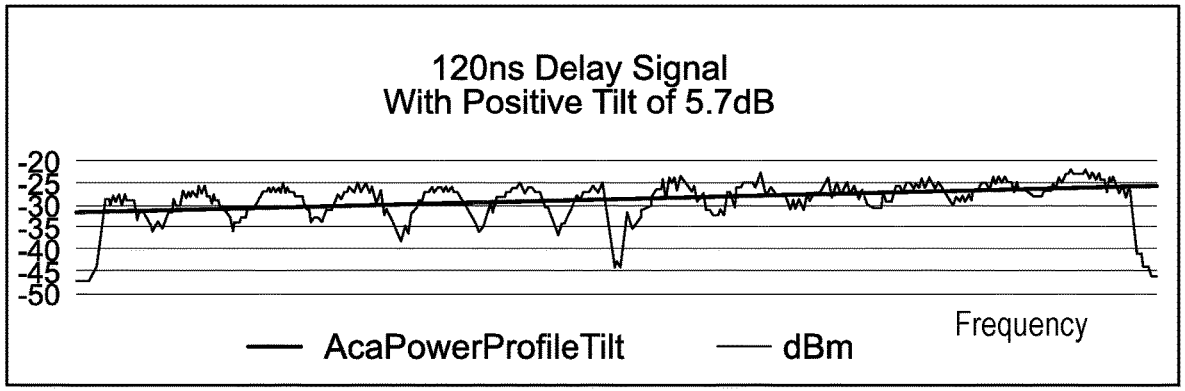
FIG. 34 shows a delay signal with positive tilt.

The Slope Delta may be an indication of the severity of the frequency response of the ACA over 100 MHz. FIG. 34 shows a slope delta where n=512. FIG. 34 may indication a 120 ns Delay Signal with Positive Tilt of 5.7 dB.

Inside a coaxial home network, and depending on the complexity of the splitter network, all transmitted signal may be subject to signal reflections interference. The delay of the signal and its overall composite power may contribute to the signal reflections interference. The composite power may be reduced by having a high return loss (RL) at the F-connector. The RL value may be the reduced level of the signal power in dB that the reflected signal may inject back into the coax network.

Ripples and Nulls in the ACA data may be the results of the reflected signal interacting with (e.g., canceling out) the original signal. The higher the composite power of the reflected signal, the deeper the nulls, or the higher the "Peak to Valley" ratio of the ripple. Nulls may appear on the left side and ripples may appear on the right.

Figure 35:
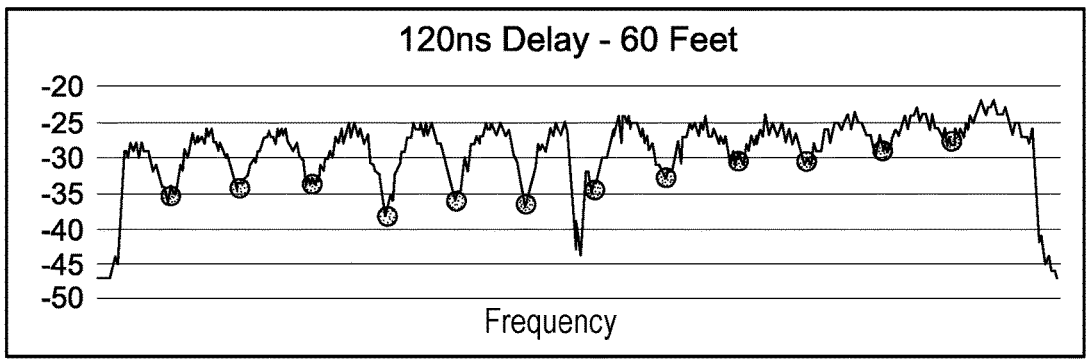
FIG. 35 shows an ACA response tilt.

In the shown example of FIG. 35, there may be twelve nulls or valleys in the ACA response. The signal delay and/or distance of the POE from the input of the root splitter may be approximated based on Equation 7.

Calculate Delay Signal in Time        Equation 7

$$\left[\frac{OFDM \text{ Occupied Bandwith}}{Number \text{ of } (Nulls | Peak | Valley)}\right]^{-1} =$$

Delay Signal in time $$\left[\frac{100 \text{ MHz}}{12(Null)}\right]^{-1} = 120 \text{ ns} = 120 \text{ feet}$$

RG6 Cable Speed of Light~ $\frac{1 \text{ ns}}{\text{feet}}$ $\frac{120 \text{ ns}}{2} = 60$ Feet assuming 120 ns of round trip delay Reflections may be detected via Line Cross-Section Method. ACA examples from strong to minimum reflections may be caused by a POE filter and/or configuration of the coax network. Once the ACA is collected from a MoCA reporting node, a grooming or normalization process may be utilized to prepare the raw ACA data for analysis.

Figure 36:
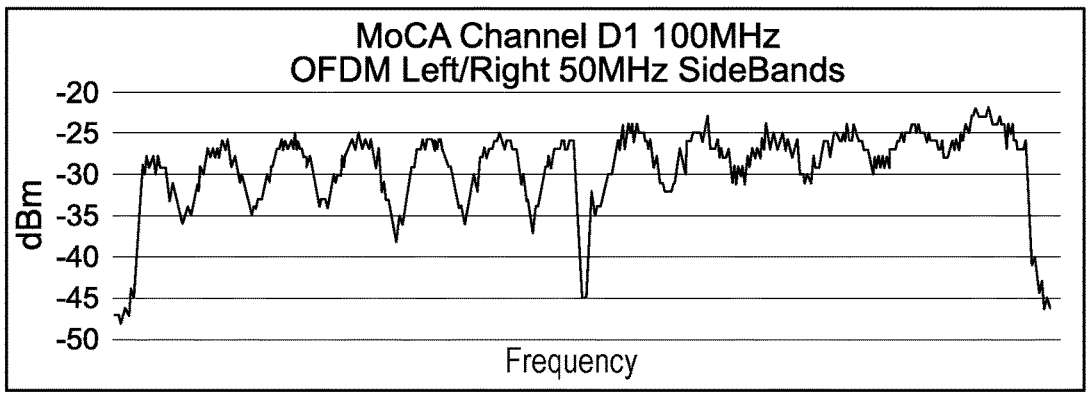
FIG. 36 shows an example of a MoCA channel OFDM tilt.

A MoCA 2.0 OFDM Channel may comprise of two OFDM blocks. FIG. 36 shows each (left/right) OFDM block at 50 MHz. A first step may be to separate the two OFDM blocks, and remove the subcarrier guard bands that are defined in Table 8. The resulting data may include the EVM probe magnitude points as depicted in FIGS. 39-42.

Figure 37:
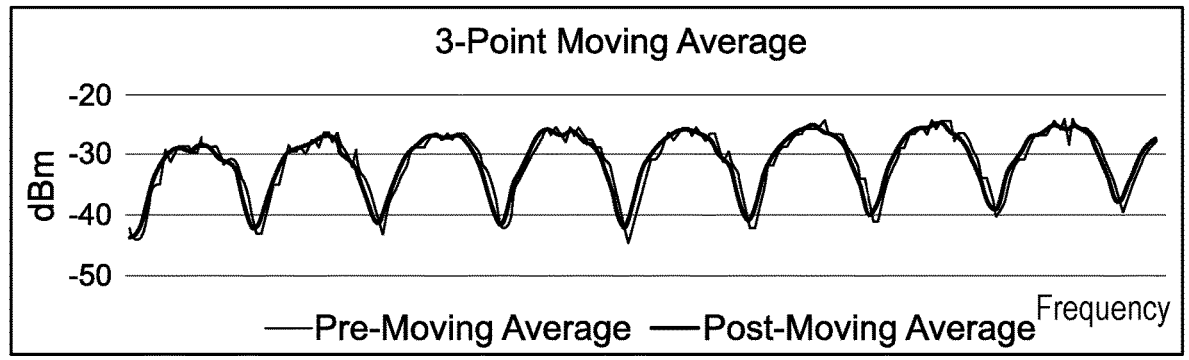
FIG. 37 shows an example 3-point moving average tilt.
Figure 38:
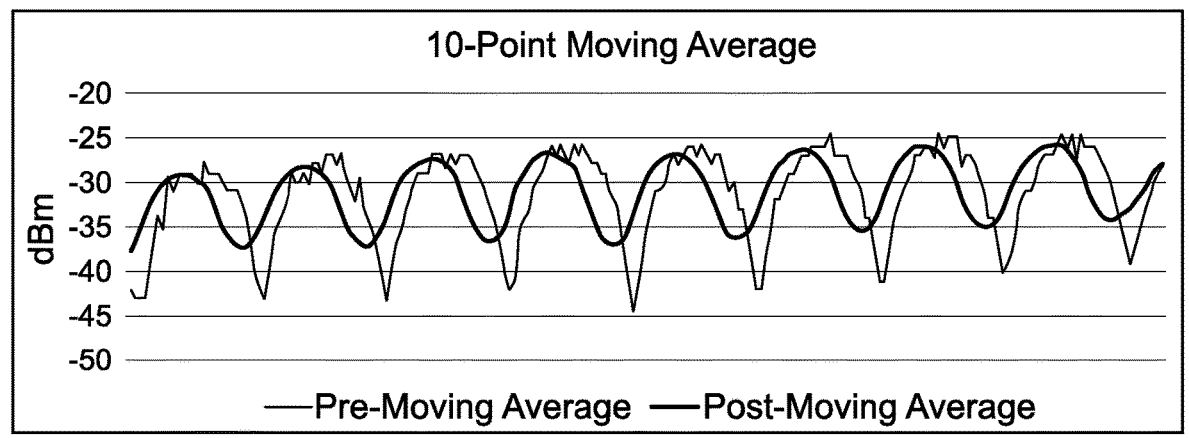
FIG. 38 shows an example 10-point moving average tilt.
Figure 39:
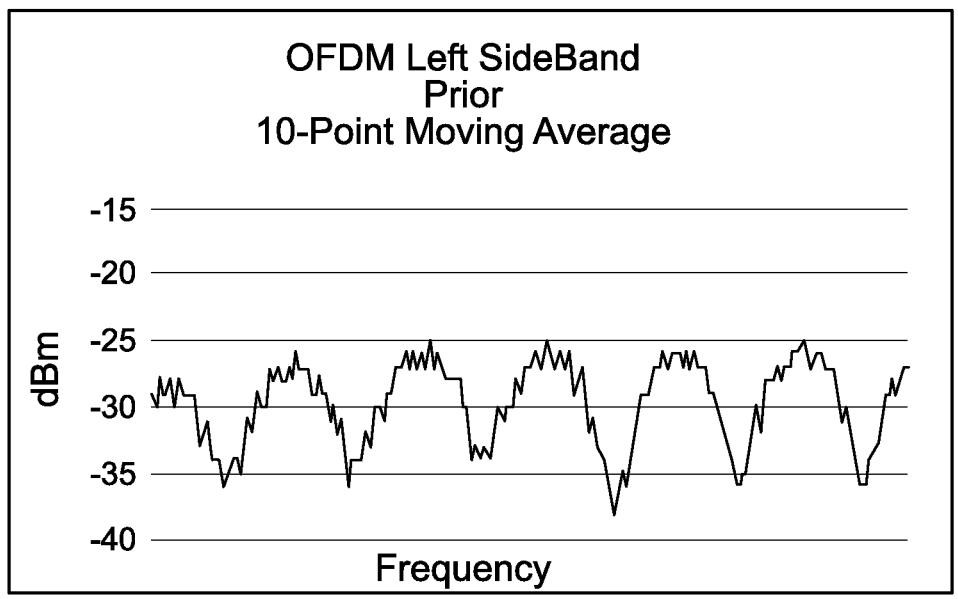
FIGS. 39-40 show an OFDM Left Sidebands tilt.

As shown in FIG. 36, the ACA results may reflect high-frequency spikes and nulls riding on the sinusoidal edge of the OFDM sidebands. The performance manager 312 may utilize a cross-section line technique to count the number of spikes/nulls and/or the number of crosses from a spike to a null. A high cross-section count may be caused by the high-frequency spikes and nulls. FIG. 37 shows a 3-point moving average example, while FIG. 38 shows 10-point moving average example. The performance manager 312 may utilized a Window Moving Average (WMA) signal process technique, which may act as a low-pass filter and may reject high-frequency noise. Equation 8 shows a sliding window moving average equation. The sliding window algorithm may have a runtime complexity of O (n* ws), where ws=Window Size.

Sliding Window Moving Average        Equation 8

| x[0] | x[1] | x[2] | x[3] | x[4] | x[5] | x[6] | x[7] | x[8] | x[9] |
|------|------|------|------|------|------|------|------|------|------|

$$x[k] = \sum_{k=0}^{n} \frac{x[k] + x[k + (n-1)] + \ldots}{n}, \ldots$$

$k$ = arrar index, $x$ = ACA array, $n$ = window size $$x[0] = \frac{x[0] + x[1] + x[2]}{3},$$

$$x[1] = \frac{x[1] + x[2] + x[3]}{3}, \ldots$$

Below is a method for determining sliding moving average in pseudo code:

TABLE 10

Example Sliding Moving Average Pseudo Code

```
public class MovingAverage {
       private List<Double> ldEntry = new ArrayList<Double>( );
       public MovingAverage(List<Double> ldData) {
         this.ldEntry.addAll(ldData);
       }
       public List<Double> getAverage(int iWindow) {
         List<Double> ldAverage = new ArrayList<Double>( );
         double dSum = 0;
         double dAverage = 0;
         int iWindowDivisor = 0;
         /* Traverse thru Data Set */
         for (int iIndex = 0; iIndex < ldEntry.size( ); iIndex++) {
            /* Reset Average/Sum */
            dSum = 0;
            dAverage = 0;
            iWindowDivisor = 0;
            for (int iWindowIndex = iIndex, iWindowIndexCount = 0;
                  iWindowIndexCount < iWindow;
              iWindowIndex++, iWindowIndexCount++) {
                  if (iWindowIndex >= ldEntry.size( )) {
```

TABLE 10-continued

Example Sliding Moving Average Pseudo Code

```
            break;
        }
        /* Update Sum */
        dSum += ldEntry.get(iWindowIndex);
        /*
        This is require so to adjust the denominator value when the
        Index reaches the end of the list size
        */
            ++iWindowDivisor;
        }
        /* Moving Average apply Sliding Window Number */
        dAverage = dSum / (double) iWindowDivisor;
        ldAverage.add(dAverage);
    }
    return ldAverage;
  }
}
```

Using the dissected OFDM processed data described herein, the performance manager 312 may utilize Descriptive Statistics (DStat) methods to estimate the correct Window Size (WS). A large WS (e.g., FIG. 38) may average a signal to the point that it smooths the ripples or nulls and may not be detected. A small WS may not smooth the signal enough and may cause errors in cross-section counting (e.g., peak-to-valley ripple or null being<3 dB).

A number of ripple peak-to-peak or nulls may be estimated to determine the signal delay and/or estimate the reflection point caused by the POE. Adequate reflected signal power and signal delay may be required to create the ripple and nulls. If the POE is too close to the input of a splitter (e.g., less than ten feet) or when there are only two MoCA nodes on the network with a unity gain amplifier (UGA), there may be no measurable ripple or nulls.

The Cross-Section technique may similar to counting Zero-Crossing with a pure AC signal and removing the DC component. The ACA EVM data may be no different, but due to the return loss at different frequencies, it may be problematic during conversion. The following techniques may be used without having to convert to a pure AC signal.

The Mean Cross-Section technique may be a simple average of the sum of the points divided by the number of points as set forth by Equation 9.

Calculating Mean from ACA EVM Sideband without Subcarrier Guard Band $$EVM_{Mean} = \frac{1}{n}\sum_{i=0}^{n} EVM_{OFDM\ SideBand}[i]$$

Equation 9

Figure 40:
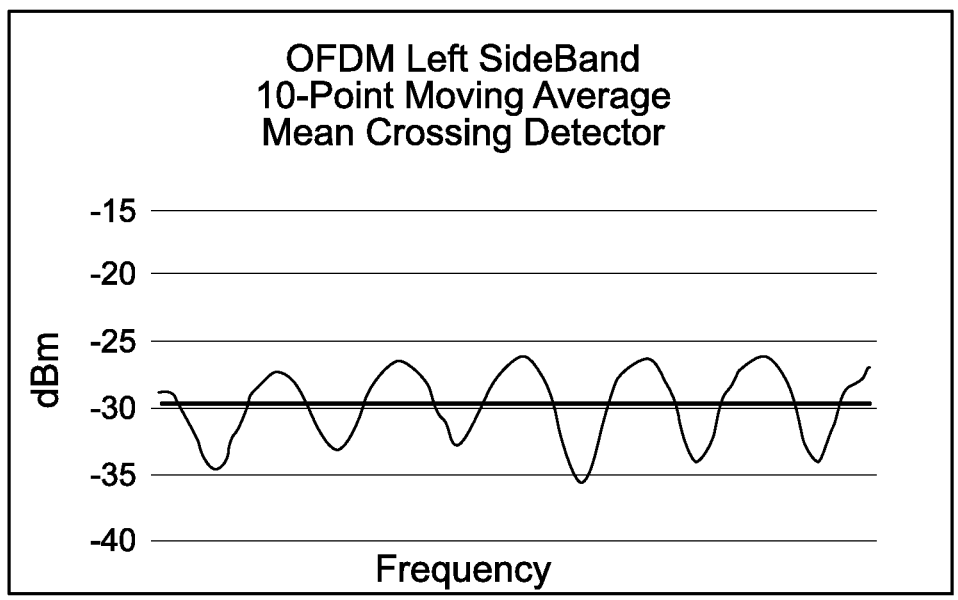
Figure 41:
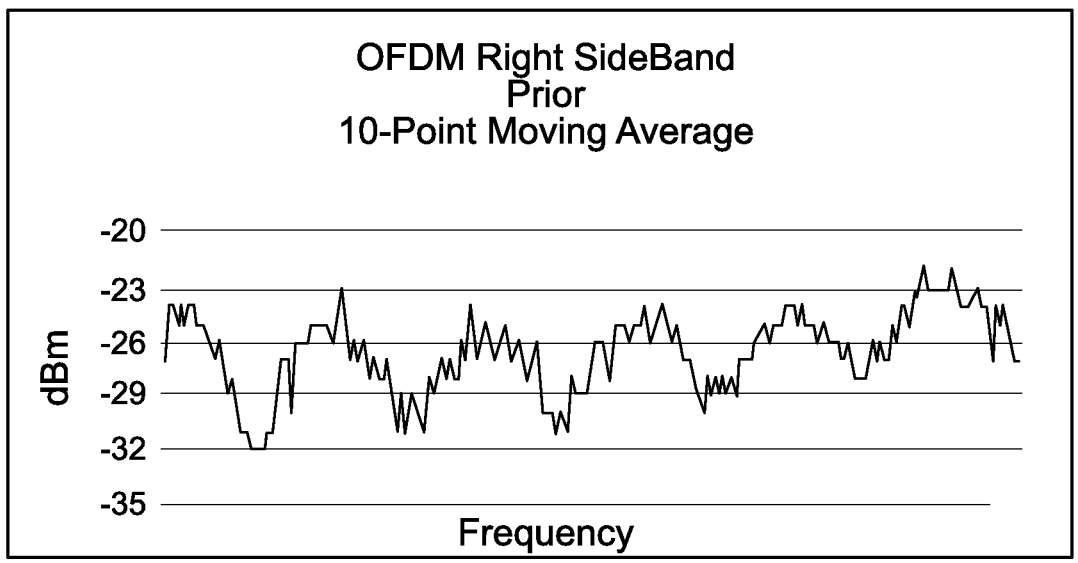
FIGS. 41-42 show an OFDM Right Sidebands.
Figure 42:
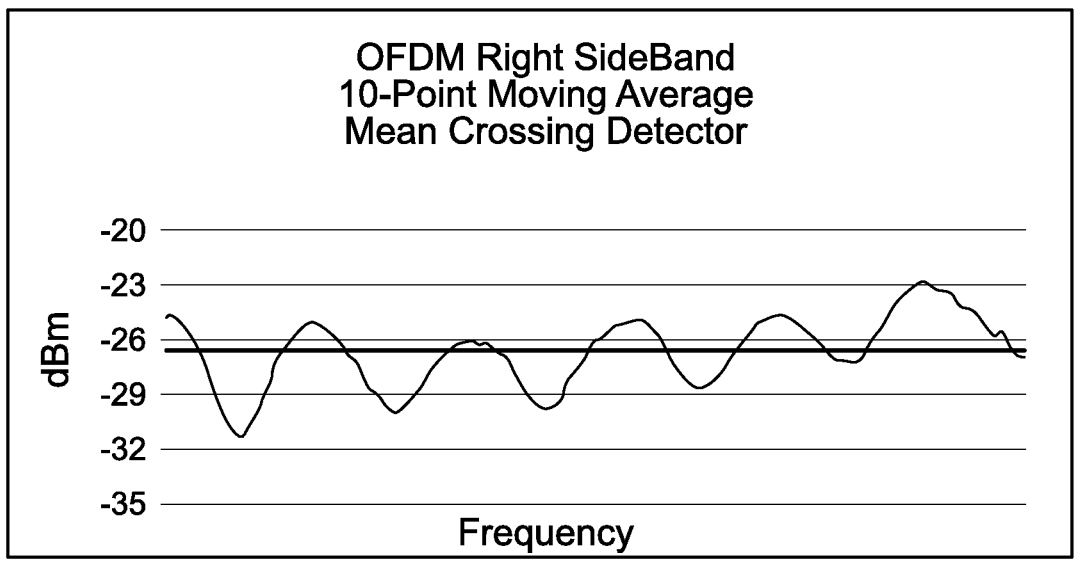

FIG. 40 shows a calculated Mean of −29.6 dB. To determine a crossing, the $EVM_{OFDM\ sideband}$ array may be traversed and compared against the mean value. The number of times the mean is crossed may be counted, which provides the cross-section count. If the cross-section count is an odd number, a modulus operation check may be performed for a zero remainder. If a reminder is calculated, one may be added to the count.

Below is a method for determining mean crossing count in pseudo code that may be implemented using a programming language such as Java:

TABLE 11

Example Mean Crossing Count (Pseudo Code)

```
public int meanCrossingCount(OfdmBlock.LEFT_BLOCK) {
/* getSingleSideOfdmDescStat( ) perfoms a 10-Point Moving Average */
    DescriptiveStatistics         ds         =
getSingleSideOfdmDescStat(OfdmBlock.LEFT_BLOCK);
        double dMean = ds.getMean( );
        List<Double> ldDS = ds.getValues( );
        int iCrossedMean = 0;
        /* True = Above ; False = Below */
        boolean bnCrossMeanUpDown = false;
        if (ldDS.get(0) < dMean) {
            bnCrossMeanUpDown = false;
        } else {
            bnCrossMeanUpDown = true;
        }
        for (Double d : ldDS) {
            if (d < dMean) {
                if (bnCrossMeanUpDown == true){
                    iCrossedMean++;
                    bnCrossMeanUpDown = false;
                    Print("Below Mean (" + iCrossedMean + ")Times");
                }
            } else if (d > dMean) {
                if (bnCrossMeanUpDown == false){
                    iCrossedMean++;
                    bnCrossMeanUpDown = true;
                    Print("Above Mean (" + iCrossedMean + ")Times");
                }
            }
        }
        If (iCrossedMean%2 != 0) { iCrossedMean++;}
        return iCrossedMean;
}
```

Figure 43:
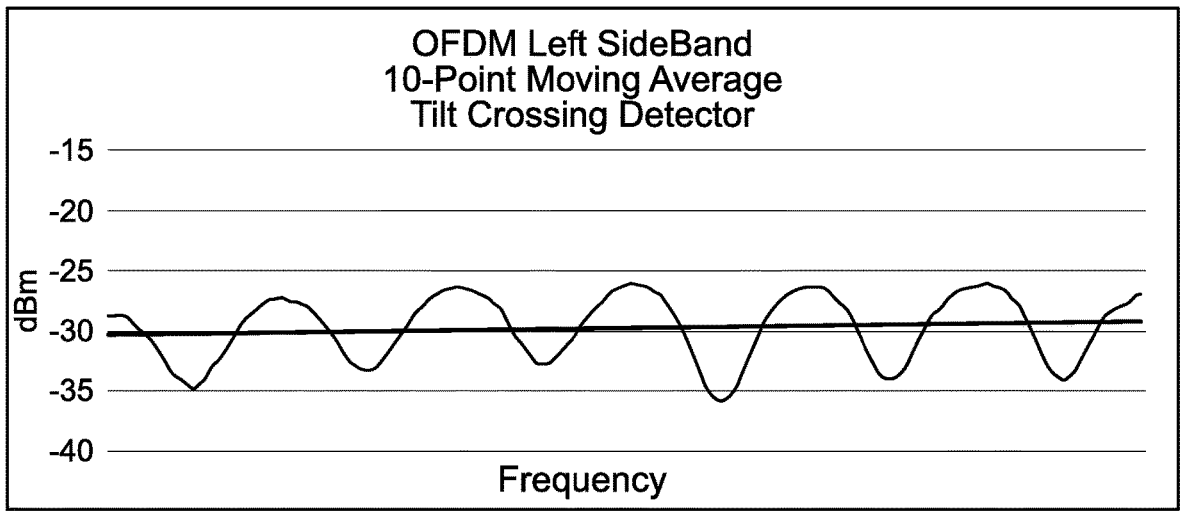
FIG. 43 shows an example of an OFDM Left Sideband Tilt Crossing.
Figure 44:
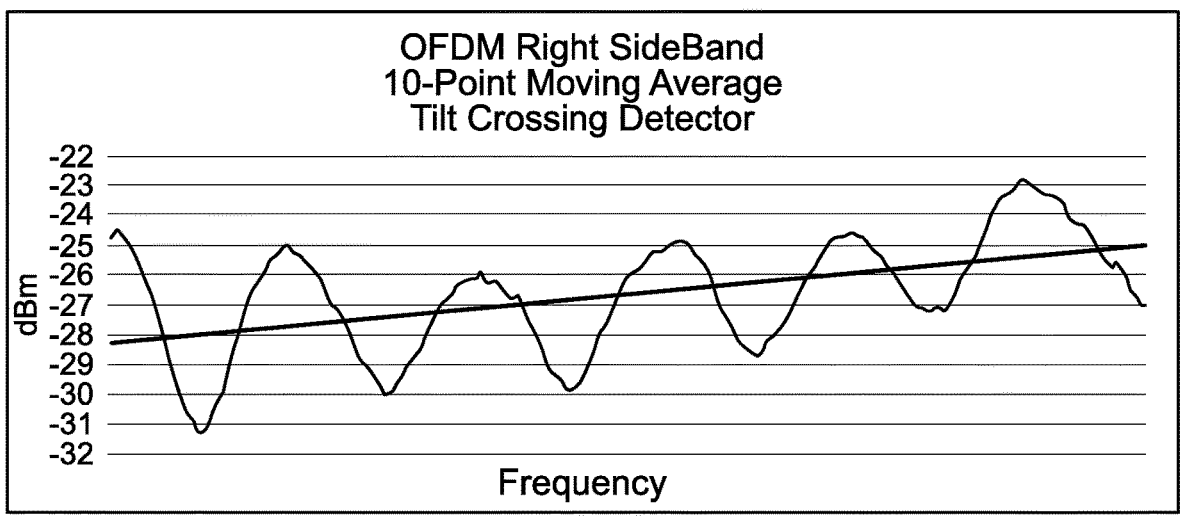
FIG. 44 shows an example of an OFDM Right Sideband Tilt Crossing.

FIG. 43 Left OFDM and FIG. 44 Right OFDM illustrate different levels of tilt. FIG. 43 shows a more flat tilt whereas FIG. 44 shows a tilt with a positive slope. As shown in FIG. 44, there are five cross-line points, each of which the Mean Cross-Section test may have missed. The Tilt/Trend Cross-Section technique may prevent overlooking of a line crossing.

Using the Tilt Slope, the performance manager 312 may use the ACA EVM data without the subcarrier guard bands to get a more accurate trend/tilt cross-section line.

Below is a method for determining trend or tilt crossing count in pseudo code that may be implemented using a programming language such as Java:

TABLE 12

Example Trend or Tilt Crossing Count - PSEUDO CODE

```
public int tiltCrossingCount(OfdmBlock.RIGHT_BLOCK) {
 /* This list contains all the Y Intercepts of the Trent/Tilt Line as a f(x) */
    List<Double>              ldTrend              =
getTrend(getMovingAverageNoGuardBandOFDM
(OfdmBlock.RIGHT_BLOCK));
    int iCrossedTilt = 0;
    /* True = Above; False = Below */
    boolean bnCrossTiltUpDown = false;
    if (ldDS.get(0) < ldTrend.get(0)) {
        bnCrossTiltUpDown = false;
    } else {
        bnCrossTiltUpDown = true;
    }
    int iTrendIdx = 0;
    for (Double d : ldDS) {
        if (d < ldTrend.get(iTrendIdx)) {
            if (bnCrossTiltUpDown == true) {
                iCrossedTilt ++;
                bnCrossTiltUpDown = false;
                Print("Below Tilt (" + iCrossedTilt + ")Times");
            }
        } else if (d> ldTrend.get(iTrendIdx)) {
```

TABLE 12-continued

Example Trend or Tilt Crossing Count - PSEUDO CODE

```
            if (bnCrossTiltUpDown == false) {
                iCrossedTilt ++;
                bnCrossTiltUpDown = true;
                Print("Above Tilt (" + iCrossedTilt + ")Times");
            }
        }
        iTrendIdx++;
    }
    If (iCrossedTilt %2 != 0) { iCrossedTilt ++;}
    return iCrossedTilt;
}
```

In FIG. 44, the performance manager 312, using the Mean Crossing Detection, may run the risk of missing two intersection points at the third peak and the last valley. Variances in amplitude at different frequencies may be tracked when using the tilt or trend method.

The Receive Channel Power (RCP) may be the measured energy at the F-connector of a MoCA device. Depending on the type of ACA test EVM|QUIET, the RCP may report its value in dBm.

Equation 10 set forth an OFDM Occupied BW Channel Power Calculation:

Channel Power Calculation  Equation 10

$EVMBin =$

The stored array of $EVM | QUIET$ Probe dBm levels from index $SubCarrier_0$ to index $SubCarrier_{N-1}$ $EVM_{CPCalc}$ in dBM = The Total Channel Power calculated from the $EVM$ Probe Data $$EVM_{CPCalc}\text{dBm} = 10 * \log_{10}\left(\sum_{n=0}^{EVMBin.size-1}\left[10^{\frac{EVMBin(n)}{10}}\right]\right)$$

The per-sub-carrier bit loading value may be the digital representation of the MoCA OFDM channel. These stats may comprise 480 of 512 active subcarriers (Table 8). The bit load may represent the number of bits-per-symbol occupied within a subcarrier. In MoCA, a subcarrier BW may be 195.3125 kHz. The symbol rate may be ~195.3125 kbpsym (regardless of the number of bits). Based on this, a baud rate may be calculated for the specific subcarrier according to Equation 11. Equation 11 may not take into account the cyclic-prefix (CP), FFT roll-off period (Windowing), or other time variant dependencies that may be built into the OFDM demodulation process.

Figure 45:
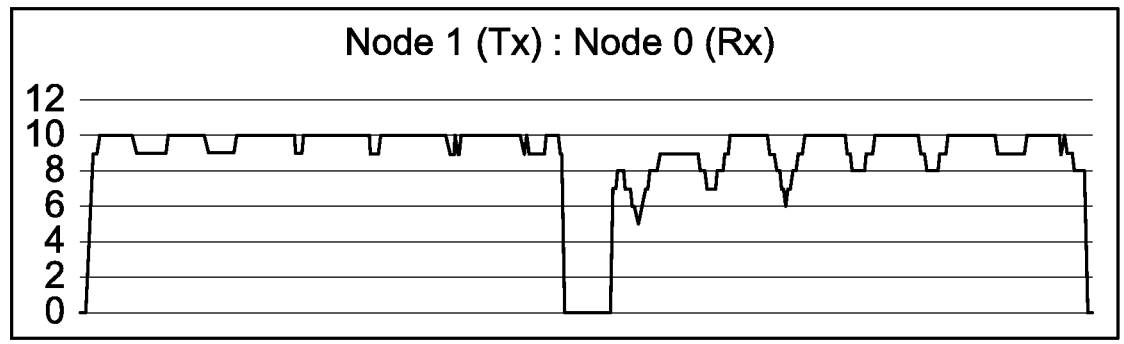
FIG. 45-46 show examples of MoCA OFDM bit loads.
Figure 46:
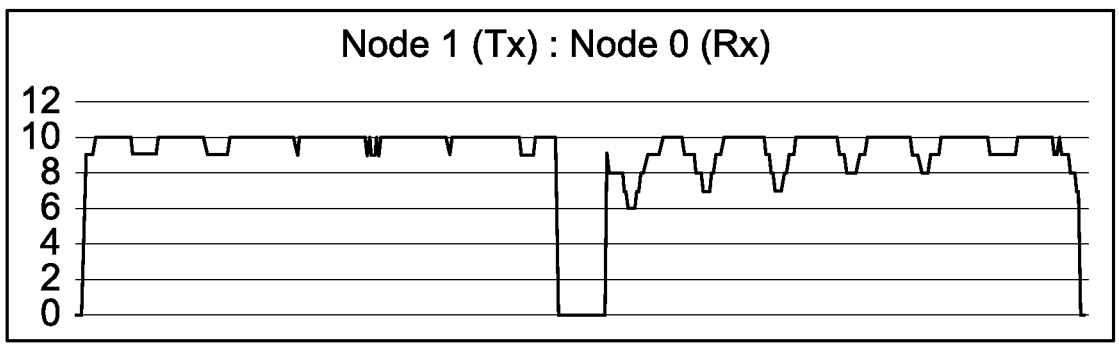

BitsPerSymbol*(~195.3125*$10^3$)=SubCarrier
BaudRate  Equation 11 SubCarrier BaudRate FIG. 45 and FIG. 46 illustrate example reported MoCA OFDM per subcarrier bit load. This example is the bit load representation of the ACA EVM probe in FIG. 38.

PHY Rate and Bit Load Avg may be determined by Equations 12 and 13 and may be used to determine a strong likelihood of MoCA Home Readiness.

Calculate PHY Rate from $MesScMod$ Bit load Stat  Equation 12

Calculated Phy Rate = $\left[\sum_{i=0} Bitload[i]\right] * 195.3125 * 10^3$

Calculate Bit load $Avg$ from $MesScMod$ Bit load Stat  Equation 13

$$Bitload_{Avg} = \frac{1}{n}\sum_{i=0}^{n=480} Bitload[i]$$

The maximum distance of a POE from one MoCA node to another may be calculated, within one ACA operation. The POE filter may not be directly connected to the input of the splitter, the POE may be at least 10 feet from the root splitter and there may not be UGA installed in the home coax network. The performance manager 312 may determine a delay signal produced by the POE, based on its near perfect 0 dB Return Loss within the MoCA D-Channel frequency band.

The Recursive Line-Crossing Symmetry Check (RLCSC) may be a two-step process. Using the Trend Cross-Section method described herein to find the indexes that cross the trend/tilt line, the performance manager 312 may calculate the differences between pairs.

The Arithmetic Sliding Window (ASW) may be used to calculate the distance between the crossed intersections of the ripple waveform. Below is a method for determining arithmetic sliding window in pseudo code.

TABLE 13

Example Arithmetic Sliding Window Pseudo Code

```
/**
*       Sliding Window of 2 - Add|Sub (Index[0] and Index[1])
*       ([0],[1]),([2],[3])
*
* @param li List<Integer>  List of Trend|Tilt Crossing Indexes
* @param iWindowSize    Set to 2 for Two Index Calculation
* @param bnAddSub True = Add , False = Subtract    Set to FALSE
* @return List<Integer> = Calculated Distances
*/
public List<Integer> arithmeticSlidingWindow(List<Integer> li,
int iWindowSize , boolean bnAddSub) {
        List<Integer> liSlideWindowResult = new ArrayList<Integer>( );
        Integer iMathResult = 0;
        for (int iIdx = 0; iIdx < (li.size( )-1); iIdx++) {
            /* Reset Result for next Index */
            iMathResult = 0;
    /* *****************Set Boundary*********************/
            for    (int    iWindowSlider    =    0;
(iWindowSlider  < iWindowSize)&&((iIdx+iWindowSlider) < li.size( ));
iWindowSlider++) {
                if (bnAddSub) {
                    /* Adding Slider */
                    iMathResult += li.get(iIdx+iWindowSlider);
                } else {
                    /* Subtracting Slider */
                    iMathResult    =    Math.abs(iMathResult)    –
li.get(iIdx+iWindowSlider);
                }
            }
            liSlideWindowResult.add(Math.abs(iMathResult));
        }
        return liSlideWindowResult;
}
```

The performance manager 312 may determine standard deviation. The spread of the distances in a symmetrical ripple or nulls may be close to zero spread (e.g., a spread of zero may be unrealistic in the real world). The performance manager 312 may estimate the ripple Peak-To-Peak or Null-To-Null with little computation complexity.

Below is a method for determining Computation Complexity: O (n) in pseudo code.

TABLE 14

Example Recursive Line-Crossing Symmetry Check Pseudo Code

```
private void processUpperLowerTiltCrossings( ) {
    this.ldDS = convertArrayToList(ds.getValues( ));
    this.ldTrend = getTrend
        (SignalProcess.getSimpleRegressionFromOFDM(ldDS));
    this.iCrossedTilt = 0;
    /* True = Above ; False = Below */
    boolean bnCrossTiltUpDown = false;
    boolean bnCrossTiltUpDownStart = false;
    if (ldDS.get(0) < ldTrend.get(0)) {
        bnCrossTiltUpDown = false;
    } else {
        bnCrossTiltUpDown = true;
    }
    bnCrossTiltUpDownStart = bnCrossTiltUpDown;
    if (bnCrossTiltUpDown) {
        logger.debug("Trend-Tracking-Start-Above Trend-Line @
(" + ldDS.get(0) + ")");
    } else {
        logger.debug("Trend-Tracking-Start-Below Trend-Line @
(" + ldDS.get(0) + ")");
    }
    int iTrendIdx = 0;
    for (Double d : ldDS) {
        if (d < ldTrend.get(iTrendIdx)) {
            if (bnCrossTiltUpDown == true){
                iCrossedTilt++;
                bnCrossTiltUpDown = false;
                this.liTiltCrossingIndexTallyLower.add(iTrendIdx);
        /* Crossed Into Lower */
                this.liTiltCrossingIndexTallyUpper.add(iTrendIdx-1);
        /* Just Left Upper */
                logger.debug("Below Tilt (" + iCrossedTilt + ")
Times @ Index: (" + iTrendIdx + ")");
            }
        } else if (d > ldTrend.get(iTrendIdx)) {
            if (bnCrossTiltUpDown == false){
                iCrossedTilt++;
                bnCrossTiltUpDown = true;
                this.liTiltCrossingIndexTallyUpper.add(iTrendIdx);
                this.liTiltCrossingIndexTallyLower.add(iTrendIdx-1);
                logger.debug("Above Tilt (" + iCrossedTilt + ")
Times @ Index: (" + iTrendIdx + ")");
            }
        }
        iTrendIdx++;
    }
    if (bnCrossTiltUpDownStart) {
        this.liTiltCrossingIndexTallyUpper.remove(0);
    } else {
        this.liTiltCrossingIndexTallyLower.remove(0);
    }
    if (bnCrossTiltUpDown) {
        this.liTiltCrossingIndexTallyUpper.remove
(this.liTiltCrossingIndexTallyUpper.size ( )-1);
    } else {
        this.liTiltCrossingIndexTallyLower.remove
(this.liTiltCrossingIndexTallyLower.size ( )-1);
    }
}
```

Figure 47:
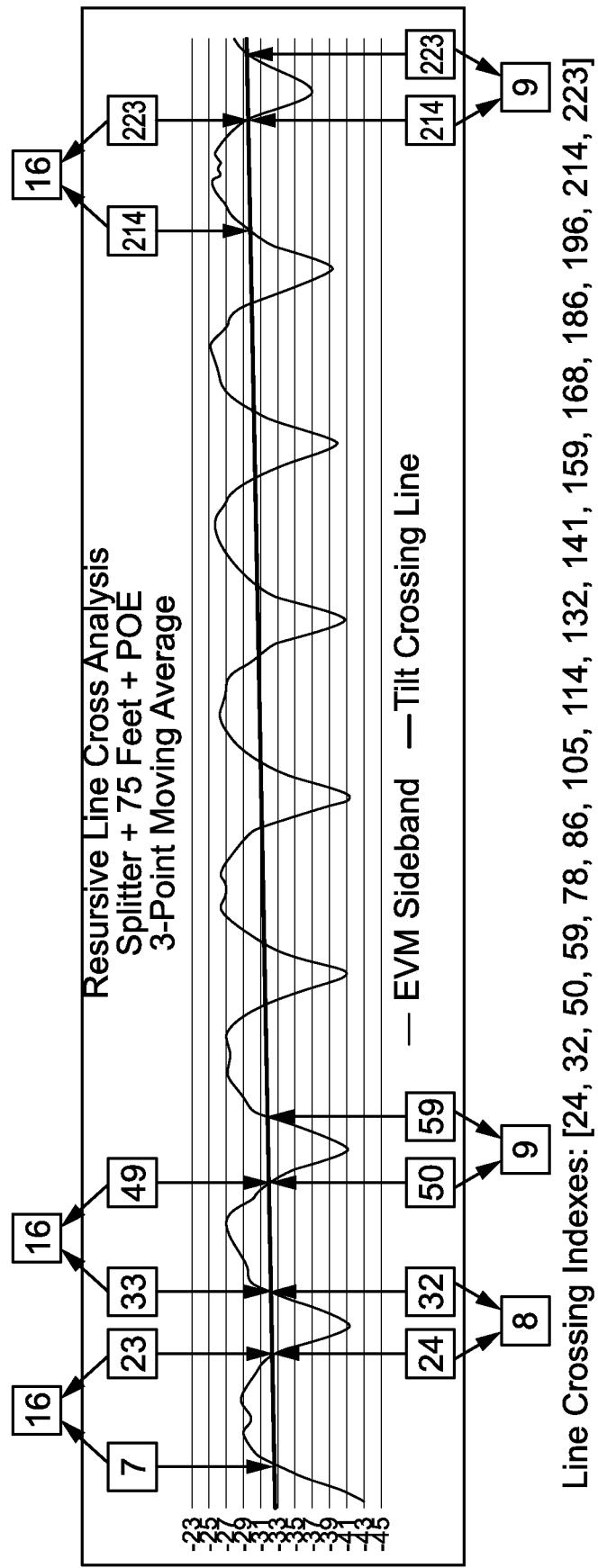
FIG. 47 shows an example of a line-crossing check algorithm.

FIG. 47 shows an algorithm for Recursive Line-Crossing Check. The $Peak_{Mean}$ may be selected such that Equation 13 is satisfied.

$$0.5[([2*16.25_{PeakMean}* 195.3125 \times 10^3)^{-1}] = 78.77 \text{ ns} \quad \text{Equation 13 Recursive Line-Crossing Symmetry Check Signal Delay Calculation}$$

The distance of the POE or delay within an accuracy of 10 feet or 10 ns may be estimated by counting the number of tilt line crossing over the bandwidth (e.g., the total delay in nanoseconds (ns)). One cycle or two tilt crossings within an OFDM block may equate to 10 ns or 10 feet. If the number of crossing is odd, the performance manager 312 may add one to the tally of crossings to make the count even.

Figure 48B:
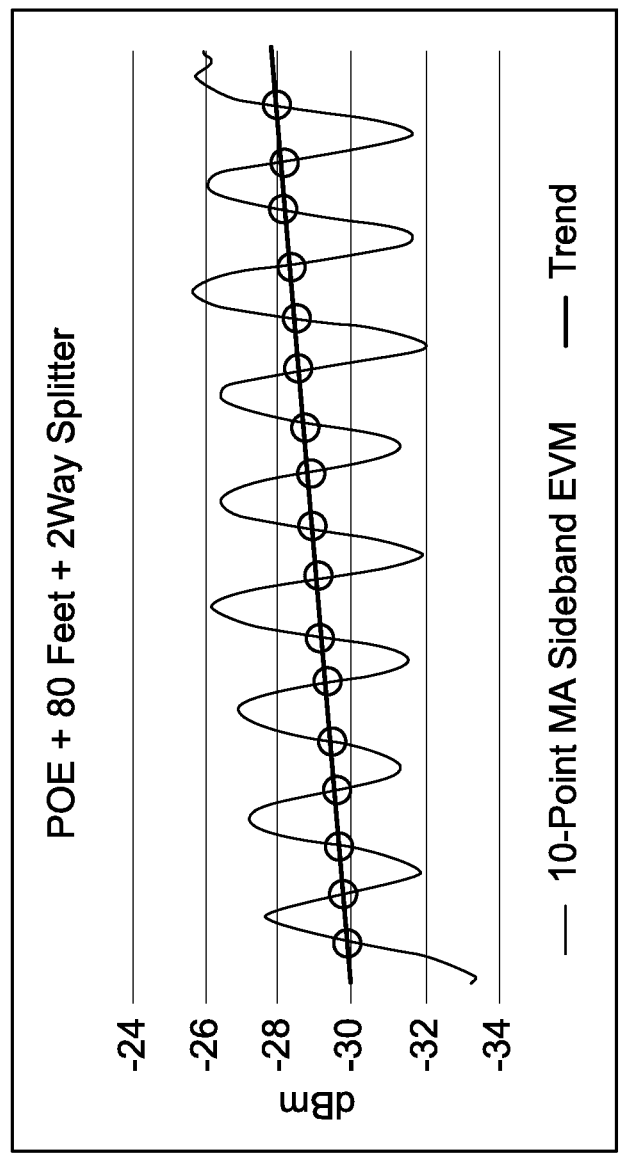
FIG. 48B shows an example POE Tilt Crossing.
Figure 48A:
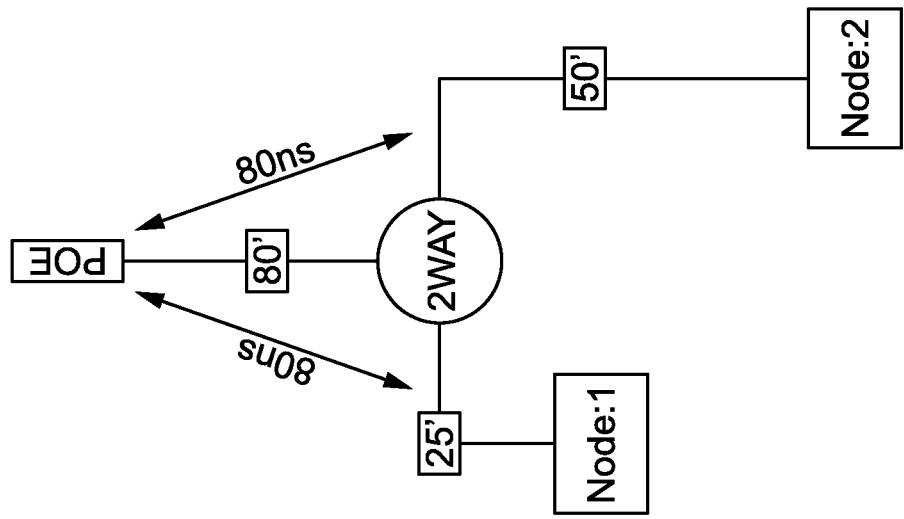
FIG. 48A shows an example POE and two-way splitter connected to two nodes.

FIGS. 48A-48B illustrate a Tilt Crossing Counting with a POE at 80 Feet with a 2Way Splitter. Equation 14 sets forth an equation for determining delay signal using tilt crossing:

Delay Signal Calculation Using Tilt Crossing     Equation 14

$$\frac{.5(\text{Number of Tilt Crossing} + [\text{Add 1 if odd}])}{50 \text{ MHz}_{Sideband}} = Delay_{ns}$$

A 3 to 10 Point Window Moving Average may be required to smooth the waveform as discussed above.

The performance manager 312 may utilize the Tilt of Trend Cross-Section algorithm described herein to determine tilt cross section.

A Fourier Transform (FT) may be performed to decompose a function of time (e.g., in the time domain) into discrete frequencies (e.g., in the frequency domain). Although the probe data (e.g., ACA data) may be a frequency domain representation, an FFT (or Fast Fourier Transform (FFT)) may still be performed similarly to the Recursive Line Crossing algorithm to acquire a frequency response and determine the frequency of a ripple.

A Discrete Fourier Transform (DFT) may have a higher computational complexity than the FFT, but may also provide a frequency response. Equation 15 is an equation for performing a DFT.

Discrete Fourier Transform (DFT)     Equation 15

$$X(k) = \sum_{t=0}^{n-1} x(t) e^{-2\pi t k/n}$$

The probe data (e.g., ACA data) may be normalized before FFT Analysis. For example, ACA probe data may have a sample size of 512 Log-Magnitude points. The FFT points may be the number of sample points that may be submitted to the FFT. The total number of points may be a power of 2. For a better resolution, zero-padding may be done to extend the number of FFT points, as shown by Equation 16.

$$FFT[i]_{Points(1024)} = \{X_{[0]} = X_{ACA_{dBm}}, X_{[1]} = X_{ACA_{dBm}}, \ldots, X_{[512]} = X_{ACA_{dBm}}, X_{[512]} = 0_{ZeroPad}, \ldots, X_{[1023]} = 0_{ZeroPad}\}$$
Equation 16 FFT Point Zero-Padding Technique The ratio between sample points and FFT points may be less than or equal to [1:2 or 0.5]. For example, the ratio between sample points and FFT points may be [1:8 or 0.125]. Equation 17 sets forth determination of the ratio:

FFT Scale Calculation     Equation 17

$$FFT_{Scale} = \frac{ACA_{SampleSize}}{FFT_{Points}} = 1:8 = .125$$

For signal delay detection, 512 zero's may be added to the end of the ACA probe data list of values, for a total of 1024.

Before submitting the 1024 sample points, each ACA probe data value may require conversion from dBm to a linear scale. Equations 18 and 19 illustrate such a conversion:

dBm to Linear  Equation 18

$$x_{Linear} = 10^{\frac{x_{dBm}}{10}}$$

Linear to dBm  Equation 19

$$x_{dBM} = 10 * Log(x_{Linear})$$

The FFT results may be calculated to obtain a ripple signal found in the ACA probe data. After executing the FFT, the a list of complex numbers may be produced. To calculate the magnitude power of the given $Index_{Freq}$ in hertz (Hz), the magnitude power for each complex number index may be calculated according to Equation 20.

$$\text{Magnitude Power}_{Linear} = \sqrt{Real^2 + Imaginary^2}$$

Equation 20 Complex Number Magnitude Power Calculation

When graphing, the linear magnitude power may be converted to dBm (Equation 19) or dB (Equation 21) to have a more clear FFT frequency response.

$$dB = Log(\text{MagnitudePower}_{Linear})$$

Equation 21 Linear to dB Calculation

Because the FFT may convert a time-domain signal to a frequency-domain response, the ACA probe data may look like a square wave from a time-domain signal POV. For example, the ACA probe data may comprise two OFDM channels, each comprising 256 points for a total of 512 points. After the FFT, the ripple may be identified, by determining the index location, in some examples, before it is scaled. The scaling process may determine the actual frequency of the ripple.

Figure 49A:
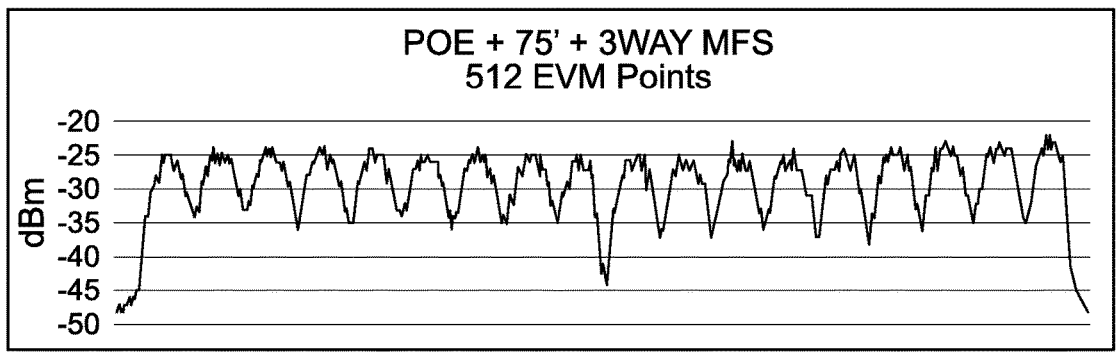
FIG. 49A-49C show an example Fourier analysis of probe data.
Figure 49B:
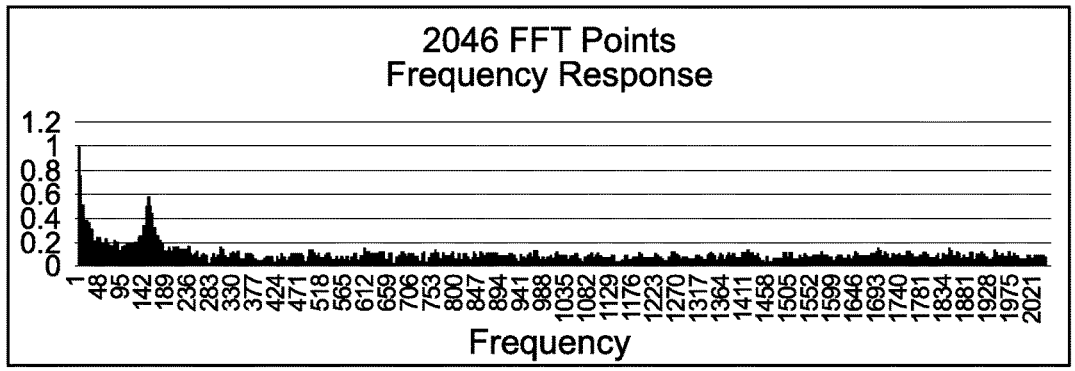
Figure 49C:
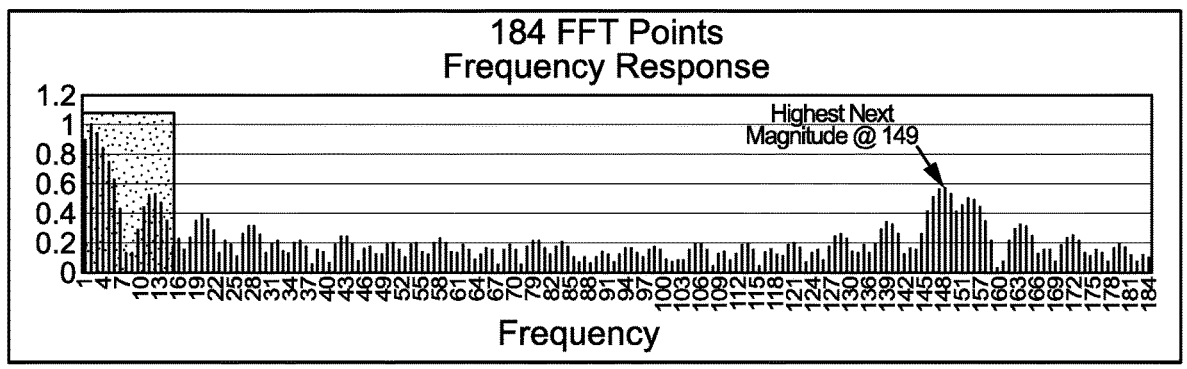

The ripple in the ACA probe data may be determined using FFT. FIGS. 49A-49C illustrate an FFT of a first node (e.g., a POE filter) at 75 feet from a second node (e.g., the input of a root splitter). As stated earlier, the FFT may be used to determine the ripple frequency across the one MoCA 100 MHz channel. The minimum delay that may be analyzed may be 20 ns.

FIG. 49A shows an EVM probe data response of a POE filter 75 feet from the input of a 3WAY MFS where no moving average was applied or additional interpolation to increase the sample size. The FFT points may be 4096 in a sample size of 512. FIG. 49B shows an EVM FFT frequency response of 2046 FFT Points. Using the FFT Scale Calculation of Equation 17, the an $FFT_{Scale}$ of 0.125 may be determined. FIG. 49B shows two major peaks in the lower frequencies.

FIG. 49C shows the first 184 FFT points (e.g., 1 Hz to 184 Hz). The shaded region may represent the frequencies that make up the part of the square-wave EVM response. With a MoCA channel BW of 100 MHz, any delay of 20 ns or less may not render a ripple on the OFDM carriers. In 49C, the threshold region may be from 1 Hz to 16 Hz.

The threshold region corresponding to a minimum delay of 20 ns may be determined according to Equation 22:

20 ns index Frequency Threshold  Equation 22

$$Index_{FrequencyThreshold(FT)} = \frac{20 * 10^{-9}}{FFT_{Scale}([T_s]^{-1})}$$

$$T_s = SampleRate = NumberOfMoCAChannels(100 * 10^6)$$

Excluding the threshold region, the Highest Magnitude Peak (HMP) may be determined as depicted in FIG. 49C and Equation 23 may be executed to obtain the round trip signal delay at the frequency where the ripple occurs.

$$SignalDelay_{RoundTrip} = [FFT_{[HMP]} * FFT_{Scale}] * [T_s]^{-1}$$

Equation 23 Echo Round Trip Delay from FFT Response

Because signal propagation may not be perfect through electrical connections (e.g., not the speed of light), a delay factor may be determined based on the type of connections used in the premises network. The actual propagation delay, assuming an RG6 cable is used in a home, may be determined in accordance with Equation 24. Not all coaxial cable have the same Nominal Velocity of Propagation (NVP). The percentage coefficient may be multiplied to normalize the signal delay results.

$$SpeedOfLight = 1.016703362E^{-9}$$

$$RG6_{NVP} = 84\% = 0.84$$

$$SignalDelay_{RG6(NVPCorrection)} = [SpeedOfLight * RG6_{NVP}] = 0.854030824$$

Equation 24 RG6 Signal Delay Correction Coefficient $$SignalDelay_{RoundTrip(RT)} = SignalDelay_{RG6(NVPCorrection)} * SignalDelay$$

Equation 25 Signal Delay (RG6 NVP Correction Coefficient)

A signal delay and the distance between two nodes (e.g., where a POE is located in a home) may be determined as follows:

$$FFT_{Scale} = \frac{512}{4096} = .125$$

$$Index_{FrequencyThreshold(FT)} = \frac{20 * 10^{-9}}{.125([100 * 10^6]^{-1})} = 16$$

$$FFT_{[HMP]} = 149$$

$$\text{Signal } Delay_{RT} = [149 * .125] * ([100 * 10^6]^{-1}) = 186.25 * 10^{-9}$$

$$SignalDelay_{(RT)Corrected} = .854030824 * 186.25 * 10^{-9} = 159.06 * 10^{-9}$$

$$POE_{ReflectionPoint} = (159.06 * 10^{-9}) * .5 = 79.5 * 10^{-9} \approx 79.5 \text{ Feet}$$

The ODFM population data may be analyzed using a standard distribution model. The presence and/or absence of a POE may be determined along with minimum RF impairments that may cause instability in the within the MoCA occupied bandwidth. The OFDM blocks independently within the given MoCA channel selected in the ACA operation.

When evaluating the ACA probe data, guard band subcarriers may be removed to determine standard deviation and mean values. The probe data may be normalized to represent information regarding suckouts.

Figure 50A:
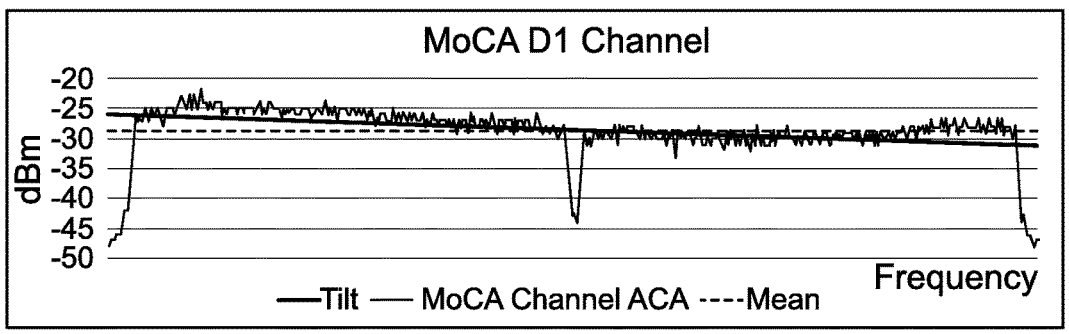
FIG. 50A-50C show examples of skewness and suckout.
Figure 50B:
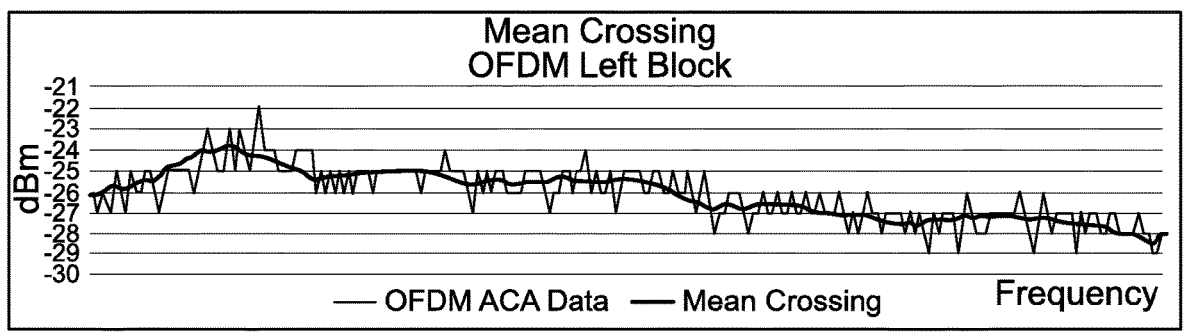
Figure 50C:
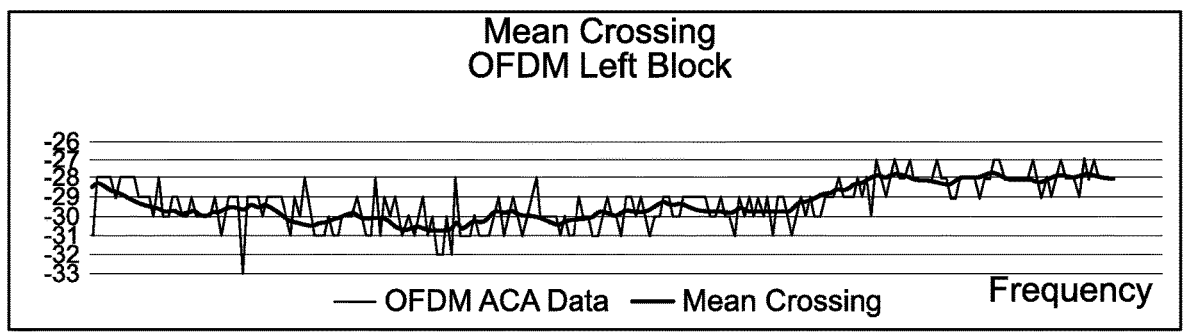

An indication of a suckout may be found in a skewness result. In FIG. 50A, by leaving the guard band magnitude values in the distribution model, the population of data may be skewed to the right. FIG. 50A shows a Raw ACA Data MoCA Channel with a Mean of −28.73, a SD of 4.29, and a Skewness of −2.62. FIG. 50B shows a Raw ACA Data Mean Crossing Left Block with a Mean of −26.10, a SD of 1.29, and a Skewness: 0.03. FIG. 50C shows a Raw ACA Data Mean Crossing Right Block with a Mean of −29.31, a SD of 1.18, and a Skewness of −0.14. In FIG. 50B and FIG. 50C the skewness value indicates no suckout. The model may show data points with little population frequency, starting with points lower than −29 dBm.

$$-1 > x > 1 \quad \text{Equation 26 Suckout Indicator using Skewness}$$

As with FIG. 50B and FIG. 50C, when calculating the SD, and observing the plots, the points may be no greater than ~3 dB. For both plots 2σ may be less than +/−3 dB and greater than 95% of all the points. Both figures may indicate a relatively flat (but not zero) response for each OFDM block.

Figure 51:
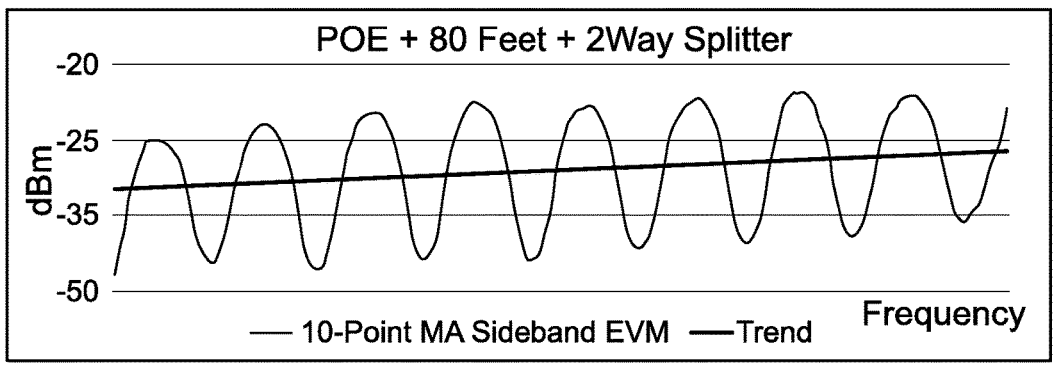
FIG. 51 shows an example EVM for a POE with a two-way splitter.
Figure 52:
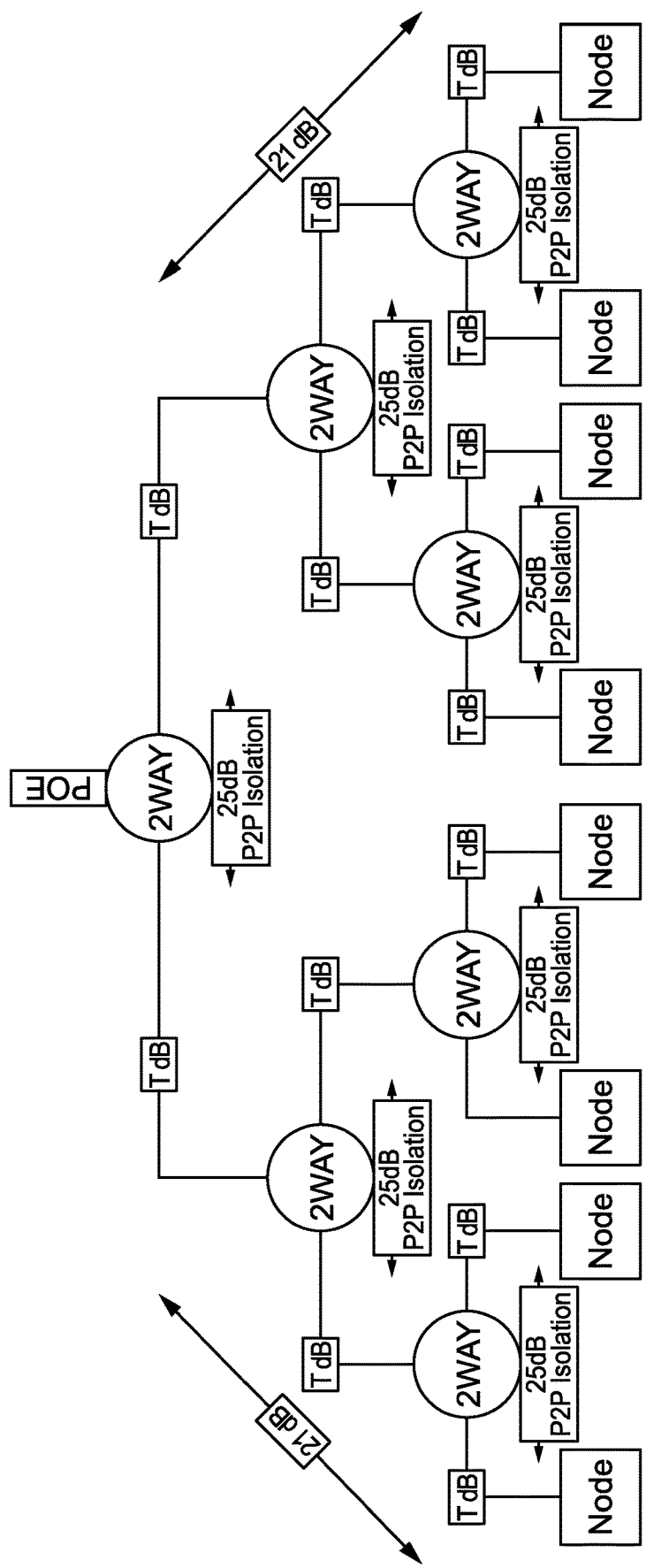
FIG. 52 shows an example POE and an eight-way splitter.
Figure 53:
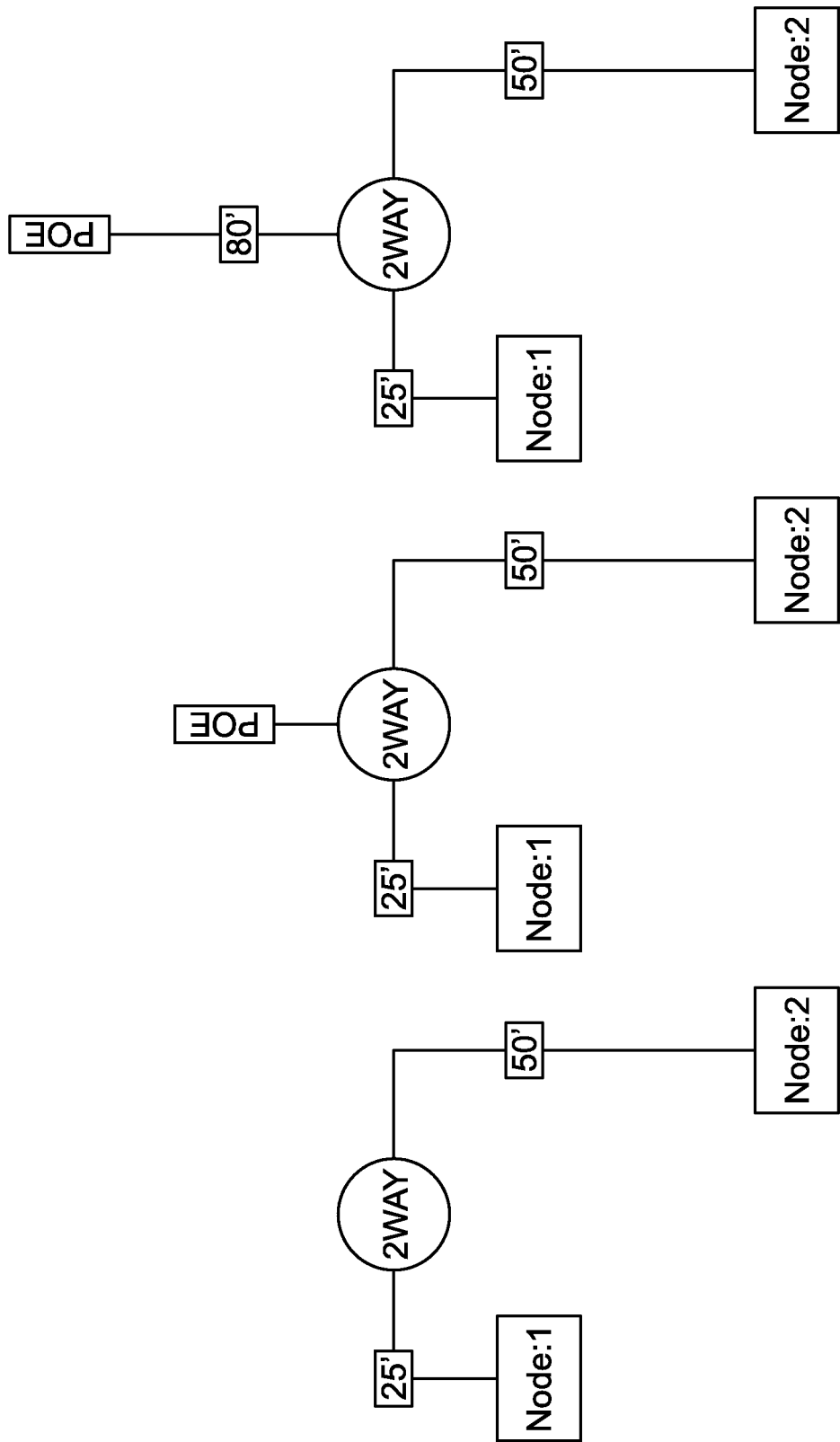
FIG. 53 shows example configurations of a two-way splitter, two nodes, and/or a POE.
Figure 54C:
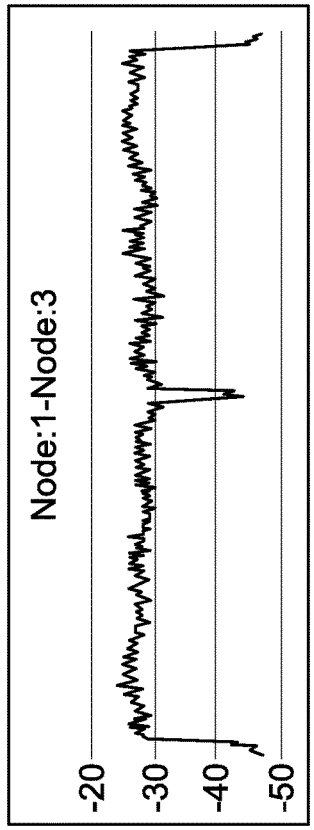
FIG. 54A-54E show example POE impacts based on various cable configurations.
Figure 54D:
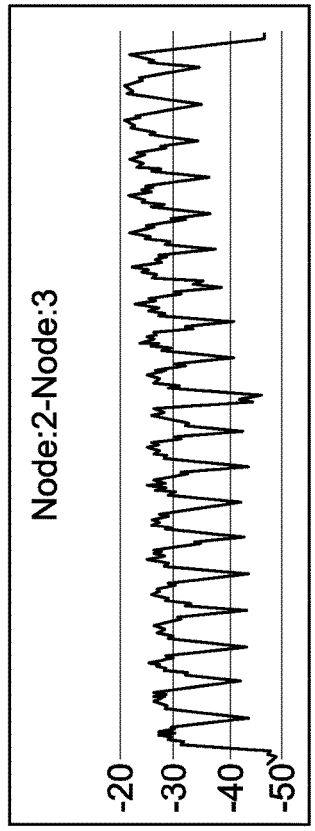
Figure 54E:
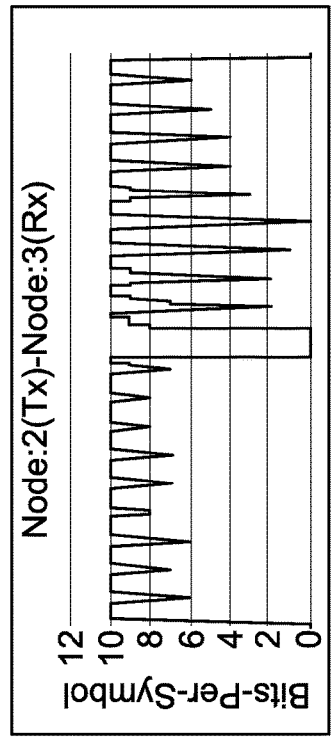
Figure 54A:
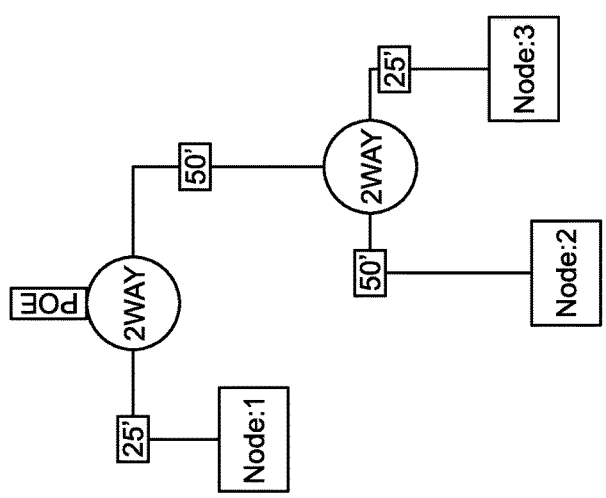
Figure 54B:
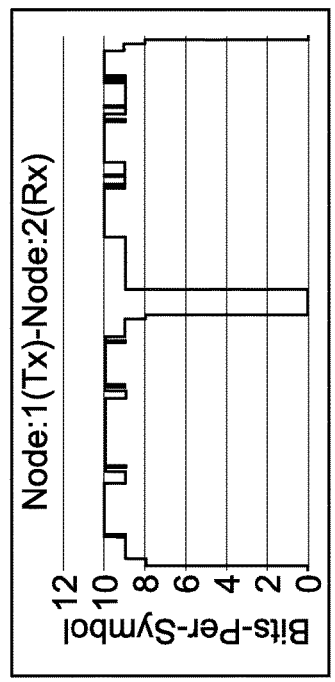

FIG. 51 shows POE Detection Away from the Input of the Splitter with a Mean of −28.91 dBm, a SD of 2.05 dB, and a Skew of −0.16. After performing a 3-Point MA on a single sideband, the key metrics without special detections may be the SD and Skew. 2σ (4.1 dB) may be 95% of the observed representation in the spread of the data.

The MOCA20-MIB::mocaIfAcaTotalRxPower may be used to determine the overall home coax insertion loss and its relationship to the expected PHY rate.

A probability that a POE is connected to the input of the splitter may be determined based at least on the relationship between the number of node or splitter ports, the received power, and/or insertion loss of splitter, as further described below.

A transmitting Node may have a maximum total output power between −3 dBm and +5 dBm at every supported MoCA channel frequency within the frequency band of 100 MHz around the center frequency of the transmitted signal when transmitting in MoCA 2.0 PHY.

TABLE 15

Summary of MoCA Transmit Power

| Version | Number of Channels Transmitted | Channel Bandwidth (MHz) | Maximum Output Power per Channel | Maximum Output Power Total for all Transmitted Channels |
|---|---|---|---|---|
| 1.0/1.1 | 1 | 50 | −1 dBm to +7 dBm | −1 dBm to +7 dBm |
| 2.0 | 1 | 100 | −3 dBm to +5 dBm | 0 dBm to +8 dBm |
| | 2 | 100 | −4.5 dBm to +3.5 dBm | +0.3 dBm to +8.3 dBm |
| 2.5 | 3 | 100 | −5.3 dBm to +2.7 dBm | +0.7 dBm to +8.7 dBm |
| | 4 | 100 | −6 dBm to +2 dBm | +1 dBm to +9 dBm |
| | 5 | 100 | −1 dBm to +7 dBm | −1 dBm to +7 dBm |

The wider the spread, the stronger the reflection or echo of the signal may be. A skewness of less than −1 may indicate the population is within the means. This may show the data does not suggest a suckout is present. This may be a Key Performance Indicator for determining the performance of a splitter of connected devices performing the ACA.

A POE filter may be determined to exist, like as shown in FIG. 47, within 10 feet of the distance between the Node to Node connection and the POE. Equation 27 may be used with the data collected from the Recursive Line Check Algorithm.

Signal Delay − POE Distance Calculation    Equation 27

$$\left(.5\left[\left(\frac{Delta_{Peak} \cdot \text{size} + Delta_{Valley} \cdot \text{size}}{2}\right) \times 50 \text{ MHz}^{-1}\right]\right) \approx$$

$$SignalDelay_{POEDistance}$$

A Time Domain Reflectometer (TDR) may measure reflections along a conductor. To measure those reflections, the TDR may transmit an incident signal onto the conductor and listen for its reflections. If the conductor is of a uniform impedance and is properly terminated, then there may be no reflections, and the remaining incident signal may be absorbed in the far-end by the termination. Instead, if there are impedance variations, then some of the incident signals may be reflected back to the source.

Both Line-Crossing and Fourier Transform techniques may be used to determine the distance of the POE relative to the two devices that are performing the EVM probe. The Line-Crossing method may have an accuracy ~10 feet, whereas the FT may have an accuracy of 2 to 8 feet. The main variable that may significantly swing the calculation may be the Nominal Velocity of Propagation (NVP) of the cable. RG6 may have a NVP of 84%, but in some cases, it may be as low as 82%.

The insertion loss of a 2-Way splitter@1150 MHz may be ~7 dB.

TABLE 16

NMF Splitter Port to Insertion Loss + POE

| Number of Ports | Insertion Loss @ 1150 MHz + POE |
|---|---|
| 2 | ~14 dB |
| 4 | ~28 dB |
| 8 | ~42 dB |

Table 17 shows use of the ACA EVM probe data and known splitter characteristic, which may illustrate the difference between an absence of a POE and a connected POE to the input of a 2way splitter. The likelihood that a POE is or is not connected to a splitter may be determined based on the relationship between the number of node or splitter ports and the received power.

TABLE 17

Two-Node—2Way Splitter Scenario Insertion Loss Matrix $$RG6 \text{ Cable Loss} = \frac{6.5 \text{ dB}}{100 \text{ Feet}} @ 1150 \text{ MHz}$$

| | 2WAY | POE + 2WAY | POE + 80 + 2WAY |
|---|---|---|---|
| Insertion Loss | 25 dB | 14 dB | 24.4 dB |
| Measure Rx Power via EVM Probe | −21 dBm | −11 dBm | −18 dBm |
| Estimated Insertion Loss | −24 dB . . . −18 dB | −15 dB . . . −7 dB | −25.4 dB . . . −17.4 dB |

Table 18 shows PHY Rate over the minimum receive sensitivity requirements. When determining the expected PHY Rate of MoCA home network, the performance manager 312 may determine the total number of devices in the network to calculate the expected insertion loss and receive power. A higher number of nodes in a network may impact the overall PHY rate of the network.

TABLE 18

Minimum Receive Power

| Version | Band | Minimum Receive Power | PHY Rate |
|---|---|---|---|
| 1.0/1.1 | D | −51 dBm (−2.25 dBmV) | 225 Mbps |
|  | E, F | −49 dBm (−0.25 dBmV) | 240 Mbps |
| 2.0 | D | −44 dBm | 600 Mbps/Channel |
|  | E, F | −43 dBm | 600 Mbps/Channel |
| 2.5 | D, E, F | −42 dBm | 650 Mbps/Channel |

If the number of nodes exceeds eight, the overall network PHY rate may be determined by the insertion loss reference in Table 16.

FIGS. 54A-54E illustrate how the effects of a POE may be different depending on cable configuration. For example, the EVM probe from Node1|Node3 may demonstrate a ~5 $dB_{Pk\text{-}Pk}$ ripple roughly a second delay signal of 60 ns. This may have a minimum impact on the overall throughput as depicted in the bits-per-symbol $Node1_{Tx}|Node3_{Rx}$. The EVM probe from Node2|Node3 may demonstrate a ~15 $dB_{Pk\text{-}Pk}$ ripple and a second delay signal of 180 ns. This may have an impact on the overall throughput as depicted in the bits-per-symbol $Node2_{Tx}|Node3_{Rx}$.

Key Performance Indicators (KPI) may be determined that determine the health of the MoCA network from the Physical Layer POV. Tables 19-23 illustrate example KPI.

TABLE 19

Frequency Response - Suckout Detection - KPI

|  | Frequency Response (Good) + MA | | Frequency Response + MA Suckout Detection | |
|---|---|---|---|---|
|  | OFDM Left Block | OFDM Right Block | OFDM Left Block | OFDM Right Block |
| Standard Deviation | x < 0.8 dBm | | x > 1.5 dBm | |

TABLE 19-continued

Frequency Response - Suckout Detection - KPI

|  | Frequency Response (Good) + MA | | Frequency Response + MA Suckout Detection | |
|---|---|---|---|---|
|  | OFDM Left Block | OFDM Right Block | OFDM Left Block | OFDM Right Block |
| Skewness | −1 < x < 1 | | x < −1; x > 1 | |
| Rx Channel Power | x > {x} dBm | | | |

TABLE 20

Frequency Response - MoCA Friendly Splitter - KPI

|  | Frequency Response (Good) + MA Standard Splitter | Frequency Response (Poor) + MA Standard Splitter | Frequency Response (Good) + MA MoCA Friendly Splitter |
|---|---|---|---|
| Tilt | NA | Negative Tilt | Positive Tilt |
| Standard Deviation | x < 0.8 dBm | | x < 0.8 dBm |
| Slope Delta | ±3 dB | −9 dB < x < −3 dB | 3 dB > x < 9 dB |

TABLE 21

POE Detection - KPI

|  | POE Detection (Strong Reflection) + MA | | POE Detection (Weak Reflection) + MA | |
|---|---|---|---|---|
|  | OFDM Left Block | OFDM Right Block | OFDM Left Block | OFDM Right Block |
| Standard Deviation | x > 2.0 dBm | | 1.5 dBm > x < 2.0 dBm | |
| Skewness | −1 < x < 1 | | −1 < x < 1 | |

TABLE 22

MoCA MeshScMod - KPI

|  | MoCA MeshScMod (Bit Load) Excellent | | MoCA MeshScMod (Bit Load) Minimum (Good) | |
|---|---|---|---|---|
|  | OFDM Left Block | OFDM Right Block | OFDM Left Block | OFDM Right Block |
| Mean | 9 bpsym | | 7-8 bpsym | |
| Standard Deviation | x < 1 | | x > 1 | |
| Skewness | −1 < x < 1 | | −1 > x > 1 | |
| Calculated PHY Rate | x > 848.75 Mbps | | x > 656.25 Mbps | |
| Reported PHY Rate | x > 650 Mbps | | x > 600 Mbps | |

Figure 55:
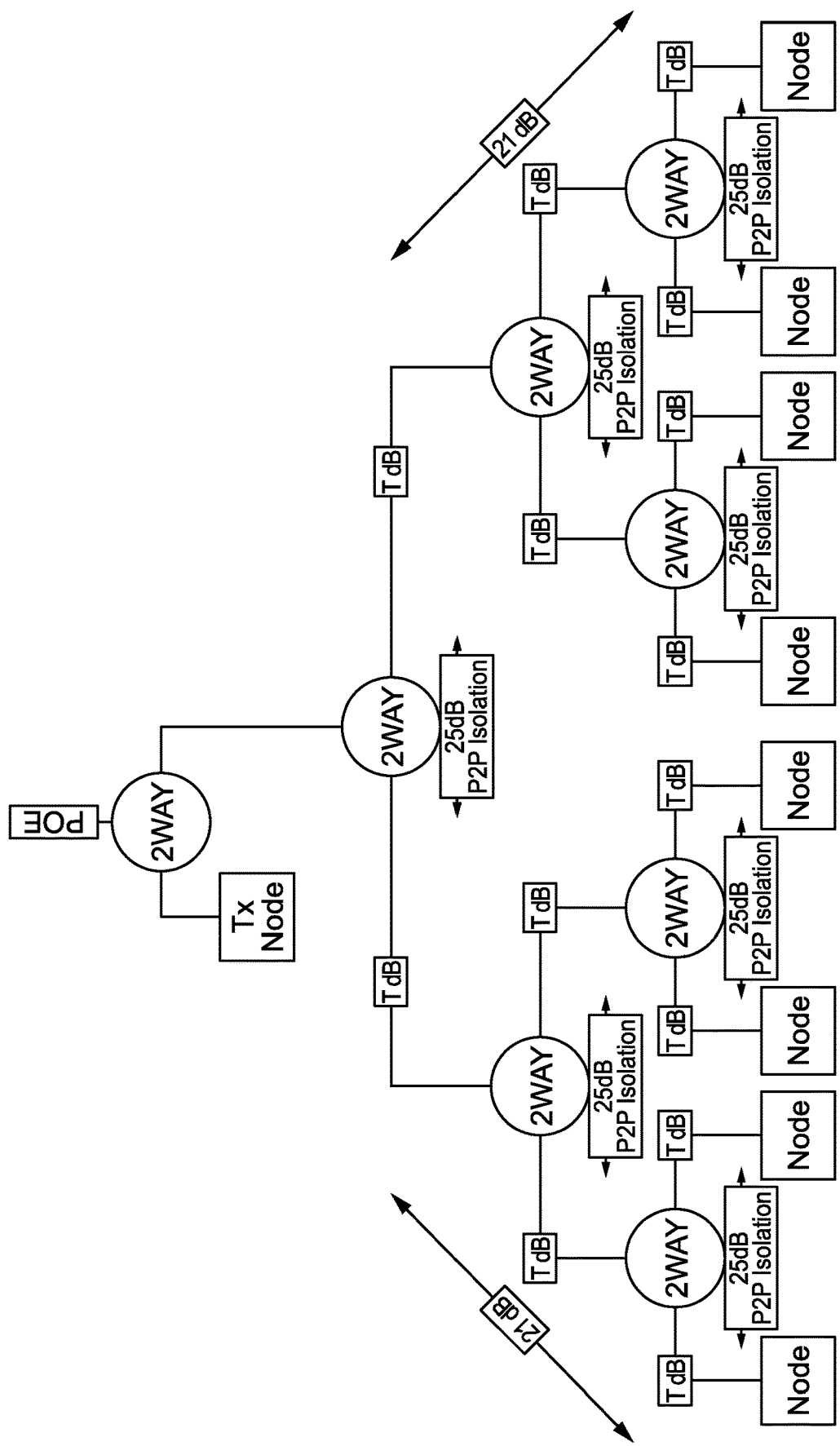
FIG. 55 shows an example transmitter node with an eight-way splitter.

The data from Table 22 may be a result of an assumption that the XG or XB is connected to the end of the splitter network. Having the XB or XG gateways closer to the input of the splitter network may improve the receive power by not requiring to crossover from one end of the splitter network to the other. This configuration may improve the receive signal power by ~7 dB in an 8Way splitter as shown in FIG. 55. Table 23 shows a Tx-Node+8Way NMF Splitter Network where a POE is connected to the input of the splitter.

TABLE 23

NMF 2Way Splitter Network vs. PHY Rate - KPI
NMF 2Way Splitter Network (Max Tx @ 2.5 dBm)

| Number of Nodes | Insertion Loss/Rx Power With POE* | PHY Rate | Insertion Loss | PHY Rate |
|---|---|---|---|---|
| 2 | ~14 dB/−11.5 dBm | >600 Mbps | ~25 dB/−22.5 dBm | >600 Mbps |
| 4 | ~28 dB/−25.5 dBm | >600 Mbps | ~39 dB/−36.5 dBm | >600 Mbps |
| 6 | ~42 dB/−39.5 dBm | >600 Mbps | ~67 dB/−64 dBm | >200-100 Mbps |
| 8 | ~42 dB/−39.5 dBm | >600 Mbps | | |
| 9 | ~49 dB/−46.5 dBm | >600 Mbps | | |
| 10 | ~56 dB/−53 dBm | >330 Mbps | | |
| 11-15 | >63 dB/−60.5 dBm | >200-100 Mbps | | |

Figure 56:
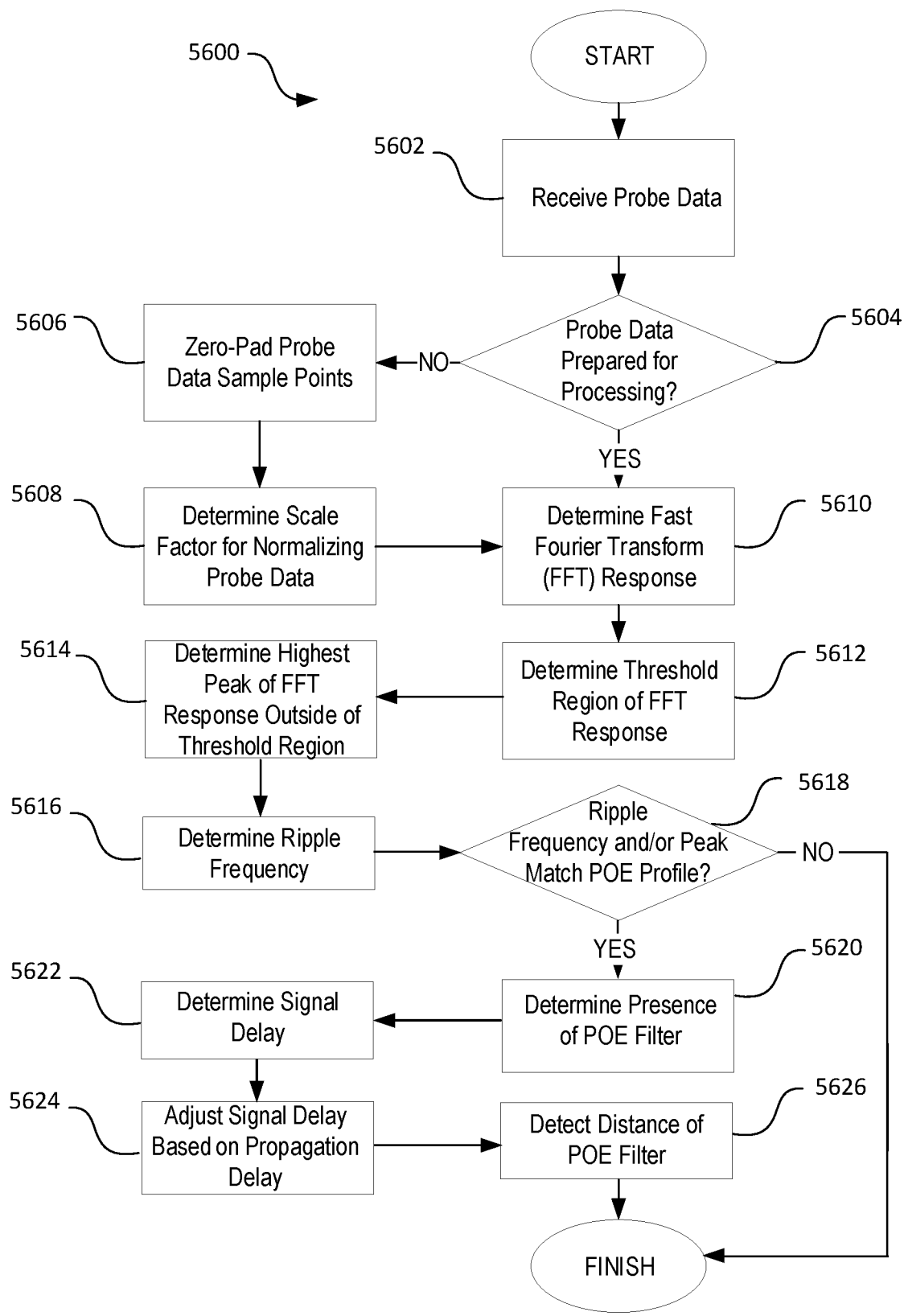
FIG. 56 is a flow chart showing a method for determining whether a point of entry filter is installed in a home network and its distance.

FIG. 56 shows a method 5600 for detecting and determining the distance of a point of entry filter. Method 5600 may begin at block 5602 where probe data such as, for example, Alternative Channel Assessment (ACA) data may be received, from a network associated with a premises (e.g., MoCA network). As described herein, MoCA enabled devices may monitor, analyze, and send probe data to remote computing devices for analysis. At block 5604, it may be determined whether the probe data is prepared for processing, such as, for example, prepared for Fourier analysis. If it is determined that the probe data is not prepared for processing (block 5604: NO), then control proceeds to block 5606. If it is determined that the probe data is prepared for processing (block 5604: YES), control may proceed to block 5610.

At block 5606, the probe data may be normalized by zero-padding sample points of the probe data (e.g., adding 512 zeros to the 512 sample points of the probe data). The probe data may be zero-padded so that the probe data has a number of sample points that are a power of two (e.g., 1024). At block 5608, it may be determined that, based on the probe data and based on the normalized probe data, an amount that the probe data has been scaled. Control may proceed to block 5610.

At block 5610, an FFT response may be determined for the probe data. The initial sample points within a threshold region of the FFT response may not render a ripple for which the existence or distance of a POE filter may be determined. Accordingly, at block 5612, a threshold region of the FFT response may be determined. The threshold region may be excluded from the analysis of method 5600. At block 5614, t a highest peak of the FFT response outside of the threshold region identified at block 5612 may be determined.

At block 5616, a ripple frequency may be determined based on the peak determined at block 5614. At block 5618, the ripple frequency and/or the peak magnitude may be compared to POE filter profiles, which may be stored in the KPI database 318, for matches. If it is determined that a matching POE filter profile is identified (block 5618: YES), control proceeds to block 5620. Otherwise (block 5618: NO), it may be determined that a POE filter does not exist at a premises and method 5600 may cease operation. If a POE filter is present, a confirmation signal may be generated and sent to central office and/or field technicians. If a POE filter is not present, an alert signal may be generated and sent to central office and/or field technicians At block 5622, a signal delay may be determined based on the ripple frequency determined at block 5616 and based on the scale factor determined at block 5608. At block 5624, the signal delay may be adjusted based on a propagation delay of the electrical connections of the network. At block 5626, a distance between a POE filter and another node of the network (e.g., a root splitter) may be determined. Thereafter, method 5600 may cease operation.

EXAMPLES

Example 1—ACAPowerProfile

```
{
    "SourceNodeID": 0,
    "AcaPowerProfileRF": {
        "AcaPowerProfileTiltDelta": 2.542965683525839,
        "AcaOfdmMean": −29.9921875,
        "RxAcaChanPwrCalc__dBm": −0.05292069541067507,
        "AcaOfdmStDev": 5.657540687794555,
        "RxChanPwrMeas__dBm": −18,
        "AcaOfdmSkewness": −1.0483031155954898,
        "AcaGraphData": [{
            "SubCarFreq": 1.1501953125E9,
            "dBmV": 2.750612633917001,
            "AcaPowerProfileTilt": −30.776468456966377,
            "dBm": −46
        },
        .
        .
        .
        {
            "SubCarFreq": 1.25E9,
            "dBmV": 2.750612633917001,
            "AcaPowerProfileTilt": −28.233502773440538,
            "dBm": −46
        }],
        "ofdmChanPwrCorrection__dBm": −0.05292069541067507
    },
    "MoCAChannel": 1150,
    "AcaType": 1,
    "ReportNodeID": 1,
    "SourceNodeMacAddress": "04:4e:5a:1a:ad:89",
    "ReportNodeMacAddress": "04:4e:5a:1a:ac:ce"
}
```

Example 2—MeshScMod

```
{
    "MoCAChan": 1150,
    "SubCarModData": [{
        "PhyRateEst": 8.974609375E8,
        "TxNodeID": 0,
        "RxNodeID": 1,
        "RxNodeMacAddr": "5c:e3:0e:d9:P9:90",
        "BitLoad": "0, 0, 0, 0, 6, 8, 8, 8, 8, 9, 9, 9, 9, 9, 9, 9, 9, 9, 9, 9, 9, 9, 9, 9, 9,
9, 9, 9, 9, 10, 9, 9, 9, 10, 10, 10, 10, 10, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10, 10,
10, 10, 10, 10, 9, 9, 9, 9, 9, 9, 9, 9, 9, 10, 9, 10, 10, 10, 10, 10, 9, 9, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10,
10, 10, 10, 9, 10, 10, 10, 9, 9, 9, 9, 9, 10, 10, 10, 10, 9, 10, 10, 10, 10, 10, 10, 10, 10, 10, 10,
10, 10, 10, 10, 10, 10, 10, 10, 10, 10, 10, 10, 10, 10, 10, 10, 10,
10, 10, 10, 10, 9, 9, 10, 10, 10, 9, 9, 9, 9, 9, 9, 9, 9, 9, 9, 9, 9, 9, 9, 9, 9, 9, 9, 9, 8, 8, 8, 0, 0, 0,
0, 0, 0, 0, 0, 0, 0, 0,0, 0, 0, 0, 0, 0, 0, 0, 0, 0, 0, 0, 9, 8, 9, 9, 9, 9, 9, 9, 9, 9, 9, 9, 9, 9, 9,
9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 9, 10, 10,
10,
10, 10, 10, 10, 10, 10, 10, 10, 10, 10, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 9, 10, 9, 9, 10, 9, 9, 9, 9, 9,
9, 9, 10, 9, 9, 9, 9, 9, 9, 9, 9, 9, 9, 9, 9, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10, 9,
9, 10, 10, 10, 10, 10, 9, 10, 9, 9, 9, 9, 9, 10, 9, 9, 9, 9, 9, 9, 9, 9, 9, 9, 9, 9, 9, 9, 9, 9, 9, 9,
9,
10, 10, 9, 10, 9, 10, 9, 10, 10, 10, 10, 10, 10, 10, 10, 10, 10, 10, 10, 10, 10, 10, 10, 10,
10, 10, 10, 10, 10, 10, 9, 10, 9, 9, 9, 9, 9, 8, 8, 8, 7, 0, 0, 0",
        "TxNodeMacAddr": "04:4e:5a:1a:ac:ce"
    },
    {
        "PhyRateEst": 8.984375E8,
        "TxNodeID": 1,
        "RxNodeID": 0,
        "RxNodeMacAddr": "04:4e:5a:1a:ac:ce",
        "BitLoad": "0, 0, 0, 0, 6, 6, 7, 7, 7, 8, 8, 8, 8, 8, 8, 8, 8, 8, 8, 8, 8, 8, 8, 8, 8,
8, 8, 8, 8, 8, 8, 8, 9, 8, 9, 10, 10, 10, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 9, 10,
9, 9, 9, 10, 9, 9, 9, 9, 9, 9, 9, 9, 9, 9, 9, 9, 9, 9, 9, 9, 9, 9, 9, 10, 9, 9, 10, 9, 10, 10, 10, 10, 10, 9,
10, 10, 10, 10, 10, 10, 10, 10, 10, 10, 10, 10, 10, 10, 10, 10, 10, 10, 10, 10, 10, 10,
10, 10, 10, 10, 10, 10, 10, 10, 10, 10, 10, 10, 10, 10, 9, 10, 9, 10, 10, 10, 9, 9, 9, 10,
9, 9, 9, 9, 9, 9, 9, 10, 10, 9, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10,
10, 10, 10, 10, 10, 9, 10, 9, 10, 9, 9, 9, 9, 9, 9, 9, 9, 9, 9, 9, 0, 0, 0, 0, 0, 0, 0, 0, 0, 0,
0, 0, 0, 0, 0, 0, 0, 0, 0, 0, 0, 0, 0, 9, 9, 9, 10, 10, 10, 10, 10, 10, 10, 10, 10, 10, 10, 10,
10, 10, 10, 10, 10, 10, 10, 9, 10, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10,
10, 10, 10, 10, 10, 10, 10, 10, 10, 10, 9, 9, 9, 10, 10, 10, 10, 10, 10, 10, 10, 10, 10, 10,
10, 10, 10, 10, 10, 10, 10, 10, 9, 10, 9, 10, 10, 10, 10, 10, 10, 10, 10, 10, 10, 10, 10, 10,
10, 10, 10, 10, 10, 10, 10, 10, 10, 10, 10, 10, 10, 10, 10, 10, 10, 10, 10, 10, 10, 10, 10,
10, 10, 10, 10, 10, 10, 10, 10, 10, 9, 10, 10, 9, 9, 9, 10, 9, 9, 9, 10, 9, 10, 10, 9, 9, 10, 10, 9,
9, 9, 9, 10, 9, 10, 10, 9, 9, 9, 9, 9, 9, 9, 9, 9, 9, 9, 9, 9, 9, 9, 9, 9, 9, 9, 9, 9, 9, 8, 8, 8, 8,
8,
8, 7, 7, 6, 0, 0, 0",
        "TxNodeMacAddr": "5c:e3:0e:d9:f9:90"
    }],
    "ScModType": "UNICAST"
}
```

Example 3—Recursive Line Crossing Analysis
(Right OFDM Block)

```
{
    "NumberOfTiltCrossings": 16,
    "EvmProbeData": "−25.5, −25.2, −25.5, −25.9, −26.4, −27.0, −27.7, −28.7, −29.8, −30.8,
−31.8, −32.6, −33.0, −33.2, −33.2, −33.0, −32.5, −31.8, −31.0, −30.0, −28.9, −28.0, −27.3, −27.0, −26.5,
−26.3, −26.1, −26.0, −25.9, −26.1, −26.6, −27.2, −28.0, −28.7, −29.9, −31.1, −31.8, −32.6, −33.2, −33.4,
−33.4, −33.0, −32.5, −31.7, −30.6, −29.3, −28.4, −27.5, −26.7, −26.2, −25.8, −25.5, −25.4, −25.2, −25.3,
−25.7, −26.4, −27.1, −27.9, −28.9, −30.0, −31.1, −31.9, −32.5, −33.0, −33.2, −32.9, −32.5, −31.7, −30.8,
−29.8, −29.0, −28.0, −27.5, −26.9, −26.6, −26.5, −26.3, −26.6, −26.8, −26.9, −27.1, −27.8, −28.4, −29.1,
−29.8, −30.9, −31.9, −32.5, −32.9, −33.2, −33.2, −32.9, −32.4, −31.6, −30.6, −29.3, −28.2, −27.4, −26.7,
−26.0, −25.6, −25.2, −25.2, −25.4, −25.6, −25.9, −26.3, −26.9, −27.8, −28.8, −29.9, −31.0, −31.8, −32.4,
−33.0, −33.1, −32.9, −32.4, −31.6, −30.7, −29.6, −28.5, −27.5, −26.6, −25.7, −25.3, −25.2, −24.9, −24.9,
−24.9, −25.0, −25.2, −25.7, −26.4, −27.3, −28.3, −29.2, −30.2, −30.9, −31.4, −31.6, −31.7, −31.2, −30.8,
```

-continued

−29.9, −28.8, −27.7, −26.6, −25.5, −24.8, −24.5, −24.1, −24.0, −23.8, −23.9, −24.3, −24.6, −25.2, −26.1, −26.9, −27.8, −28.9, −30.0, −30.8, −31.4, −31.5, −31.7, −31.5, −30.9, −30.2, −29.2, −28.0, −27.1, −26.3, −25.6, −25.0, −24.4, −24.1, −24.1, −24.1, −24.1, −24.3, −24.3, −24.6, −25.2, −26.1, −27.2, −28.3, −29.3, −30.1, −30.6, −30.9, −31.1, −30.9, −30.4, −29.6, −28.5, −27.4, −26.2, −25.5, −24.8, −24.4, −23.9, −23.7, −23.6, −23.6, −23.9, −23.88888888888889, −24.0, −23.857142857142858, −24.166666666666668, −24.2, −24.5, −24.666666666666668, −25.0, −26.0",
    "OfdmSideBand": "RIGHT_BLOCK",
    "MocaChannel": "1150MHz",
    "DescriptiveStatisticsUpper": [{
      "Mean": 12.76923076923077,
      "SD": 0.8320502943378438,
      "Min": 11,
      "Max": 14,
      "Skewness": −0.5280857928709914,
      "SlopeDelta": ""
    }],
    "EvmProbeTiltLine": "−29.95438626866355, −29.9379831941107, −29.92158011955785, −29.905177045004997, −29.888773970452146, −29.872370895899294, −29.855967821346443, −29.839564746793590, −29.82316167224074, −29.80675859768789, −29.790355523135037, −29.773952448582186, −29.757549374029338, −29.741146299476487, −29.724743224923635, −29.708340150370784, −29.691937075817933, −29.67553400126508, −29.65913092671223, −29.64272785215938, −29.626324777606527, −29.609921703053676, −29.593518628500824, −29.577115553947973, −29.56071247939512, −29.54430940484227, −29.52790633028942, −29.511503255736567, −29.495100181183716, −29.478697106630865, −29.462294032078013, −29.44589095752516, −29.42948788297231, −29.41308480841946, −29.39668173386661, −29.38027865931376, −29.36387558476091, −29.347472510208057, −29.331069435655206, −29.314666361102354, −29.298263286549503, −29.28186021199665, −29.2654571374438, −29.24905406289095, −29.232650988338097, −29.216247913785246, −29.199844839232394, −29.183441764679543, −29.16703869012669, −29.15063561557384, −29.13423254102099, −29.117829466468137, −29.101426391915286, −29.085023317362435, −29.068620242809583, −29.052217168256732, −29.035814093703884, −29.019411019151033, −29.00300794459818, −28.98660487004533, −28.97020179549248, −28.953798720939627, −28.937395646386776, −28.920992571833924, −28.904589497281073, −28.88818642272822, −28.87178334817537, −28.85538027362252, −28.8338977199069667, −28.822574124516816, −28.806171049963964, −28.789767975411113, −28.77336490085826, −28.75696182630541, −28.74055875175256, −28.724155677199708, −28.707752602646856, −28.691349528094005, −28.674946453541153, −28.658543378988306, −28.642140304435454, −28.625737229882603, −28.60933415532975, −28.5929310807769, −28.57652800622405, −28.560124931671197, −28.543721857118346, −28.527318782565494, −28.510915708012643, −28.49451263345979, −28.47810955890694, −28.46170648435409, −28.445303409801237, −28.428900335248386, −28.412497260695535, −28.396094186142683, −28.379691111589832, −28.36328803703698, −28.34688496248413, −28.330481887931278, −28.31407881337843, −28.29767573882558, −28.281272664272727, −28.264869589719876, −28.248466515167024, −28.232063440614173, −28.21566036606132, −28.19925729150847, −28.18285421695562, −28.166451142402767, −28.150048067849916, −28.133644993297064, −28.117241918744213, −28.10083884419136, −28.08443576963851, −28.06803269508566, −28.051629620532808, −28.035226545979956, −28.018823471427105, −28.002420396874253, −27.986017322321402, −27.96961424776855, −27.9532111732157, −27.93680809866285, −27.92040502411, −27.90400194955715, −27.887598875004297, −27.871195800451446, −27.854792725898594, −27.838389651345743, −27.82198657679289, −27.80558350224004, −27.78918042768719, −27.772777353134337, −27.756374278581486, −27.739971204028635, −27.723568129475783, −27.707165054922932, −27.69076198037008, −27.67435890581723, −27.657955831264378, −27.641552756711526, −27.625149682158675, −27.608746607605823, −27.592343533052976, −27.57594045850012, −27.559537383947273, −27.54313430939442, −27.52673123484157, −27.51032816028872, −27.493925085735867, −27.477522011183016, −27.461118936630164, −27.444715862077313, −27.42831278752446, −27.41190971297161, −27.39550663841876, −27.379103563865907, −27.362700489313056, −27.344297414760205, −27.329894340207353, −27.313491265654502, −27.29708819110165, −27.2806851165488, −27.264282041995948, −27.247878967443096, −27.231475892890245, −27.215072818337397, −27.198669743784542, −27.182266669231694, −27.165863594678843, −27.14946052012599, −27.13305744557314, −27.11665437102029, −27.100251296467437, −27.083848221914586, −27.067445147361735, −27.051042072808883, −27.034638998256032, −27.01823592370318, −27.00183284915033, −26.985429774597478, −26.969026700044626, −26.952623625491775, −26.936220550938923, −26.919817476386072, −26.90341440183322, −26.88701132728037, −26.87060825272752, −26.854205178174666, −26.83780210362182, −26.821399029068967, −26.804995954516116, −26.788592879963264, −26.772189805410413, −26.75578673085756, −26.73938365630471, −26.72298058175186, −26.706577507199007, −26.690174432646156, −26.673771358093305, −26.657368283540453, −26.640965208987602, −26.62456213443475, −26.6081590598819, −26.591755985329048, −26.575352910776196, −26.558949836223345, −26.542546761670494, −26.526143687117642, −26.50974061256479, −26.493337538011943, −26.476934463459088, −26.46053138890624, −26.44412831435339, −26.427725239800537, −26.411322165247686",
    "DescriptiveStatisticsLower": [{
      "Mean": 12.6,
      "SD": 1.7647338933351155,
      "Min": 10,
      "Max": 15,

```
    "Skewness": 0.16915751258199244,
    "SlopeDelta": ""
  }]
}
```

Example 4—POE Detection (POE+75'+3WAY MFS)

```
{
    "SampleRate": 1.0E8,
    "RoundTripSignalTimeCorrected": 1.5950507409700002E-7,
    " FFTHighestMagnitudePeakIndex ": 149,
    "20nsFFTIndexThreshold": 16,
    "FFTScale": 0.125,
    "RoundTripDelaySignalTime": 1.8625000000000002E-7,
    "RoundTripDelaySignalFeet": 159.505074097
}
```

The above discussion is by way of example, and modifications may be made as desired for different implementations. For example, steps and/or components may be subdivided, combined, rearranged, removed, supplemented, and/or augmented; performed on a single device or a plurality of devices; performed in parallel, in series; or any combination thereof. Additional features may be added.

We claim:

1. A method comprising:
receiving, by a computing device and from a first device associated with a premises, probe data indicative of signal loss between the first device and a second device;
determining, based on the probe data for a plurality of frequencies, a frequency response;
determining, based on comparing a peak of the frequency response with one or more profiles, that the first device or the second device comprises a Point of Entry (POE) filter;
determining, based on a signal delay associated with the peak, a distance between the first device and the second device; and
sending, based on determining that the first device or the second device comprises the POE filter and based on determining that the distance between the first device and the second device satisfies a threshold, an alert signal.

2. The method of claim 1, wherein the one or more profiles comprises POE filter profiles.

3. The method of claim 1, further comprising:
determining a threshold region of the frequency response; and
determining a highest magnitude peak of the frequency response outside of the threshold region.

4. The method of claim 1, further comprising:
determining, based on a connection type between the first device and the second device, a propagation delay; and
adjusting, based on the propagation delay, the signal delay.

5. The method of claim 1, further comprising:
normalizing the probe data by zero-padding sample points of the probe data; and
determining, based on the probe data and based on the normalized probe data, a frequency scale;

wherein determining the signal delay is further based on the frequency scale.

6. The method of claim 1, wherein determining that the distance between the first device and the second device satisfies the threshold comprises determining that the distance between the first device and the second device is greater than ten feet.

7. A method comprising:
receiving, by a computing device remote and from a premises from a first device at the premises, probe data indicative of signal loss between the first device and a second device at the premises;
determining, based on the probe data for a plurality of frequencies, a frequency response;
comparing a peak of the frequency response with one or more Point of Entry (POE) filter profiles;
determining, based on the comparing, whether the first device or the second device comprises a POE filter; and
generating, based on determining that the first device or the second device comprises the POE filter, a confirmation signal.

8. The method of claim 7, further comprising:
sending, by the computing device, via a simple network management protocol, and to the first device, instructions to measure characteristics of a network comprising the first device and the second device.

9. The method of claim 7, further comprising:
determining a threshold region of the frequency response; and
wherein comparing the peak of the frequency response with the one or more POE filter profiles further comprises selecting a highest magnitude peak of the frequency response outside of the threshold region as the peak of the frequency response.

10. The method of claim 7, further comprising:
determining whether a continuous wave path loss between the first device and the second device is between −40 decibel millivolts (dBmV) and 40 dBmV;
wherein determining whether the first device or the second device comprises the POE filter is further based on determining that the continuous wave path loss between the first device and the second device is greater than 40 dBmV or lower than −40 dBmV.

11. The method of claim 7, further comprising:
normalizing the probe data by zero-padding sample points of the probe data;
determining, based on the probe data and based on the normalized probe data, a frequency scale; and
determining, based on the frequency scale and based on the peak of the frequency response, a signal delay.

12. The method of claim 7, further comprising:
determining, based on the peak, a signal delay;
adjusting, based on a propagation delay associated with a network comprising the first device and the second device, the signal delay; and
determining, based on the adjusted signal delay, a distance between the first device and the second device.

13. The method of claim 12, further comprising:
sending, based on determining that the distance between the first device and the second device is within ten feet, a confirmation signal.

14. A method comprising:
receiving, by a computing device and from a first device associated with a premises, probe data indicative of signal loss between the first device and a second device;
determining, based on the probe data, a frequency response;
determining a region of the frequency response corresponding to signal delays of less than a threshold amount of time;
determining a peak of the frequency response outside of the determined region;
determining, based on the peak and based on a propagation delay associated with a network comprising the first device and the second device, a signal delay;
determining, based on the signal delay, a distance between the first device and the second device; and
sending, based on determining that the distance satisfies a threshold distance, an alert signal.

15. The method of claim 14, further comprising:
determining, based on comparing the peak with one or more Point of Entry (POE) filter profiles, that the first device or the second device comprises a POE filter.

16. The method of claim 14, wherein the computing device is remote from the premises.

17. The method of claim 14, further comprising determining that the first device or the second device comprises a root splitter.

18. The method of claim 14, further comprising:
normalizing the probe data by zero-padding sample points of the probe data; and
determining, based on the probe data and based on the normalized probe data, a frequency scale;
wherein determining the signal delay is further based on the frequency scale.

19. The method of claim 14, wherein determining that the distance satisfies the threshold distance comprises determining that the distance between the first device and the second device is greater than ten feet.

20. The method of claim 14, wherein the threshold amount of time comprises twenty nanoseconds.

\* \* \* \* \*

UNITED STATES PATENT AND TRADEMARK OFFICE
CERTIFICATE OF CORRECTION

Page 1 of 2

PATENT NO. : 10,594,541 B2
APPLICATION NO. : 16/121524
DATED : March 17, 2020
INVENTOR(S) : Garcia et al.

It is certified that error appears in the above-identified patent and that said Letters Patent is hereby corrected as shown below:

In the Drawings

Sheet 7 of 41, Fig 7, Reference Numeral 702, Line 1:
Delete "fequency" and insert --frequency--

Sheet 10 of 41, Fig 10, Reference Numerals 1002, Line 1:
Delete "fequency" and insert --frequency--

In the Specification

Column 3, Brief Description of the Drawings, Line 6:
Delete "FIG." and insert --FIGS.--

Column 3, Brief Description of the Drawings, Line 8:
Delete "FIG." and insert --FIGS.--

Column 3, Brief Description of the Drawings, Line 14:
Delete "FIG." and insert --FIGS.--

Column 8, Detailed Description, Line 2:
Delete "308," and insert --200,--

Column 24, Detailed Description, Line 6:
Delete "SubCarrior" and insert --SubCarrier--

Column 35, Detailed Description, Line 57:
Delete "$EVM_{OFDM sideband}$" and insert --$EVM_{OFDM\ Sideband}$--

Column 39, Detailed Description, Line 2:
Delete "O(n)" and insert --$O(n)$--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,594,541 B2

Column 40, Detailed Description, Lines 46-49:

Delete "$FFT[i]_{Points(1024)} = \{X_{[0]} = X_{ACA_{dBm}}, X_{[1]} = X_{ACA_{dBm}}, \ldots, X_{[512]} = X_{ACA_{dBm}}, X_{[512]} = 0_{ZeroPad}, \ldots, X_{[1023]} = 0_{ZeroPad}\}$" and insert -- $FFT[i]_{Points(1024)} = \{x_{[0]} = x_{ACA_{dBm}}, x_{[1]} = x_{ACA_{dBm}}, \ldots, x_{[511]} = x_{ACA_{dBm}}, x_{[512]} = 0_{ZeroPad}, \ldots, x_{[1023]} = 0_{ZeroPad}\}$ --